(12) United States Patent
Alshin et al.

(10) Patent No.: US 11,277,604 B2
(45) Date of Patent: Mar. 15, 2022

(54) CHROMA INTRA PREDICTION METHOD AND DEVICE THEREFOR

(71) Applicant: SAMSUNG ELECTRONICS CO., LTD., Suwon-si (KR)

(72) Inventors: Alexander Alshin, Seoul (KR); Elena Alshina, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 528 days.

(21) Appl. No.: 16/317,862

(22) PCT Filed: Jul. 7, 2017

(86) PCT No.: PCT/KR2017/007289
§ 371 (c)(1),
(2) Date: Jan. 15, 2019

(87) PCT Pub. No.: WO2018/012808
PCT Pub. Date: Jan. 18, 2018

(65) Prior Publication Data
US 2021/0281831 A1 Sep. 9, 2021

Related U.S. Application Data

(60) Provisional application No. 62/362,213, filed on Jul. 14, 2016.

(51) Int. Cl.
*H04N 19/00* (2014.01)
*H04N 19/105* (2014.01)
(Continued)

(52) U.S. Cl.
CPC ......... *H04N 19/105* (2014.11); *H04N 19/132* (2014.11); *H04N 19/159* (2014.11); *H04N 19/176* (2014.11); *H04N 19/186* (2014.11)

(58) Field of Classification Search
CPC .. H04N 19/105; H04N 19/132; H04N 19/159; H04N 19/176; H04N 19/186
See application file for complete search history.

(56) References Cited

U.S. PATENT DOCUMENTS 8,611,420 B2   12/2013   Alshina et al.
8,649,435 B2   2/2014    Alshina et al.
(Continued)

FOREIGN PATENT DOCUMENTS

CN   103220527 A   7/2013
EP   2 640 076 B1  9/2014
(Continued)

OTHER PUBLICATIONS

International Search Report (PCT/ISA/210) and Written Opinion (PCT/ISA/237) dated Oct. 19, 2017 issued by the International Searching Authority in International Application No. PCT/KR2017/007289.
(Continued)

*Primary Examiner* — Zhihan Zhou
(74) *Attorney, Agent, or Firm* — Sughrue Mion, PLLC

(57) ABSTRACT

Provided is a video decoding method including: obtaining correlation information of a luma value and a chroma value from a most probable chroma (MPC) mode reference region of a current chroma block; determining a prediction value of a chroma sample of the current chroma block from luma samples of a current luma block corresponding to the current chroma block, according to the correlation information; and decoding the current chroma block based on the prediction value of the chroma sample.

13 Claims, 28 Drawing Sheets

(51) Int. Cl.
*H04N 19/132* (2014.01)
*H04N 19/159* (2014.01)
*H04N 19/176* (2014.01)
*H04N 19/186* (2014.01)

(56) References Cited

U.S. PATENT DOCUMENTS

| | | | |
|---|---|---|---|
| 8,824,549 B2 | 9/2014 | Alshina et al. | |
| 8,837,590 B2 | 9/2014 | Alshina et al. | |
| 8,902,979 B2 | 12/2014 | Alshina et al. | |
| 9,402,079 B2 | 7/2016 | Alshina et al. | |
| 9,554,156 B2 | 1/2017 | Leontaris et al. | |
| 9,560,359 B2 | 1/2017 | Lei et al. | |
| 9,674,521 B2 | 6/2017 | Lee et al. | |
| 2004/0008284 A1 | 1/2004 | Kim | |
| 2010/0054542 A1 | 3/2010 | Archibald et al. | |
| 2011/0255591 A1* | 10/2011 | Kim | H04N 19/11 375/240.02 |
| 2013/0163666 A1* | 6/2013 | Leontaris | H04N 19/172 375/240.12 |
| 2014/0140401 A1* | 5/2014 | Lee | H04N 19/186 375/240.12 |
| 2017/0105025 A1 | 4/2017 | Jeon et al. | |
| 2017/0251213 A1* | 8/2017 | Ye | H04N 19/513 |

FOREIGN PATENT DOCUMENTS

| | | |
|---|---|---|
| EP | 2 712 198 B1 | 3/2015 |
| EP | 2 712 200 B1 | 3/2015 |
| EP | 2 713 618 B1 | 3/2015 |
| EP | 2 713 617 B1 | 9/2015 |
| EP | 2 712 199 B1 | 12/2015 |
| JP | 2004-40808 A | 2/2004 |
| KR | 10-2013-0004133 A | 1/2013 |
| KR | 10-2013-0036773 A | 4/2013 |
| KR | 10-2014-0110015 A | 9/2014 |
| WO | 2012/121535 A2 | 9/2012 |

OTHER PUBLICATIONS

Communication dated Dec. 23, 2020, issued by the Korean Intellectual Property Office in counterpart Korean Application No. 10-2018-7034611.

* cited by examiner

FIG. 13

| BLOCK SHAPE / DEPTH | 0: SQUARE | 1: NS_VER | 2: NS_HOR |
|---|---|---|---|
| DEPTH D | 1300 | 1310 | 1320 |
| DEPTH D+1 | 1302 | 1312 | 1322 |
| DEPTH D+2 | 1304 | 1314 | 1324 |
| ... | ... | ... | ... |

| 53 | 54 | 55 | 55 | 56 | 57 | 57 | 58 |
|----|----|----|----|----|----|----|----|
| 54 | 54 | 55 | 55 | 56 | 57 | 57 | 56 |
| 55 | 54 | 57 | 57 | 57 | 56 | 56 | 55 |
| 55 | 54 | 57 | 57 | 57 | 56 | 56 | 55 |
| 57 | 57 | 58 | 56 | 55 | 54 | 54 | 51 |
| 58 | 58 | 58 | 57 | 59 | 52 | 52 | 49 |
| 58 | 60 | 57 | 55 | 54 | 51 | 50 | 50 |
| 59 | 60 | 58 | 55 | 53 | 52 | 51 | 48 |

2300

Cr

| 118 | 117 | 118 | 118 | 118 | 119 | 119 | 117 |
|-----|-----|-----|-----|-----|-----|-----|-----|
| 117 | 117 | 118 | 118 | 118 | 119 | 119 | 118 |
| 118 | 117 | 119 | 119 | 119 | 118 | 118 | 118 |
| 119 | 119 | 119 | 117 | 119 | 118 | 118 | 118 |
| 119 | 119 | 117 | 118 | 118 | 117 | 117 | 117 |
| 117 | 117 | 117 | 119 | 118 | 116 | 116 | 117 |
| 117 | 118 | 119 | 118 | 117 | 117 | 117 | 117 |
| 118 | 118 | 117 | 118 | 118 | 116 | 117 | 118 |

| 53 | 54 | 55 | 55 | 56 | 57 | 57 | 58 |
|----|----|----|----|----|----|----|----|
| 54 | 54 | 55 | 55 | 56 | 57 | 57 | 56 |
| 55 | 54 | 57 | 57 | 57 | 56 | 56 | 55 |
| 57 | 57 | 57 | 58 | 57 | 55 | 56 | 55 |
| 57 | 57 | 58 | 56 | 55 | 54 | 54 | 51 |
| 58 | 58 | 58 | 57 | 59 | 52 | 52 | 49 |
| 58 | 60 | 57 | 55 | 54 | 51 | 50 | 50 |
| 59 | 60 | 58 | 55 | 53 | 52 | 51 | 48 |

2320

Cr

| 118 | 118 | 118 | 118 | 118 | 118 | 118 | 118 |
|-----|-----|-----|-----|-----|-----|-----|-----|
| 118 | 118 | 118 | 118 | 118 | 118 | 118 | 118 |
| 118 | 118 | 118 | 118 | 118 | 118 | 118 | 118 |
| 118 | 118 | 118 | 118 | 118 | 118 | 118 | 118 |
| 118 | 118 | 118 | 118 | 118 | 118 | 118 | 117 |
| 118 | 118 | 118 | 118 | 118 | 117 | 117 | 117 |
| 118 | 118 | 118 | 118 | 118 | 117 | 117 | 117 |
| 118 | 118 | 118 | 118 | 118 | 117 | 117 | 118 |

2330

| CHROMA MODE | FIRST EMBODIMENT | SECOND EMBODIMENT | THIRD EMBODIMENT |
|---|---|---|---|
| DM MODE | 1 | 0 | 10 |
| PLANAR MODE | - | - | 1100 |
| VERTICAL MODE | - | 101 | 1101 |
| HORIZONTAL MODE | - | 110 | 1110 |
| DC MODE | - | 111 | 1111 |
| MPC MODE | 0 | 100 | 0 |
| NUMBER OF CHROMA INTRA MODES | 2 | 5 | 6 |

CHROMA INTRA PREDICTION METHOD AND DEVICE THEREFOR

TECHNICAL FIELD

The present disclosure relates to an intra prediction method and apparatus that are used in encoding and decoding a video, and more particularly, to a method and apparatus for performing chroma intra prediction according to statistical data of decoded blocks.

BACKGROUND ART

When a video of high quality is encoded, a large amount of data is required. However, since a bandwidth allowed for transmission of the video data is limited, a data rate applied to transmission of the video data may be limited. Therefore, for efficient transmission of video data, there is a need for video data encoding and decoding methods with minimal deterioration in image quality and increased compression rates.

Video data may be compressed by removing spatial redundancy and temporal redundancy between pixels. Since adjacent pixels generally have a common characteristic, encoding information of a data unit consisting of pixels is transmitted to remove redundancy between the adjacent pixels.

Pixel values of the pixels included in the data unit are not directly transmitted but information regarding a method of obtaining the pixel values is transmitted. A prediction method of predicting a pixel value that is similar to an original value is determined for each data unit, and encoding information regarding the prediction method is transmitted from an encoder to a decoder. Since a prediction value is not completely equal to the original value, residual data of a difference between the original value and the prediction value is transmitted from the encoder to the decoder.

When prediction is exact, a data amount of the encoding information for specifying the prediction method is increased but a size of the residual data is decreased. Therefore, the prediction method is determined by taking into account sizes of the encoding information and the residual data. In particular, a data unit that is split from a picture has various sizes, and in this regard, when a size of the data unit is increased, there is an increased probability that accuracy of prediction is decreased, whereas a data amount of encoding information is decreased. Thus, a size of a block is determined according to characteristics of a picture.

The prediction method includes intra prediction and inter prediction. The intra prediction involves predicting pixels of a block from adjacent pixels of the block. The inter prediction involves predicting pixels by referring to pixels of a different picture referred to by a picture including the block. Therefore, spatial redundancy is removed through the intra prediction, and temporal redundancy is removed through the inter prediction.

When the number of prediction methods is increased, an amount of encoding information for indicating the prediction method is increased. Thus, when the encoding information to be applied to a block is predicted from a different block, the amount of the encoding information may be decreased.

Since loss of video data is allowed to the extent that the human eye cannot recognize the loss, residual data may be lossy-compressed according to transformation and quantization processes, and by doing so, an amount of the residual data may be decreased.

A picture may be classified as one of a luma picture and two chroma pictures, based on color components. The luma picture includes samples indicating luminance components. Also, the chroma picture includes samples indicating chrominance components. For compression of encoding information, a data unit of the chroma picture may be determined based on the same prediction method as a prediction method of a data unit of the luma picture.

DESCRIPTION OF EMBODIMENTS

Technical Problem

Provided is a chroma intra mode in which a chroma sample of a current block is predicted according to statistical data of blocks decoded before the current block. Also, provided is an intra prediction apparatus for performing a chroma intra prediction method. In addition, provided is a computer-readable recording medium having recorded thereon a program for executing the chroma intra prediction method on a computer.

Solution to Problem

According to an aspect of the present disclosure, a video decoding method includes: obtaining correlation information of a luma value and a chroma value from a most probable chroma (MPC) mode reference region of a current chroma block; determining a prediction value of a chroma sample of the current chroma block from luma samples of a current luma block corresponding to the current chroma block, according to the correlation information; and decoding the current chroma block based on the prediction value of the chroma sample.

According to another aspect of the present disclosure, a video decoding apparatus includes: a correlation information obtainer configured to obtain correlation information of a luma value and a chroma value from a most probable chroma (MPC) mode reference region of a current chroma block; a chroma sample predictor configured to determine a prediction value of a chroma sample of the current chroma block from luma samples of a current luma block corresponding to the current chroma block, according to the correlation information; and a decoder configured to decode the current chroma block based on the prediction value of the chroma sample.

According to another aspect of the present disclosure, a video encoding method includes: obtaining correlation information of a luma value and a chroma value from a most probable chroma (MPC) mode reference region of a current chroma block; determining a prediction value of a chroma sample of the current chroma block from luma samples of a current luma block corresponding to the current chroma block, according to the correlation information; and determining an intra mode of the current chroma block among intra modes including an MPC mode, according to a prediction result of the chroma sample.

According to another aspect of the present disclosure, a video encoding apparatus includes: a correlation information obtainer configured to obtain correlation information of a luma value and a chroma value from a most probable chroma (MPC) mode reference region of a current chroma block; a chroma sample predictor configured to determine a prediction value of a chroma sample of the current chroma block from luma samples of a current luma block corresponding to the current chroma block, according to the correlation information; and an encoder configured to determine an intra mode of the current chroma block among intra modes including an MPC mode, according to a prediction result of the chroma sample.

The technical problems of the present disclosure are not limited to the aforementioned technical features, and other unstated technical problems may be inferred from embodiments below.

Advantageous Effects of Disclosure

A new prediction method with respect to a chroma block is proposed to improve video encoding and decoding performance.

BRIEF DESCRIPTION OF DRAWINGS

FIG. 13 illustrates a depth determinable according to shapes and sizes of coding units, and a part index (PID) for distinguishing between the coding units, according to an embodiment.

FIG. 20 describes a method of matching a luma sample and a chroma sample according to a color format.

FIGS. 23A and 23B illustrate prediction results of current chroma blocks according to the luma-chroma 2D histograms of FIGS. 22A and 22B.

BEST MODE

Figure 1A:
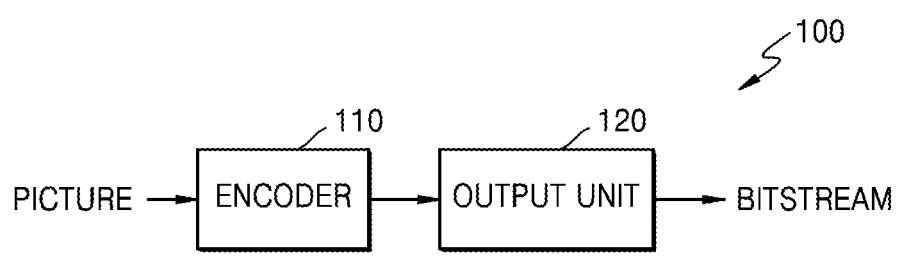
FIG. 1A illustrates a block diagram of an image encoding apparatus based on coding units according to a tree structure, according to an embodiment of the present disclosure.

According to an aspect of the present disclosure, a video decoding method includes: obtaining correlation information of a luma value and a chroma value from a most probable chroma (MPC) mode reference region of a current chroma block; determining a prediction value of a chroma sample of the current chroma block from luma samples of a current luma block corresponding to the current chroma block, according to the correlation information; and decoding the current chroma block based on the prediction value of the chroma sample.

According to another aspect of the present disclosure, a video encoding method includes: obtaining correlation information of a luma value and a chroma value from a most probable chroma (MPC) mode reference region of a current chroma block; determining a prediction value of a chroma sample of the current chroma block from luma samples of a current luma block corresponding to the current chroma block, according to the correlation information; and determining an intra mode of the current chroma block among intra modes including an MPC mode, according to a prediction result of the chroma sample.

MODE OF DISCLOSURE

Advantages and features of one or more embodiments of the present disclosure and methods of accomplishing the same may be understood more readily by reference to the following detailed description of the embodiments and the accompanying drawings. In this regard, the present disclosure may, however, be embodied in many different forms and should not be construed as being limited to the embodiments set forth herein. Rather, these embodiments are provided so that this disclosure will be thorough and complete and will fully convey the concept of the present embodiments to one of ordinary skill in the art.

Hereinafter, the terms used in the specification will be briefly defined, and the embodiments will be described in detail.

All terms including descriptive or technical terms which are used herein should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description of the disclosure. Thus, the terms used herein have to be defined based on the meaning of the terms together with the description throughout the specification.

An expression used in the singular encompasses the expression of the plural, unless it has a clearly different meaning in the context.

When a part "includes" or "comprises" an element, unless there is a particular description contrary thereto, the part can further include other elements, not excluding the other elements. Also, the term "unit" in the embodiments of the present disclosure means a software component or hardware component such as a field-programmable gate array (FPGA) or an application-specific integrated circuit (ASIC), and performs specific functions. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro code, circuits, data, a database, data structures, tables, arrays, variables, or the like. A function provided by the components and "units" may be associated with a smaller number of components and "units", or may be divided into additional components and "units".

The term "current block" refers to one of a coding unit, a prediction unit, and a transform unit which are currently to be encoded or decoded. In addition, the term "lower block" refers to a data unit split from the "current block". The term "upper block" refers to a data unit including the "current block".

Hereinafter, a "sample" is data that is allocated to a sampling location of an image and is a processing target. For example, pixel values in an image of a spatial domain or transform coefficients on a transformation domain may be samples. A unit including at least one sample may be defined as a block.

The present disclosure will now be described more fully with reference to the accompanying drawings for one of ordinary skill in the art to be able to perform the present disclosure without any difficulty. In the following description, well-known functions or constructions are not described in detail so as not to obscure the embodiments with unnecessary detail.

FIG. 1A illustrates a block diagram of an image encoding apparatus based on coding units according to a tree structure, according to an embodiment of the present disclosure.

FIG. 1A illustrates a block diagram of an image encoding apparatus 100 based on coding units according to a tree structure, according to an embodiment of the present disclosure.

The image encoding apparatus 100 includes an encoder 110 and an output unit 120.

The encoder 110 may encode an image according to a plurality of encoding methods. The encoder 110 may select a most efficient encoding method by comparing encoding results according to the plurality of encoding methods. Which encoding method is the most efficient may be determined based on rate-distortion optimization. For example, in a case where an A encoding method and a B encoding method are incompatible, the encoder 110 may encode an image according to a more efficient encoding method from among the A encoding method and the B encoding method, based on rate-distortion optimization.

The encoder 110 splits a picture or a slice included in the picture into a plurality of largest coding units, according to a size of a largest coding unit. The largest coding unit may be a data unit having a size of 32×32, 64×64, 128×128, 256×256, etc., wherein a shape of the data unit is a square having a width and length in squares of 2. The encoder 110 may provide largest coding unit size information indicating the size of the largest coding unit to the output unit 120. The output unit 120 may include the largest coding unit size information in a bitstream.

The encoder 110 determines coding units by splitting the largest coding unit. A coding unit may be determined by its largest size and depth. A depth may be defined as the number of times that the coding unit is spatially split from the largest coding unit. When the depth is increased by 1, the coding unit is split into at least two coding units. Therefore, when the depth is increased, sizes of coding units according to depths are each decreased. Whether to split a coding unit is determined according to whether splitting the coding unit is efficient according to rate-distortion optimization. Then, split information indicating whether the coding unit has been split may be generated. The split information may be expressed in the form of a flag.

The coding unit may be split by using various methods. For example, a square coding unit may be split into four square coding units of which width and height are half of those of the square coding unit. The square coding unit may be split into two rectangular coding units of which width is half. In addition, the square coding unit may be split into two rectangular coding units of which height is half. The square coding unit may be split into three coding units in a manner that a width or height thereof is split by 1:2:1.

A rectangular coding unit of which width is twice as large as a height may be split into two square coding units. The rectangular coding unit of which width is twice as large as the height may be split into two rectangular coding units of which width is four times larger than a height. The rectangular coding unit of which width is twice as large as the height may be split into two rectangular coding units and one square coding unit in a manner that the width is split by 1:2:1.

Equally, a rectangular coding unit of which height is twice as large as a width may be split into two square coding units. The rectangular coding unit of which height is twice as large as the width may be split into two rectangular coding units of which height is four times larger than a width. Equally, the rectangular coding unit of which height is twice as large as the width may be split into two rectangular coding units and one square coding unit in a manner that the height is split by 1:2:1.

When the image encoding apparatus 100 is capable of using two or more split methods, information regarding a split method that is usable to a coding unit, the split method being from among the split methods that are available to the image encoding apparatus 100, may be determined for each picture. Therefore, only specific split methods may be used for each picture. When the image encoding apparatus 100 uses only one split method, the information regarding a split method that is usable to a coding unit is not separately determined.

When split information of a coding unit indicates that the coding unit is split, split shape information indicating a split method with respect to the coding unit may be generated. When only one split method is usable in a picture including the coding unit, the split shape information may not be generated. When the split method is determined to be adaptive to encoding information adjacent to the coding unit, the split shape information may not be generated.

The largest coding unit may be split to smallest coding units according to smallest coding unit size information. A depth of the largest coding unit may be defined to be an uppermost depth, and a depth of the smallest coding units may be defined to be a lowermost depth. Therefore, a coding unit having an upper depth may include a plurality of coding units having a lower depth.

According to a largest size of a coding unit as described above, image data of a current picture is split into a largest coding unit. The largest coding unit may include coding units that are split according to depths. Since the largest coding unit is split according to the depths, image data of a spatial domain included in the largest coding unit may be hierarchically split according to the depths.

A maximum depth that limits the maximum number of hierarchically splitting the largest coding unit or a minimum size of a coding unit may be preset.

The encoder 110 compares coding efficiency of hierarchically splitting a coding unit with coding efficiency of not splitting the coding unit. Then, the encoder 110 determines whether to split the coding unit according to a result of the comparison. When the encoder 110 determines that splitting the coding unit is more efficient, the encoder 110 hierarchically splits the coding unit. However, according to the result of the comparison, when the encoder 110 determines that not splitting the coding unit is more efficient, the encoder 110 does not split the coding unit. Whether to split the coding unit may be independently determined from whether a neighboring different coding unit is split.

According to an embodiment, whether to split the coding unit may be determined from a coding unit having a large depth, during an encoding procedure. For example, coding efficiency of a coding unit having a maximum depth is compared with coding efficiency of a coding unit having a depth that is less than the maximum depth by 1, and it is determined which one of the coding units having the maximum depth and coding units having the depth that is less than the maximum depth by 1 is efficiently encoded in each area of a largest coding unit. According to a result of the determination, whether to split the coding units having the depth that is less than the maximum depth by 1 is determined in each area of the largest coding unit. Afterward, it is determined which one of the coding units having a depth that is less than the maximum depth by 2 and one of the coding units having the maximum depth and the coding units having the depth that is less than the maximum depth by 1, the one having been selected according to the result of the determination, are further efficiently encoded in each area of the largest coding unit. The same determination process is performed on each of coding units having a smaller depth, and finally, whether to split the largest coding unit is determined according to which one of the largest coding unit and a hierarchical structure generated by hierarchically splitting the largest coding unit is further efficiently encoded.

Whether to split the coding unit may be determined from a coding unit having a small depth, during the encoding procedure. For example, coding efficiency of the largest coding unit is compared with coding efficiency of a coding unit of which depth is greater than the largest coding unit by 1, and it is determined which one of the largest coding unit and coding units of which depth is greater than the largest coding unit by 1 is efficiently encoded. When the coding efficiency of the largest coding unit is better, the largest coding unit is not split. When coding efficiency of the coding units of which depth is greater than the largest coding unit by 1 is better, the largest coding unit is split, and the comparison process is equally applied to split coding units.

When coding efficiency is examined from a coding unit having a large depth, calculation is large but a tree structure having high coding efficiency is obtained. On the contrary, when the coding efficiency is examined from a coding unit having a small depth, calculation is small but a tree structure having low coding efficiency is obtained. Therefore, considering coding efficiency and calculation, an algorithm for obtaining a hierarchical tree structure of a largest coding unit may be designed by using various methods.

To determine the efficiency of a coding unit according to each depth, the encoder 110 determines prediction and transformation methods that are most efficient to the coding unit. To determine the most efficient prediction and transformation methods, the coding unit may be split into certain data units. A data unit may have one of various shapes according to a method of splitting the coding unit. The method of splitting the coding unit which is performed to determine the data unit may be defined as a partition mode. For example, when a coding unit of 2N×2N (where N is a positive integer) is no longer split, a size of a prediction unit included in the coding unit is 2N×2N. When the coding unit of 2N×2N is split, the size of the prediction unit included in the coding unit may be 2N×N, N×2N, or N×N, according to the partition mode. The partition mode according to the present embodiment may generate symmetrical data units obtained by symmetrically splitting a height or width of the coding unit, data units obtained by asymmetrically splitting the height or width of the coding unit, such as 1:n or n:1, data units obtained by diagonally splitting the coding unit, data units obtained by geometrically splitting the coding unit, partitions having arbitrary shapes, or the like.

The coding unit may be predicted and transformed based on a data unit included in the coding unit. However, according to the present embodiment, a data unit for prediction and a data unit for transformation may be separately determined. The data unit for prediction may be defined as a prediction unit, and the data unit for transformation may be defined as a transform unit. A partition mode applied to the prediction unit and a partition mode applied to the transform unit may be different from each other, and prediction of the prediction unit and transformation of the transform unit may be performed in a parallel and independent manner in the coding unit.

To determine an efficient prediction method, the coding unit may be split into at least one prediction unit. Equally, to determine an efficient transformation method, the coding unit may be split into at least one transform unit. The split into the prediction unit and the split into the transform unit may be independently performed from each other. However, when a reconstructed sample in the coding unit is used in intra prediction, a dependent relation is formed between prediction units or transform units included in the coding unit, so that the split into the prediction unit and the transform unit may affect each other.

The prediction unit included in the coding unit may be predicted through intra prediction or inter prediction. The intra prediction involves predicting prediction-unit samples by using reference samples adjacent to the prediction unit. The inter prediction involves predicting prediction-unit samples by obtaining reference samples from a reference picture that is referred to by a current picture.

For the intra prediction, the encoder 110 may apply a plurality of intra prediction methods to the prediction unit, thereby selecting the most efficient intra prediction method. The intra prediction method includes directional modes such as a DC mode, a planar mode, a vertical mode, a horizontal mode, or the like.

When a reconstructed sample adjacent to a coding unit is used as a reference sample, the intra prediction may be performed on each prediction unit. However, when a reconstructed sample in the coding unit is used as a reference sample, reconstruction with respect to the reference sample in the coding unit has to precede prediction with respect to a current sample, so that a prediction order of a prediction unit may depend on a transformation order of a transform unit. Therefore, when the reconstructed sample in the coding unit is used as the reference sample, only an intra prediction method for transform units corresponding to the prediction unit, and actual intra prediction may be performed on each transform unit.

The encoder 110 may select the most efficient inter prediction method by determining an optimal motion vector and reference picture. For inter prediction, the encoder 110 may determine a plurality of motion vector candidates from a coding unit that is spatially and temporally adjacent to a current coding unit and may determine, from among them, the most efficient motion vector to be a motion vector. Equally, the encoder 110 may determine a plurality of reference picture candidates from the coding unit that is spatially and temporally adjacent to the current coding unit and may determine the most efficient reference picture from among them. In another embodiment, the reference picture may be determined from reference picture lists that are certain with respect to a current picture. In another embodiment, for accuracy of prediction, the most efficient motion vector from among the plurality of motion vector candidates may be determined to be a prediction motion vector, and a motion vector may be determined by compensating for the prediction motion vector. The inter prediction may be performed in parallel on each prediction unit in the coding unit.

The encoder 110 may reconstruct the coding unit by obtaining only information indicating the motion vector and the reference picture, according to a skip mode. According to the skip mode, all encoding information including a residual signal is skipped, except for the information indicating the motion vector and the reference picture. Since the residual signal is skipped, the skip mode may be used when accuracy of prediction is very high.

A partition mode to be used may be limited according to the prediction method for the prediction unit. For example, only partition modes for a prediction unit having a size of 2N×2N or N×N may be applied to intra prediction, whereas partition modes for a prediction unit having a size of 2N×2N, 2N×N, N×2N, or N×N may be applied to inter prediction. In addition, only a partition mode for a prediction unit having a size of 2N×2N may be applied to a skip mode of the inter prediction. The image encoding apparatus 100 may change a partition mode for each prediction method, according to coding efficiency.

The image encoding apparatus 100 may perform transformation based on a coding unit or a transform unit included in the coding unit. The image encoding apparatus 100 may transform residual data that is a difference value between an original value and a prediction value with respect to pixels included in the coding unit. For example, the image encoding apparatus 100 may perform lossy-compression on the residual data through quantization and discrete cosine transform (DCT)/discrete sine transform (DST). Alternatively, the image encoding apparatus 100 may perform lossless-compression on the residual data without the quantization.

The image encoding apparatus 100 may determine a transform unit that is the most efficient one for quantization and transformation. The transform unit in the coding unit may be recursively split into smaller sized regions in a manner similar to that in which the coding unit is split according to the tree structure, according to an embodiment. Thus, residual data in the coding unit may be split according to the transform unit having the tree structure according to transformation depths. The image encoding apparatus 100 may generate transformation split information regarding splitting the coding unit and the transform unit according to the determined tree structure of the transform unit.

A transformation depth indicating the number of splitting times to reach the transform unit by splitting the height and width of the coding unit may also be set in the image encoding apparatus 100. For example, in a current coding unit of 2N×2N, a transformation depth may be 0 when the size of a transform unit is 2N×2N, may be 1 when the size of the transform unit is N×N, and may be 2 when the size of the transform unit is N/2×N/2. That is, the transform unit according to the tree structure may be set according to the transformation depth.

In conclusion, the encoder 110 determines a prediction method that is the most efficient one for a current prediction unit and is from among a plurality of intra prediction methods and inter prediction methods. Then, the encoder 110 determines a prediction unit determination scheme according to coding efficiency according to a prediction result. Equally, the encoder 110 determines a transform unit determination scheme according to coding efficiency according to a transformation result. According to the most efficient prediction unit and transform unit determination scheme, coding efficiency of a coding unit is finally determined. The encoder 110 finalizes a hierarchical structure of a largest coding unit, according to coding efficiency of a coding unit according to each depth.

The encoder 110 may measure coding efficiency of coding units according to depths, prediction efficiency of prediction methods, or the like by using rate-distortion optimization based on Lagrangian multipliers.

The encoder 110 may generate split information indicating whether to split a coding unit according to each depth according to the determined hierarchical structure of the largest coding unit. Then, the encoder 110 may generate, for split coding units, partition mode information to be used in determining a prediction unit and transform unit split information to be used in determining a transform unit. In addition, when the coding unit may be split by using at least two split methods, the encoder 110 may generate both split information and split shape information that indicates a split method. The encoder 110 may generate information regarding the prediction method and the transformation method that are used in the prediction unit and the transform unit.

The output unit 120 may output, in a bitstream, a plurality of pieces of information generated by the encoder 110 according to the hierarchical structure of the largest coding unit.

A method of determining the coding unit, the prediction unit, and the transform unit according to the tree structure of the largest coding unit will be described below with reference to FIGS. 3 to 12.

Figure 1B:
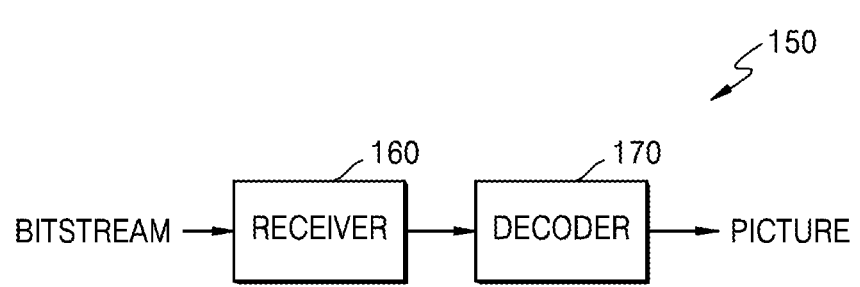
FIG. 1B illustrates a block diagram of a image decoding apparatus based on coding units according to a tree structure, according to an embodiment.

FIG. 1B illustrates a block diagram of an image decoding apparatus 150 based on coding units according to a tree structure, according to an embodiment.

The image decoding apparatus 150 includes a receiver 160 and a decoder 170.

Definitions of the terms including a coding unit, a depth, a prediction unit, a transform unit, various split information, or the like for a decoding operation performed by the image decoding apparatus 150 are equal to those described above with reference to FIG. 1A and the image encoding apparatus 100. Because the image decoding apparatus 150 is designed to reconstruct image data, various encoding methods used by the image encoding apparatus 100 may also be applied to the image decoding apparatus 150.

The receiver 160 receives and parses a bitstream regarding an encoded video. The decoder 170 extracts, from the parsed bitstream, a plurality of pieces of information to be used in decoding largest coding units. The decoder 170 may extract information regarding a largest size of a coding unit of a current picture from a header, a sequence parameter set, or a picture parameter set of the current picture.

Also, the decoder 170 extracts, from the parsed bitstream, a final depth and split information regarding coding units according to a tree structure according to each largest coding unit. The decoder 170 may split a largest coding unit according to the extracted final depth and split information, thereby determining a tree structure of the largest coding unit.

The split information extracted by the decoder 170 is split information regarding the tree structure determined to generate a minimum encoding error, the determination being performed by the image encoding apparatus 100. Therefore, the image decoding apparatus 150 may reconstruct an image by decoding data according to a decoding scheme that generates the minimum encoding error.

The decoder 170 may extract split information regarding a data unit such as a prediction unit and a transform unit included in the coding unit. For example, the decoder 170 may extract partition mode information regarding a partition mode that is the most efficient one for the prediction unit. The decoder 170 may extract transformation split information regarding a tree structure that is the most efficient one for the transform unit.

Also, the decoder 170 may obtain information regarding the most efficient prediction method with respect to prediction units split from the coding unit. Then, the decoder 170 may obtain information regarding the most efficient transformation method with respect to transform units split from the coding unit.

The decoder 170 extracts the information from the bitstream, according to a method of configuring the bitstream, the method being performed by the output unit 120 of the image encoding apparatus 100.

The decoder 170 may split a largest coding unit into coding units having the most efficient tree structure, based on the split information. Then, the decoder 170 may split the coding unit into the prediction units according to the partition mode information. The decoder 170 may split the coding unit into the transform units according to the transformation split information.

The decoder 170 may predict the prediction units according to the information regarding the prediction method. The decoder 170 may perform inverse quantization and inverse transformation on residual data that is a difference between an original value and a prediction value of a pixel, according to information regarding a method of transforming a transform unit. Also, the decoder 170 may reconstruct pixels of the coding unit, according to a result of the prediction on the prediction units and a result of the transformation on the transform units.

Figure 2A:
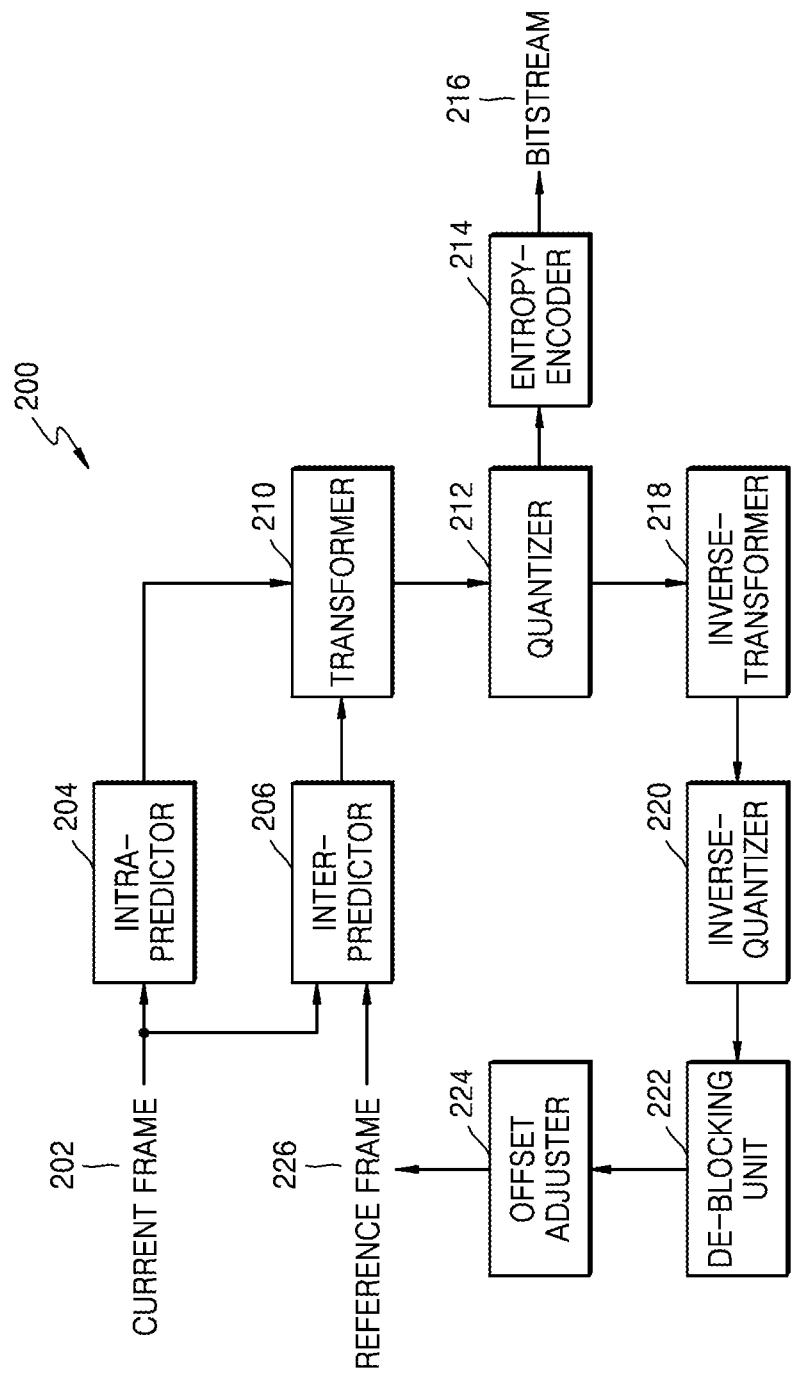
FIG. 2A illustrates a block diagram of an image encoder 200 based on coding units, according to various embodiments.

FIG. 2A illustrates a block diagram of an image encoder 200 based on coding units, according to various embodiments.

The image encoder 200 according to an embodiment performs operations for the encoder 110 of the image encoding apparatus 100 to encode image data. That is, an intra-predictor 204 performs intra prediction on a coding unit of an intra mode in a current frame 202, and an inter-predictor 206 performs inter prediction by using the current frame 202 and a reference frame 226 of an inter mode.

Prediction error data determined according to prediction performed by the intra-predictor 204 or the inter-predictor 206 is output as a quantized transform coefficient through a transformer 210 and a quantizer 212. The quantized transform coefficient is reconstructed as prediction error data of a spatial domain through an inverse-transformer 218 and an inverse-quantizer 220, and the reconstructed prediction error data of the spatial domain is post-processed through a de-blocking unit 222 and an offset adjuster 224. The post-processed prediction error data is combined with prediction data obtained by the intra-predictor 204 or the inter-predictor 206, such that the reference frame 226 is generated. The quantized transform coefficient may pass through an entropy-encoder 214 and may be output as a bitstream 216.

The intra-predictor 204, the inter-predictor 206, the transformer 210, the quantizer 212, the entropy-encoder 214, the inverse-transformer 218, the inverse-quantizer 220, the de-blocking unit 222, and the offset adjuster 224, which are elements of the image encoder 200, are performed on each of coding units according to a tree structure of an image.

In particular, the intra-predictor 204 and the inter-predictor 206 determine a partition and a prediction mode of each of the coding units according to a tree structure by considering a largest size and a maximum depth of a current largest coding unit, and the transformer 210 determines a size of a transform unit in each of the coding units according to a tree structure.

Figure 2B:
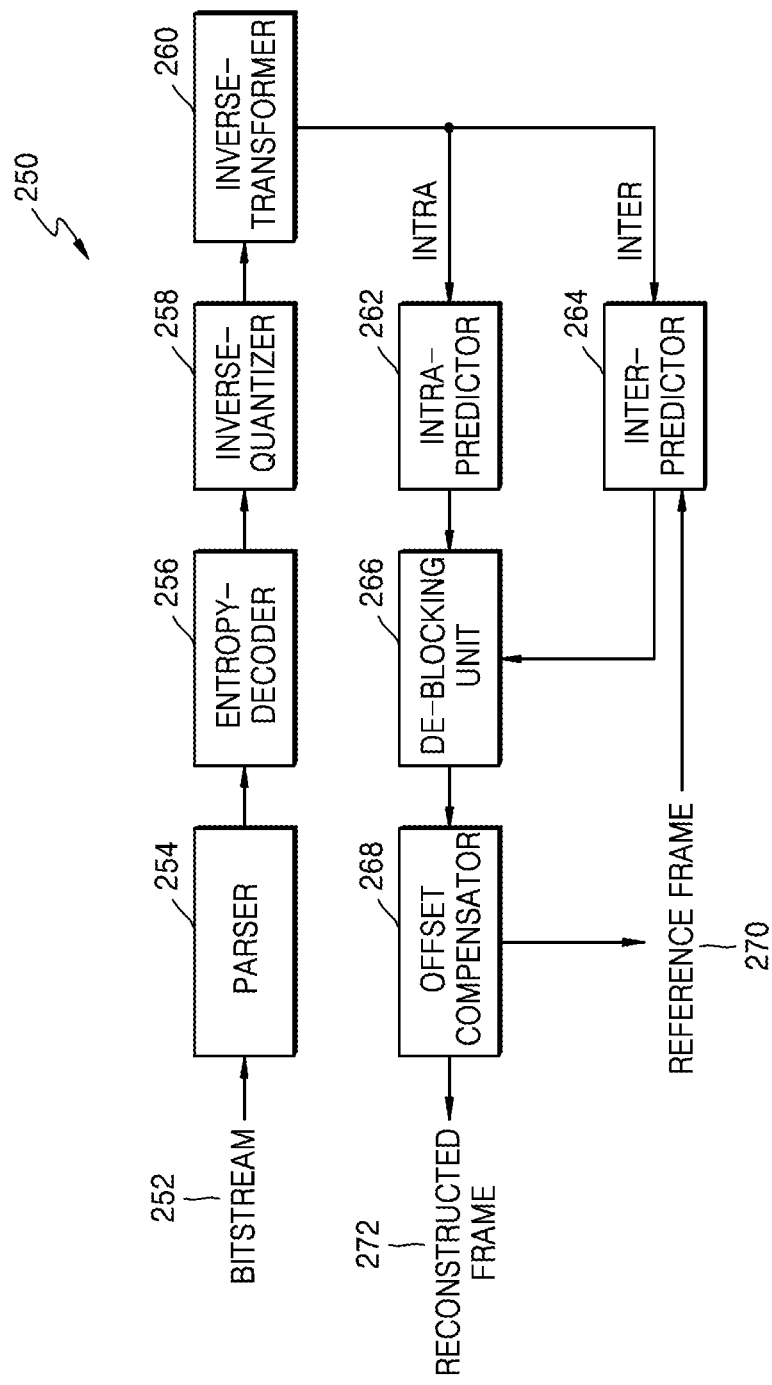
FIG. 2B illustrates a block diagram of an image decoder 250 based on coding units, according to various embodiment.

FIG. 2B illustrates a block diagram of an image decoder 250 based on coding units, according to various embodiments.

A bitstream 252 passes through a parser 254 and then encoded image data that is a decoding target and encoding information required for decoding are parsed. The encoded image data passes through an entropy-decoder 256 and an inverse-quantizer 258 and then is output as quantized data, and the quantized data passes through an inverse-transformer 260 and then prediction error data of a spatial domain is reconstructed.

With respect to the prediction error data of the spatial domain, an intra-predictor 262 performs intra prediction on a coding unit of an intra mode, and an inter-predictor 264 performs inter prediction on a coding unit of an inter mode by using a reference frame 270.

Prediction data predicted by the intra-predictor 262 and the inter-predictor 264 is post-processed through a de-blocking unit 266 and an offset compensator 268. The post-processed prediction data and the prediction error data are combined such that a reconstructed frame 272 may be generated.

In order for the decoder 170 of the image decoding apparatus 150 to decode image data, operations may be sequentially performed from the parser 254 of the image decoder 250 according to an embodiment.

The parser 254, the entropy-decoder 256, the inverse-quantizer 258, the inverse-transformer 260, the intra-predictor 262, the inter-predictor 264, the de-blocking unit 266, and the offset compensator 268, which are elements of the image decoding apparatus 150, are performed on each of coding units according to a tree structure of an image.

In particular, the intra-predictor 262 and the inter-predictor 264 determine a partition and a prediction mode of each of the coding units according to a tree structure, and the inverse-transformer 260 determines a size of a transform unit in each of the coding units.

Figure 3:
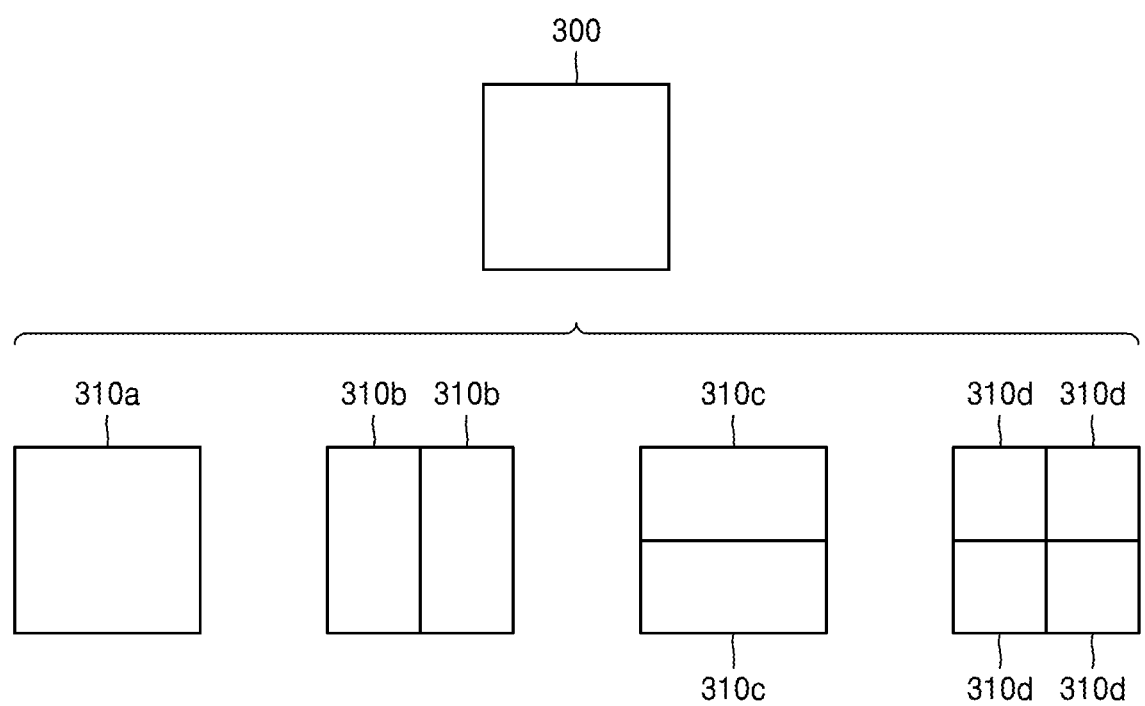
FIG. 3 illustrates a process of determining at least one coding unit when a coding unit having a non-square shape is split, according to an embodiment.

FIG. 3 illustrates a process of determining at least one coding unit when the image decoding apparatus 150 splits a current coding unit, according to an embodiment.

According to the present embodiment, the image decoding apparatus 150 may determine, by using block shape information, a shape of a coding unit, and may determine, by using split shape information, a shape according to which the coding unit is to be split. That is, a method of splitting a coding unit, which is indicated by the split shape information, may be determined based on which block shape is indicated by the block shape information used by the image decoding apparatus 150.

According to the present embodiment, the image decoding apparatus 150 may use the block shape information indicating that a current coding unit has a square shape. For example, the image decoding apparatus 150 may determine whether to split a square coding unit or not, whether to split the square coding unit vertically, whether to split the square coding unit horizontally, or whether to split the square coding unit into four coding units, according to the split shape information. Referring to FIG. 3, when block shape information of a current coding unit 300 indicates a square shape, the decoder 170 may not split a coding unit 310a having the same size as the current coding unit 300 according to split shape information indicating no split, or may determine coding units 310b, 310c, and 310d split based on split shape information indicating a certain split method.

Referring to FIG. 3, the image decoding apparatus 150 may determine the two coding units 310b obtained by splitting the current coding unit 300 in a vertical direction based on split shape information indicating split in a vertical direction, according to an embodiment. The image decoding apparatus 150 may determine the two coding units 310c obtained by splitting the current coding unit 300 in a horizontal direction based on split shape information indicating split in a horizontal direction. The image decoding apparatus 150 may determine the four coding units 310d obtained by splitting the current coding unit 300 in vertical and horizontal directions based on split shape information indicating split in vertical and horizontal directions. However, a split shape for splitting a square coding unit may not be limitedly interpreted to the shapes above, and may include various shapes indicatable by split shape information. Certain split shapes for splitting a square coding unit will be described in detail below through various embodiments.

Figure 4:
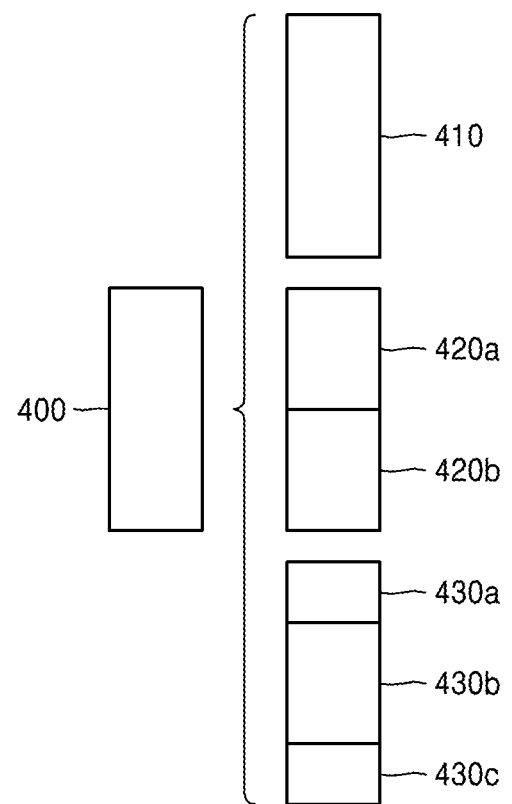
FIG. 4 illustrates a process of splitting a coding unit based on at least one of block shape information and split shape information, according to an embodiment.
Figure 4:
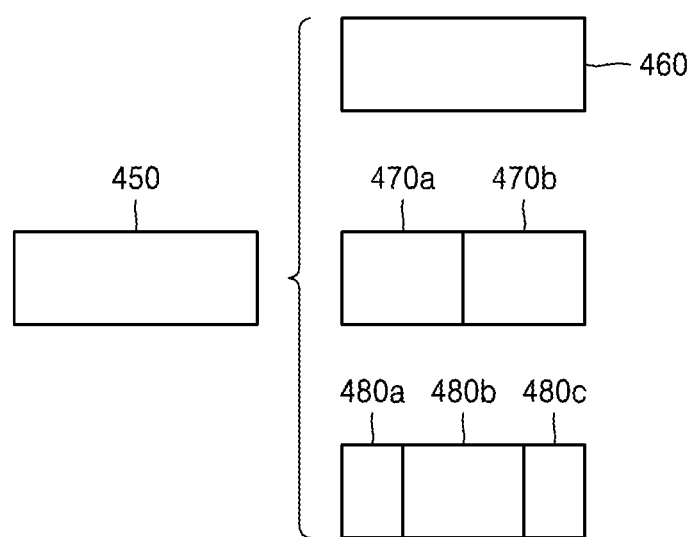

FIG. 4 illustrates a process of determining at least one coding unit when the image decoding apparatus 150 splits a coding unit having non-square shape, according to an embodiment.

According to the present embodiment, the image decoding apparatus 150 may use block shape information indicating that a current coding unit has a non-square shape. The image decoding apparatus 150 may determine whether or not to split the current coding unit having the non-square shape, or whether to split the current coding unit having the non-square shape by using a certain method. Referring to FIG. 4, when block shape information of a current coding unit 400 or 450 indicates a non-square shape, the image decoding apparatus 150 may not split a coding unit 410 or 460 having the same size as the current coding unit 400 or 450 according to split shape information indicating no split, or may determine coding units 420a, 420b, 430a, 430b, 430c, 470a, 470b, 480a, 480b, and 480c split according to split shape information indicating a certain split method. A certain split method of splitting a non-square coding unit will be described in detail below through various embodiments.

According to the present embodiment, the image decoding apparatus 150 may determine, by using the split shape information, a shape of a coding unit is split, and in this case, the split shape information may indicate the number of at least one coding unit generated when a coding unit is split. Referring to FIG. 4, when the split shape information indicates that the current coding unit 400 or 450 is split into two coding units, the image decoding apparatus 150 may determine the two coding units 420a and 420b or 470a and 470b, which are respectively included in the current coding unit 400 or 450 by splitting the current coding unit 400 or 450 based on the split shape information.

According to the present embodiment, when the image decoding apparatus 150 splits the current coding unit 400 or 450 having the non-square shape based on the split shape information, the image decoding apparatus 150 may split the current coding unit 400 or 450 having the non-square shape considering a location of a longer side. For example, the image decoding apparatus 150 may determine a plurality of coding units by splitting the current coding unit 400 or 450 in a direction of splitting the longer sides of the current coding unit 400 or 450 considering the shape of the current coding unit 400 or 450.

According to the present embodiment, when split shape information indicates that a coding unit is split into an odd number of blocks, the image decoding apparatus 150 may determine an odd number of coding units included in the current coding unit 400 or 450. For example, when split shape information indicates that the current coding unit 400 or 450 is split into three coding units, the image decoding apparatus 150 may split the current coding unit 400 or 450 into the three coding units 430a, 430b, 430c, 480a, 480b, and 480c. According to the present embodiment, the image decoding apparatus 150 may determine the odd number of coding units included in the current coding unit 400 or 450, wherein sizes of the determined coding units are not the same. For example, a size of the coding unit 430b or 480b from among the odd number of coding units 430a, 430b, 430c, 480a, 480b, and 480c may be different from sizes of the coding units 430a, 430c, 480a, and 480c. That is, coding units that may be determined when the current coding unit 400 or 450 is split may have different types of sizes.

According to the present embodiment, when split shape information indicates that a coding unit is split into an odd number of blocks, the image decoding apparatus 150 may determine an odd number of coding units included in the current coding unit 400 or 450 and in addition, set a certain limit on at least one coding unit from among the odd number of coding units generated by splitting the current coding unit 400 or 450. Referring to FIG. 4, the image decoding apparatus 150 may decode the coding unit 430b or 480b at the center of the three coding units 430a, 430b, and 430c or 480a, 480b, and 480c generated when the current coding unit 400 or 450 is split in a different manner from the coding units 430a and 430c or 480a and 480c. For example, the image decoding apparatus 150 may limit the coding unit 430b or 480b at the center not to be further split unlike the coding units 430a and 430c or 480a and 480c, or to be split only a certain number of times.

Figure 5:
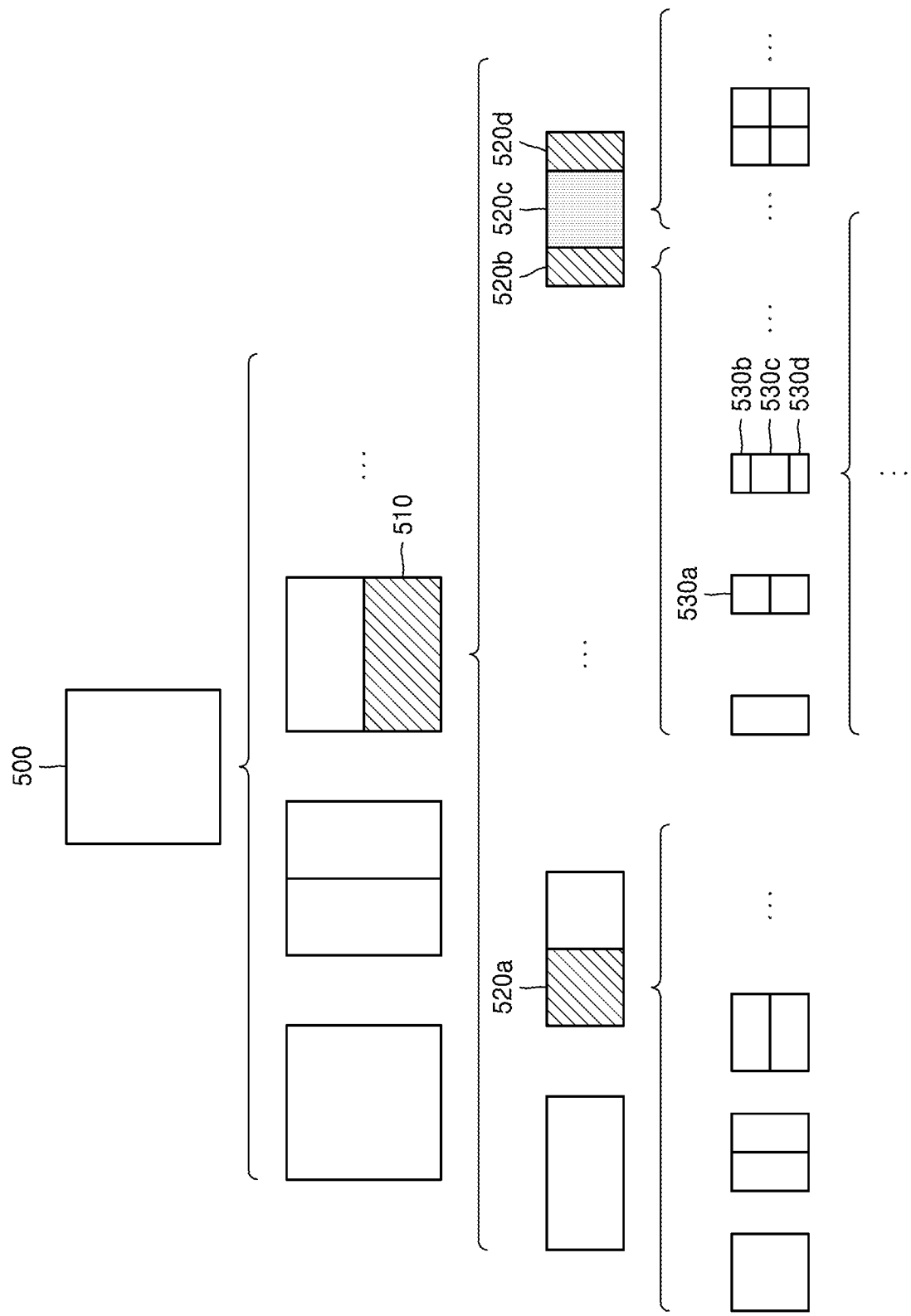
FIG. 5 illustrates a method of determining a certain coding unit from among an odd number of coding units, according to an embodiment.

FIG. 5 illustrates a process of splitting, by the image decoding apparatus 150, a coding unit based on at least one of block shape information and split shape information, according to an embodiment.

According to the present embodiment, the image decoding apparatus 150 may determine whether to split a first coding unit 500 having a square shape into coding units based on at least one of block shape information and split shape information. According to the present embodiment, when the split shape information indicates splitting of the first coding unit 500 in a horizontal direction, the image decoding apparatus 150 may determine a second coding unit 510 by splitting the first coding unit 500 in the horizontal direction. The terms "first coding unit", "second coding unit", and "third coding unit" according to an embodiment are used in the context of splitting a coding unit. For example, a second coding unit may be determined when a first coding unit is split and a third coding unit may be determined when the second coding unit is split. Relationships between the first through third coding units used hereinafter may be understood to follow the above order characteristics.

According to the embodiment, the image decoding apparatus 150 may determine whether to split the determined second coding unit 510 into coding units based on at least one of block shape information and split shape information. Referring to FIG. 5, the image decoding apparatus 150 may split the second coding unit 510, which has a non-square shape determined by splitting the first coding unit 500, into at least one third coding unit, for example, third coding units 520a, 520b, 520c, and 520d, based on at least one of block shape information and split shape information, or may not split the second coding unit 510. The image decoding apparatus 150 may obtain at least one of block shape information and split shape information, the image decoding apparatus 150 may split the first coding unit 500 based on at least one of the block shape information and the split shape information to obtain a plurality of second coding units (for example, the second coding unit 510) having various shapes, and the second coding unit 510 may be split according to a manner of splitting the first coding unit 500 based on at least one of the block shape information and the split shape information. According to the present embodiment, when the first coding unit 500 is split into the second coding units 510 based on at least one of block shape information and split shape information about the first coding unit 500, the second coding unit 510 may also be split into the third coding units, for example, the third coding units 520a, 520b, 520c, and 520d, based on at least one of block shape information and split shape information about the second coding unit 510. That is, a coding unit may be recursively split based on at least one of split shape information and block shape information related to the coding unit. A method used to recursively split a coding unit will be described below through various embodiments.

According to the present embodiment, the image decoding apparatus 150 may determine to split each of the third coding units (for example, the third coding units 520a, 520b, 520c, and 520d) into coding units or not to split the second coding unit 510 based on at least one of block shape information and split shape information. The image decoding apparatus 150 may split the second coding unit 510 having a non-square shape into the odd number of third coding units 520b, 520c, and 520d. The image decoding apparatus 150 may set a certain limitation on a certain third coding unit from among the odd number of third coding units 520b, 520c, and 520d. For example, the image decoding apparatus 150 may limit the coding unit 520c located at the center from among the odd number of third coding units 520b, 520c, and 520d to be split no more or to be split to a settable number of times. Referring to FIG. 5, the image decoding apparatus 150 may limit the coding unit 520c located at the center from among the odd number of third coding units 520b, 520c, and 520d included in the second coding unit 510 having a non-square shape to be split no more, to be split into a certain split manner (for example, split only into four coding units or split into a shape corresponding to that into which the second coding unit 510 is split), or to be split only a certain number of times (for example, split only n times, wherein n>0). However, the limitations on the coding unit 520c located at the center are simply embodiments, and thus the present disclosure should not be interpreted limitedly to the above embodiments, and it should be interpreted that the limitations include various limitations of decoding the coding unit 520c located at the center differently from the coding units 520b and 520d.

Figure 6:
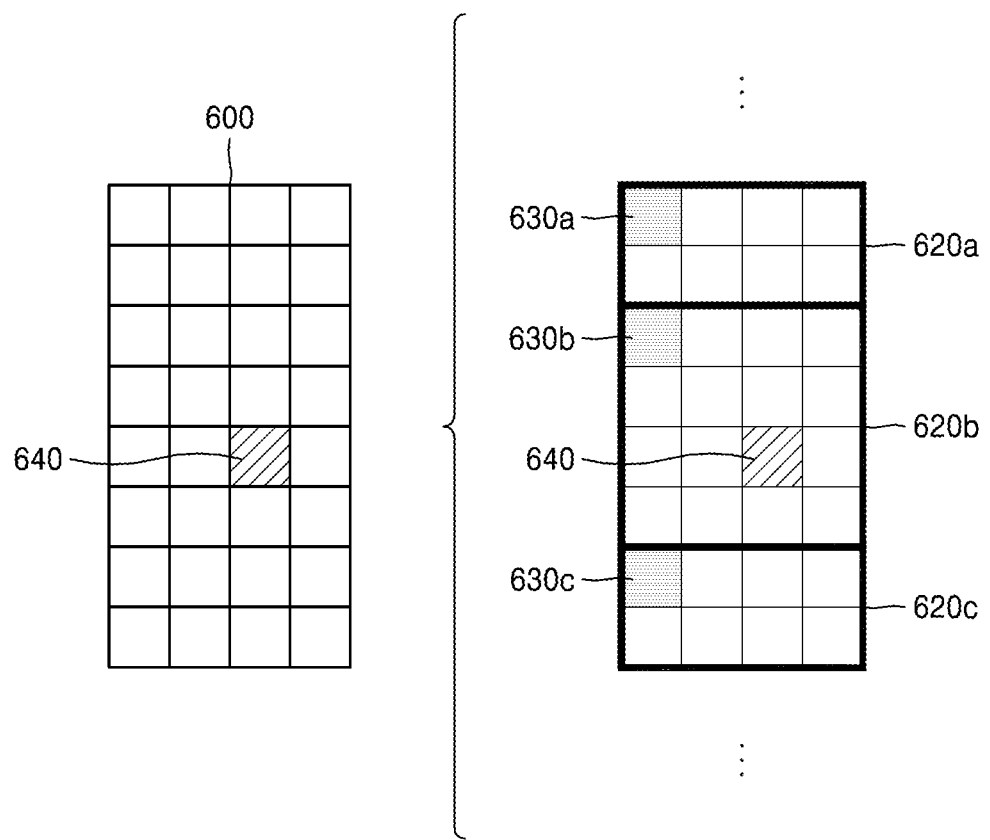
FIG. 6 illustrates an order of processing a plurality of coding units when the plurality of coding units are determined when a current coding unit is split, according to an embodiment.

FIG. 6 illustrates a method of determining, by the image decoding apparatus 150, a coding unit at a certain location from among an odd number of coding units, according to an embodiment.

According to the present embodiment, the image decoding apparatus 150 may use information indicating a location of each of an odd number of coding units so as to determine a coding unit located at the center of the odd number of coding units. Referring to FIG. 6, the image decoding apparatus 150 may determine an odd number of coding units 620a, 620b, and 620c by splitting a current coding unit 600. The image decoding apparatus 150 may determine the coding unit 620b at the center by using information about locations of the odd number of coding units 620a, 620b, and 620c. For example, the image decoding apparatus 150 may determine the coding unit 620b located at the center by determining locations of the coding units 620a, 620b, and 620c based on information indicating locations of certain samples included in the coding units 620a, 620b, and 620c. In detail, the image decoding apparatus 150 may determine the coding unit 620b located at the center by determining the locations of the coding units 620a, 620b, and 620c based on information indicating locations of upper left samples 630a, 630b, and 630c of the coding units 620a, 620b, and 620c.

According to the present embodiment, the information indicating the locations of the upper left samples 630a, 630b, and 630c respectively included in the coding units 620a, 620b, and 620c may include information about locations or coordinates in a picture of the coding units 620a, 620b, and 620c. According to the present embodiment, the information indicating the locations of the upper left samples 630a, 630b, and 630c respectively included in the coding units 620a, 620b, and 620c may include information indicating widths or heights of the coding units 620a, 620b, and 620c included in the current coding unit 600, wherein the widths or heights may correspond to information indicating differences between coordinates in the picture of the coding units 620a, 620b, and 620c. That is, the image decoding apparatus 150 may determine the coding unit 620b located at the center by directly using the information about the locations or coordinates in the picture of the coding units 620a, 620b, and 620c, or by using the information about the widths or heights of the coding units, which indicate difference values between coordinates.

According to the present embodiment, the information indicating the location of the upper left sample 630a of the top coding unit 620a may indicate (xa, ya) coordinates, information indicating the location of the upper left sample 630b of the center coding unit 620b may indicate (xb, yb) coordinates, and the information indicating the location of the upper left sample 630c of the bottom coding unit 620c may indicate (xc, yc) coordinates. The image decoding apparatus 150 may determine the center coding unit 620b by using the coordinates of the upper left samples 630a, 630b, and 630c respectively included in the coding units 620a, 620b, and 620c. For example, when the coordinates of the upper left samples 630a, 630b, and 630c are aligned in an ascending order or descending order, the center coding unit 620b including (xb, yb) that is coordinates of the upper left sample 630b may be determined as a coding unit located at the center from among the coding units 620a, 620b, and 620c determined when the current coding unit 600 is split. Here, the coordinates indicating the locations of the upper left samples 630a, 630b, and 630c may indicate coordinates indicating absolute locations in the picture, and further, may use (dxb, dyb) coordinates that are information indicating a relative location of the upper left sample 630b of the center coding unit 620b and (dxc, dyc) coordinates that are information indicating a relative location of the upper left sample 630c of the bottom coding unit 620c, based on the location of the upper left sample 630c of the top coding unit 620a. Also, a method of determining a coding unit at a certain location by using coordinates of a sample included in a coding unit as information indicating a location of the sample should not be limitedly interpreted to the above method, and may be interpreted to various arithmetic methods capable of using coordinates of a sample.

According to the embodiment, the image decoding apparatus 150 may split the current coding unit 600 into the plurality of coding units 620a, 620b, and 620c, and select a coding unit from among the coding units 620a, 620b, and 620c according to a certain criterion. For example, the image decoding apparatus 150 may select the coding unit 620b that has a different size from among the coding units 620a, 620b, and 620c.

According to the present embodiment, the image decoding apparatus 150 may determine the width or height of each of the coding units 620a, 620b, and 620c by using the (xa, ya) coordinates that are the information indicating the location of the upper left sample 630a of the top coding unit 620a, the (xb, yb) coordinates that are the information indicating the location of the upper left sample 630b of the center coding unit 620b, and the (xc, yc) coordinates that are the information indicating the location of the upper left sample 630c of the bottom coding unit 620c. The image decoding apparatus 150 may determine a size of each of the coding units 620a, 620b, and 620c by using the coordinates (xa, ya), (xb, yb), and (xc, yc) indicating the locations of the coding units 620a, 620b, and 620c.

According to an embodiment, the image decoding apparatus 150 may determine the width of the top coding unit 620a to be xb-xa and the height to be yb-ya. According to the embodiment, the image decoding apparatus 150 may determine the width of the center coding unit 620b to be xc-xb and the height to be yc-yb. According to the present embodiment, the image decoding apparatus 150 may determine the width or height of the bottom coding unit by using the width or height of the current coding unit, and the width and height of the top coding unit 620a and the center coding unit 620b. The image decoding apparatus 150 may determine one coding unit having a size different from other coding units based on the determined widths and heights of the coding units 620a, 620b, and 620c. Referring to FIG. 5, the image decoding apparatus 150 may determine, as the coding unit at the certain location, the center coding unit 620b having a size different from sizes of the top coding unit 620a and the bottom coding unit 620c. However, since a process of determining, by the image decoding apparatus 150, a coding unit having a size different from other coding units is only an embodiment of determining a coding unit at a certain location by using sizes of coding units determined based on sample coordinates, various processes of determining a coding unit at a certain location by comparing sizes of coding units determined according to certain sample coordinates may be used.

However, a location of a sample considered to determine a location of a coding unit should not be limitedly interpreted to the upper left, but may be interpreted that information about a location of an arbitrary sample included in a coding unit is usable.

According to the embodiment, the image decoding apparatus 150 may select a coding unit at a certain location from among an odd number of coding units that are determined when a current coding unit is split, considering a shape of the current coding unit. For example, when the current coding unit has a non-square shape in which a width is longer than a height, the image decoding apparatus 150 may determine the coding unit at the certain location in a horizontal direction. In other words, the image decoding apparatus 150 may determine a coding unit from among coding units having different locations in the horizontal direction and may set a limitation on the coding unit. When the current coding unit has the non-square shape in which the height is longer than the width, the image decoding apparatus 150 may determine the coding unit at the certain location in a vertical direction. In other words, the image decoding apparatus 150 may determine a coding unit from among coding units having different locations in the vertical direction and set a limitation on the coding unit.

According to the present embodiment, the image decoding apparatus 150 may use information indicating a location of each of an even number of coding units so as to determine a coding unit at a certain location from among the even number of coding units. The image decoding apparatus 150 may determine the even number of coding units by splitting a current coding unit and determine the coding unit at the certain location by using the information about the locations of the even number of coding units. Detailed processes thereof may correspond to processes of determining a coding unit at a certain location (for example, a center location) from among an odd number of coding units, which have been described above with reference to FIG. 6, and thus descriptions thereof are not provided again.

According to the present embodiment, when a current coding unit having a non-square shape is split into a plurality of coding units, certain information about a coding unit at a certain location may be used during a split process so as to determine the coding unit at the certain location from among the plurality of coding units. For example, the image decoding apparatus 150 may use at least one of block shape information and split shape information, which are stored in a sample included in a center coding unit during a split process so as to determine a coding unit located at the center from among a plurality of coding units obtained by splitting a current coding unit.

Referring to FIG. 5, the image decoding apparatus 150 may split the current coding unit 600 into the plurality of coding units 620*a*, 620*b*, and 620*c* based on at least one of block shape information and split shape information and determine the coding unit 620*b* located at the center from among the plurality of coding units 620*a*, 620*b*, and 620*c*. In addition, the image decoding apparatus 150 may determine the coding unit 620*b* located at the center considering a location where at least one of the block shape information and the split shape information is obtained. That is, at least one of the block shape information and the split shape information of the current coding unit 600 may be obtained from the sample 640 located at the center of the current coding unit 600, and when the current coding unit 600 is split into the plurality of coding units 620*a*, 620*b*, and 620*c* based on at least one of the block shape information and the split shape information, the coding unit 620*b* including the sample 640 may be determined as the coding unit located at the center. However, information used to determine a coding unit located at the center should not be limitedly interpreted to at least one of block shape information and split shape information, and various types of information may be used during a process of determining a coding unit located at the center.

According to the present embodiment, certain information for identifying a coding unit at a certain location may be obtained from a certain sample included in a coding unit to be determined. Referring to FIG. 6, the image decoding apparatus 150 may use at least one of block shape information and split shape information obtained from a sample located at a certain location in the current coding unit 600 (for example, a sample located at the center of the current coding unit 600) so as to determine a coding unit at a certain location from among the plurality of coding units 620*a*, 620*b*, and 620*c* determined when the current coding unit 600 is split (for example, a coding unit located at the center from among the plurality of coding units). That is, the image decoding apparatus 150 may determine the sample at the certain location considering a block shape of the current coding unit 600, and the image decoding apparatus 150 may determine and set a certain limitation on the coding unit 620*b* including the sample from which certain location (for example, at least one of the block shape information and the split shape information) is obtained, from among the plurality of coding units 620*a*, 620*b*, and 620*c* determined when the current coding unit 600 is split. Referring to FIG. 6, the image decoding apparatus 150 may determine the sample 640 located at the center of the current coding unit 600, as the sample from which the certain information is obtained, and the image decoding apparatus 150 may set the certain location during a decoding process, on the coding unit 620*b* including the sample 640. However, a location of a sample from which certain information is obtained should not be limitedly interpreted to the above location, and the sample may be interpreted to samples at arbitrary locations included in the coding unit 620 determined to be limited.

According to the present embodiment, a location of a sample from which certain location is obtained may be determined based on a shape of the current coding unit 600. According to the present embodiment, block shape information may be used to determine whether a shape of a current coding unit is a square or a non-square, and a location of a sample from which certain information is obtained may be determined based on the shape. For example, the image decoding apparatus 150 may determine, as a sample from which certain information is obtained, a sample located on a boundary of splitting at least one of a width and a height of a current coding unit into halves by using at least one of information about the width of the current coding unit and information about the height of the current coding unit. As another example, when block shape information about a current coding unit indicates a non-square shape, the image decoding apparatus 150 may determine, as a sample from which certain information is obtained, one of samples adjacent to a boundary of splitting a longer side of the current coding unit into halves.

According to the present embodiment, when a current coding unit is split into a plurality of coding units, the image decoding apparatus 150 may use at least one of block shape information and split shape information so as to determine a coding unit at a certain location from among the plurality of coding units. According to an embodiment, the image decoding apparatus 150 may obtain at least one of the block shape information and the split shape information from a sample at a certain location included in the coding unit, and the image decoding apparatus 150 may split the plurality of coding units generated when the current coding unit is split by using at least one of the split shape information and the block shape information obtained from the sample at the certain location included in each of the plurality of coding units. In other words, the coding unit may be recursively split by using at least one of the block shape information and the split shape information obtained from the sample at the certain location in each coding unit. Since a recursive split process of a coding unit has been described above with reference to FIG. 4, details thereof are not provided again.

According to the present embodiment, the image decoding apparatus 150 may determine at least one coding unit by splitting a current coding unit and determine an order of decoding the at least one coding unit according to a certain block (for example, a current coding unit).

Figure 7:
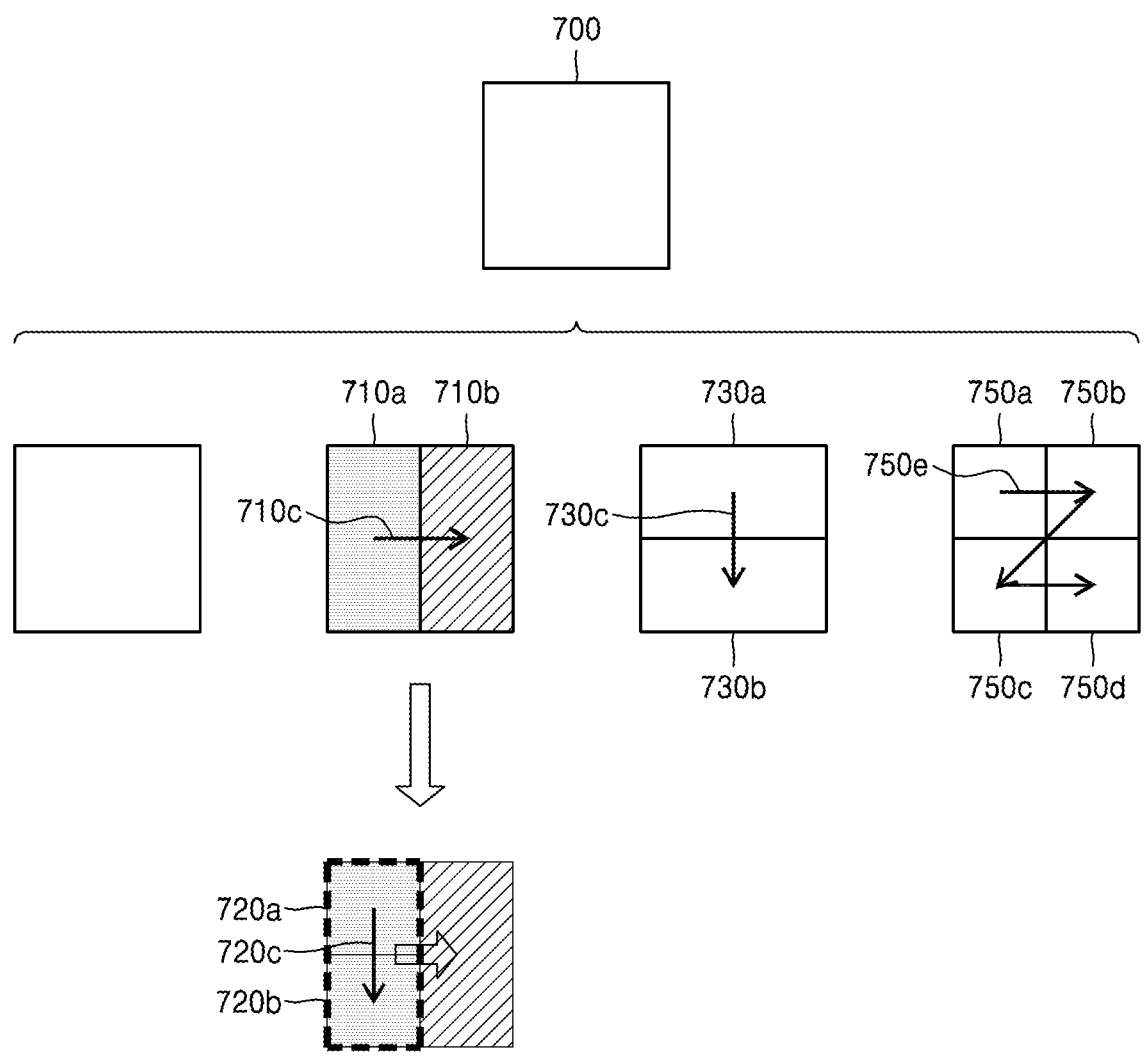
FIG. 7 illustrates a process of determining that a current coding unit is split into an odd number of coding units when coding units are unable to be processed in a certain order, according to an embodiment.

FIG. 7 illustrates an order of processing a plurality of coding units when the image decoding apparatus 150 determines the plurality of coding units by splitting a current coding unit, according to an embodiment.

According to the embodiment, the image decoding apparatus 150 may determine, according to block shape information and split shape information, second coding units 710*a* and 710*b* by splitting a first coding unit 700 in a vertical direction, second coding units 730*a* and 730*b* by splitting the first coding unit 700 in a horizontal direction, or second coding units 750a, 750b, 750c, and 750d by splitting the first coding unit 700 in vertical and horizontal directions.

Referring to FIG. 7, the image decoding apparatus 150 may determine an order such that the second coding units 710a and 710b determined by splitting the first coding unit 700 in the vertical direction to be processed in a horizontal direction 710c. The image decoding apparatus 150 may determine a processing order of the second coding units 730a and 730b determined by splitting the first coding unit 600 in the horizontal direction to be in a vertical direction 730c. The image decoding apparatus 150 may determine the second coding units 750a, 750b, 750c, and 750d determined by splitting the first coding unit 700 in the vertical and horizontal directions to be processed according to a certain order (for example, a raster scan order or a z-scan order 650e) in which coding units in one row are processed and then coding units in a next row are processed.

According to the embodiment, the image decoding apparatus 150 may recursively split coding units. Referring to FIG. 7, the image decoding apparatus 150 may determine a plurality of coding units 710a, 710b, 730a, 730b, 750a, 750b, 750c, and 750d by splitting the first coding unit 700 and may recursively split each of the determined plurality of coding units 710a, 710b, 730a, 730b, 750a, 750b, 750c, and 750d. A method of splitting the plurality of coding units 710a, 710b, 730a, 730b, 750a, 750b, 750c, and 750d may be similar to a method of splitting the first coding unit 700. Accordingly, the plurality of coding units 710a, 710b, 730a, 730b, 750a, 750b, 750c, and 750d may each be independently split into a plurality of coding units. Referring to FIG. 7, the image decoding apparatus 150 may determine the second coding units 710a and 710b by splitting the first coding unit 700 in the vertical direction, and in addition, may determine to split or not to split each of the second coding units 710a and 710b independently.

According to the present embodiment, the image decoding apparatus 150 may split the left second coding unit 710a in the horizontal direction to obtain third coding units 720a and 720b and may not split the right second coding unit 710b.

According to the present embodiment, a processing order of coding units may be determined based on a split process of coding units. In other words, a processing order of split coding units may be determined based on a processing order of coding units just before being split. The image decoding apparatus 150 may determine an order of processing the third coding units 720a and 720b determined when the left second coding unit 710a is split independently from the right second coding unit 710b. Since the third coding units 720a and 720b are determined when the left second coding unit 710a is split in the horizontal direction, the third coding units 720a and 720b may be processed in a vertical direction 720c. Also, since the order of processing the left second coding unit 710a and the right second coding unit 710b is in the horizontal direction 710c, the third coding units 720a and 720b included in the left second coding unit 710a may be processed in the vertical direction 720c and then the right second coding unit 710b may be processed. Because the above descriptions are for describing a process of determining a processing order according to coding units before being split, the process should not be limitedly interpreted to the above embodiments, and various methods of independently processing coding units split and determined in various shapes according to a certain order may be used.

Figure 8:
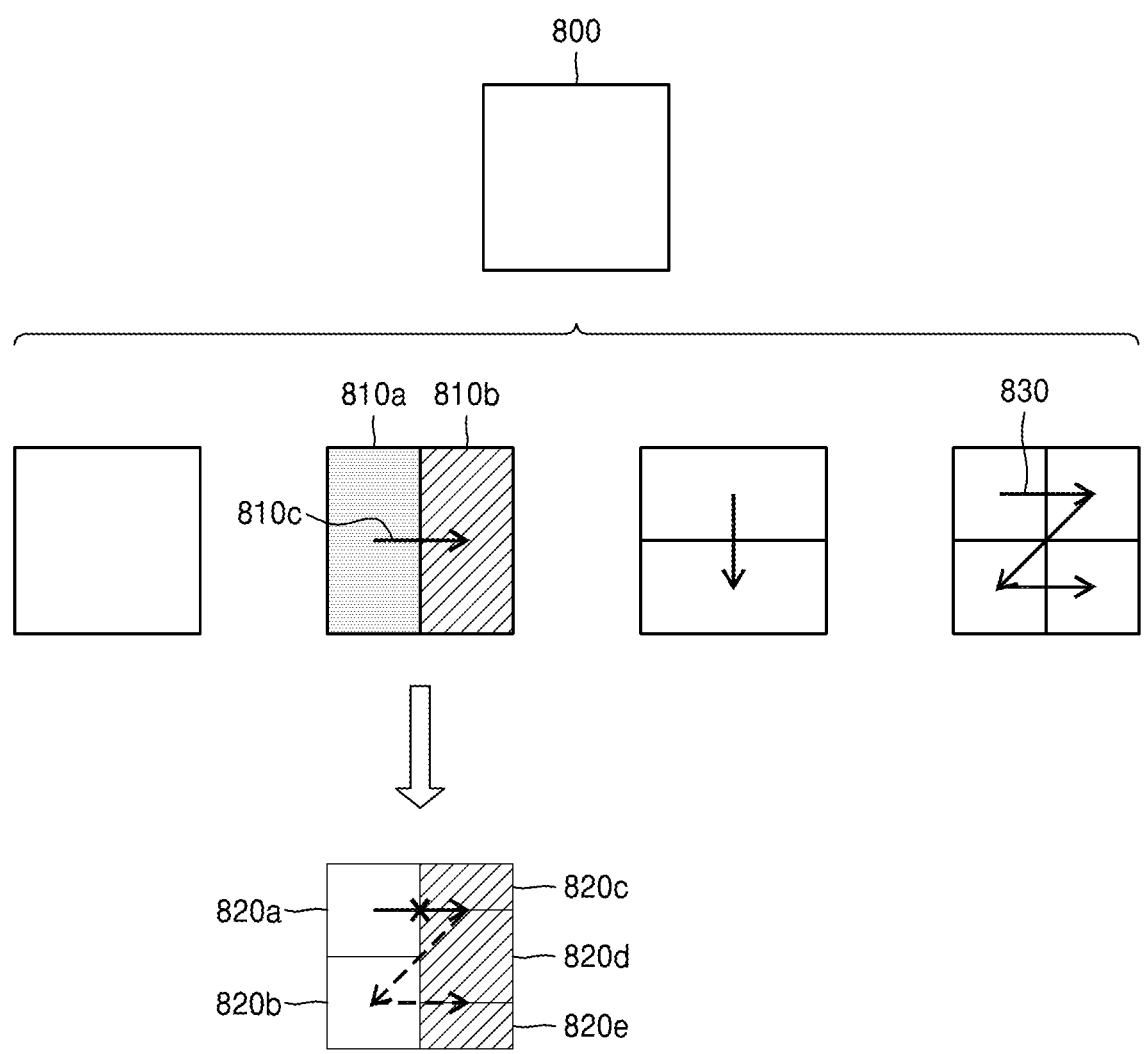
FIG. 8 illustrates a process of determining at least one coding unit when a first coding unit is split, according to an embodiment.

FIG. 8 illustrates a process of determining, by the image decoding apparatus 150, that a current coding unit is split into an odd number of coding units when coding units are unable to be processed in a certain order, according to an embodiment.

According to the present embodiment, the image decoding apparatus 150 may determine that the current coding unit is split into the odd number of coding units based on obtained block shape information and split shape information. Referring to FIG. 8, a first coding unit 800 having a square shape may be split into second coding units 810a and 810b having non-square shapes, and the second coding units 810a and 810b may be independently split into third coding units 820a, 820b, 820c, 820d, and 820e. According to the present embodiment, the image decoding apparatus 150 may determine a plurality of the third coding units 820a and 820b by splitting the left coding unit 810a from among the second coding units in a horizontal direction, and the right coding unit 810b may be split into an odd number of the third coding units 820c, 820d, and 820e.

According to the present embodiment, the image decoding apparatus 150 may determine whether a coding unit split into an odd number exists by determining whether the third coding units 820a, 820b, 820c, 820d, and 820e are processable in a certain order. Referring to FIG. 8, the image decoding apparatus 150 may determine the third coding units 820a, 820b, 820c, 820d, and 820e by recursively splitting the first coding unit 800. The image decoding apparatus 150 may determine, based on at least one of block shape information and split shape information, whether there is a coding unit split into an odd number from among the first coding unit 800, the second coding units 810a and 810b, and the third coding units 820a, 820b, 820c, 820d, and 820e. For example, a coding unit located at the right from among the second coding units 810a and 810b may be split into the odd number of third coding units 820c, 820d, and 820e. An order of processing a plurality of coding units included in the first coding unit 800 may be a certain order 830 (for example, a z-scan order), and the image decoding apparatus 150 may determine whether the third coding units 820c, 820d, and 820e determined when the right second coding unit 810b is split into an odd number satisfy a condition of being processable according to the certain order.

According to the present embodiment, the image decoding apparatus 150 may determine whether the third coding units 820a, 820b, 820c, 820d, and 820e included in the first coding unit 800 satisfy a condition of being processable according to a certain order, wherein the condition is related to whether at least one of a width and a height of the second coding units 810a and 810b is split into halves along boundaries of the third coding units 820a, 820b, 820c, 820d, and 820e. For example, the third coding units 820a and 820b that are determined when the left second coding unit 810a having a non-square shape is split into halves satisfy the condition, but the third coding units 820c, 820d, and 820e do not satisfy the condition since the boundaries of the third coding units 820c, 820d, and 820e that are determined when the right second coding unit 810b is split into three coding units are unable to split a width or height of the right second coding unit 810b into halves. Also, the image decoding apparatus 150 may determine disconnection of a scan order when the condition is dissatisfied and determine that the right second coding unit 810b is split into an odd number of coding units based on the determination result. According to the present embodiment, when a coding unit is split into an odd number of coding units, the image decoding apparatus 150 may set a certain limitation on a coding unit at a certain location from among the coding units, and because details about the limitation or the certain location have been described above through various embodiments, details thereof are not provided again.

Figure 9:
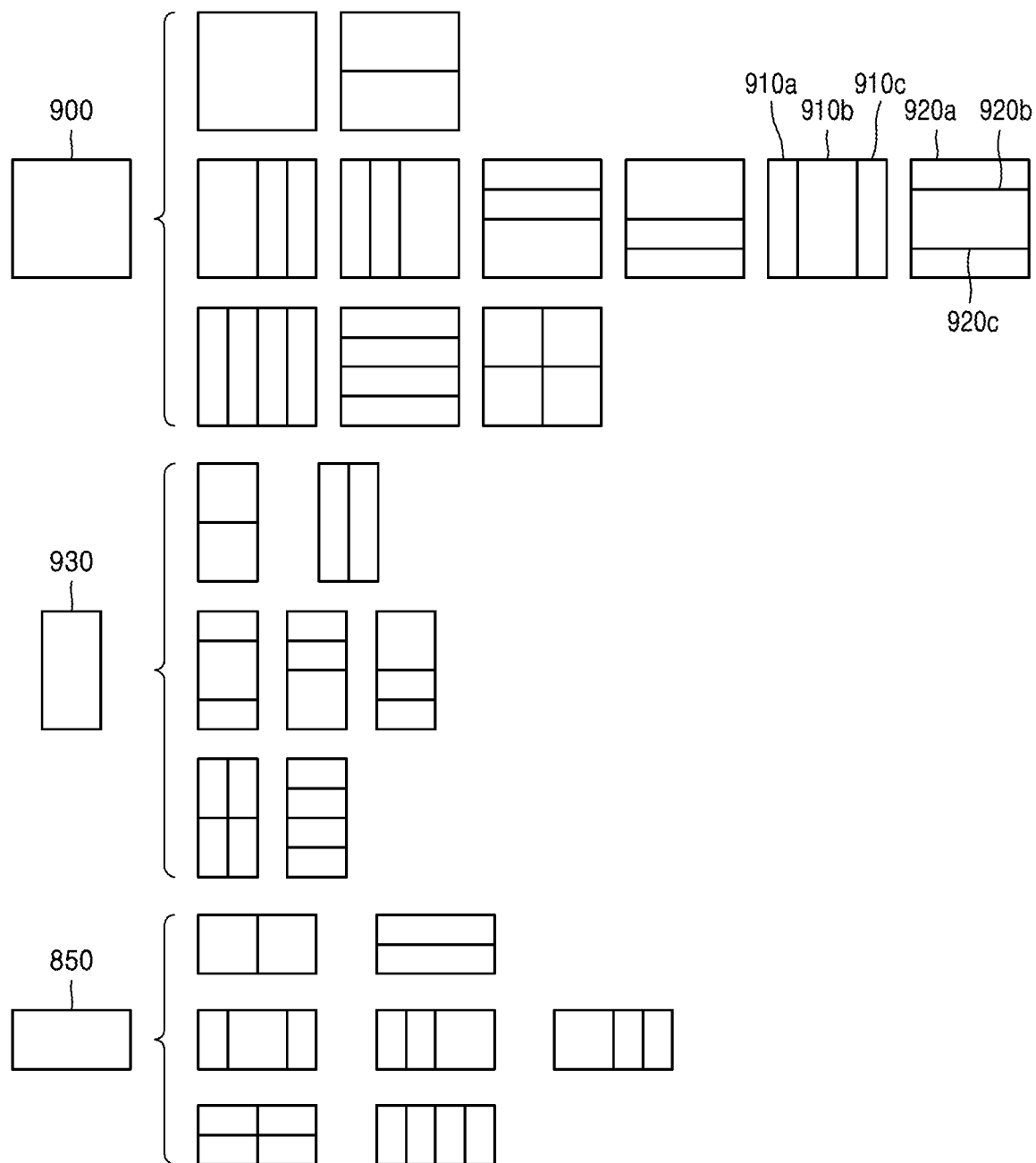
FIG. 9 illustrates that, when a second coding unit having a non-square shape, which is determined when a first coding unit is split, satisfies a certain condition, a shape of the second coding unit that is splittable is limited, according to an embodiment.

FIG. 9 illustrates a process of determining, by the image decoding apparatus 150, at least one coding unit when a first coding unit 900 is split, according to an embodiment. According to the present embodiment, the image decoding apparatus 150 may split the first coding unit 900 based on at least one of block shape information and split shape information obtained through the receiver 160. The first coding unit 900 having a square shape may be split into four coding units having square shapes or non-square shapes. For example, referring to FIG. 9, when block shape information indicates that the first coding unit 900 is a square and split shape information indicates that the first coding unit 900 is split into non-square coding units, the image decoding apparatus 150 may split the first coding unit 900 into a plurality of non-square coding units. In detail, when the split shape information indicates that the first coding unit 900 is split into a horizontal or vertical direction to determine an odd number of coding units, the image decoding apparatus 150 may split the first coding unit 900 having a square shape into, as the odd number of coding units, second coding units 910a, 910b, and 910c determined when the first coding unit 900 is split in the vertical direction, or second coding units 920a, 920b, and 920c determined when the first coding unit 900 is split in the horizontal direction.

According to the present embodiment, the image decoding apparatus 150 may determine whether the second coding units 910a, 910b, and 910c and 920a, 920b, and 920c included in the first coding unit 900 satisfy a condition of being processable according to a certain order, wherein the condition is related to whether at least one of the width and the height of the first coding unit 900 is split into halves along the boundaries of the second coding units 910a, 910b, and 910c and 920a, 920b, and 920c. Referring to FIG. 9, since the boundaries of the second coding units 910a, 910b, and 910c determined when the first coding unit 900 having a square shape is split in the vertical direction are unable to split the width of the first coding unit 900 into halves, it may be determined that the first coding unit 900 does not satisfy the condition of being processable according to the certain order. Also, since the boundaries of the second coding units 920a, 920b, and 920c determined when the first coding unit 900 having a square shape is split in the horizontal direction are unable to split the width of the first coding unit 900 into halves, it may be determined that the first coding unit 900 does not satisfy the condition of being processable according to the certain order. When the condition is dissatisfied, the image decoding apparatus 150 determines disconnection of a scan order and may determine that the first coding unit 900 is split into an odd number of coding units based on the determination result. According to the present embodiment, when a coding unit is split into an odd number of coding units, the image decoding apparatus 150 may set a certain limitation on a coding unit at a certain location from among the coding units, and since details about the limitation or the certain location have been described above through various embodiments, details thereof are not provided again.

According to the embodiment, the image decoding apparatus 150 may determine coding units having various shapes by splitting a first coding unit.

Referring to FIG. 9, the image decoding apparatus 150 may split the first coding unit 900 having a square shape and a first coding unit 930 or 950 having a non-square shape into coding units having various shapes.

Figure 10:
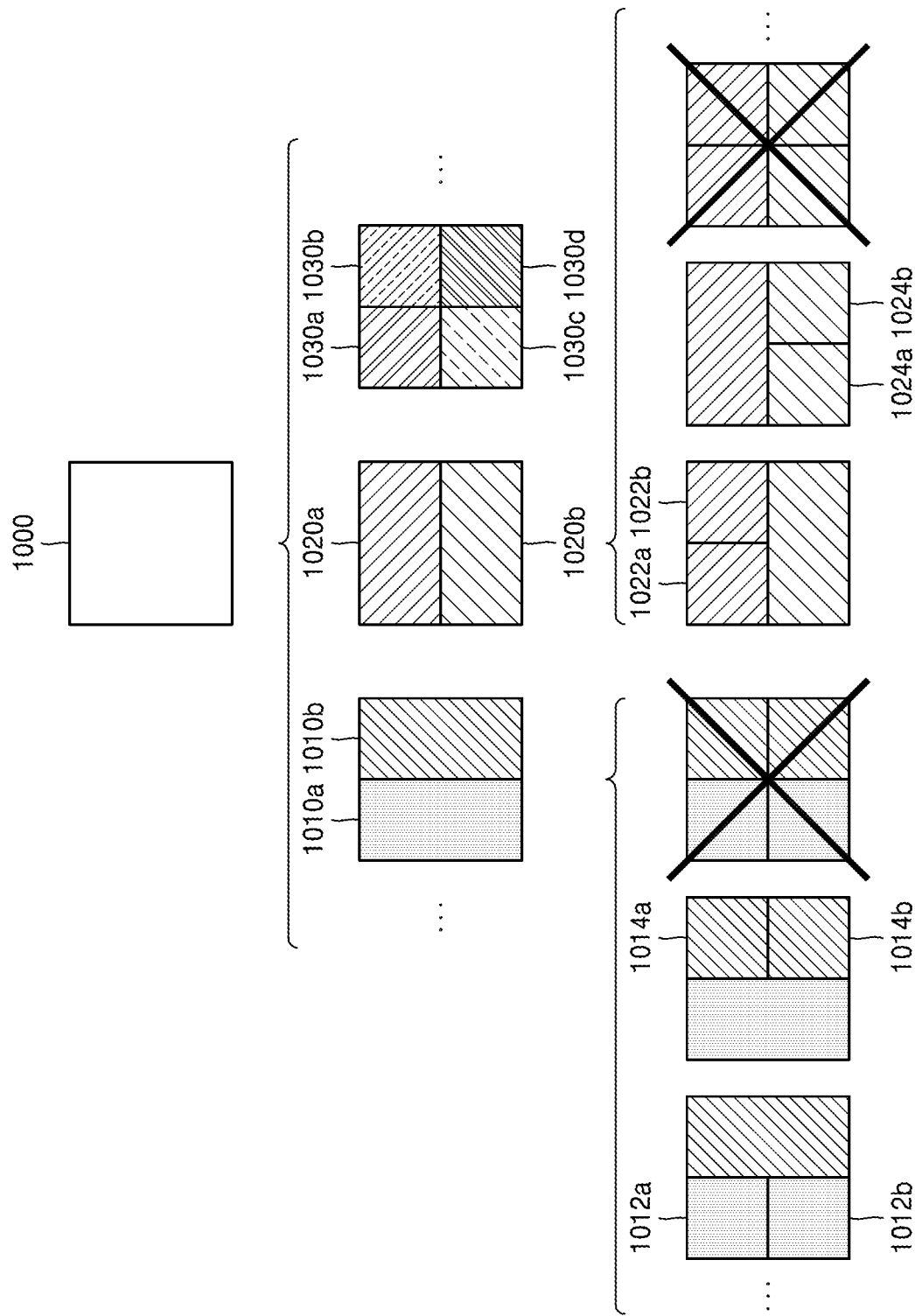
FIG. 10 illustrates a process of splitting a coding unit having a square shape when split shape information does not indicate splitting of the coding unit into four coding units having square shapes, according to an embodiment.

FIG. 10 illustrates that, when a second coding unit having a non-square shape, which is determined when a first coding unit 1000 is split, satisfies a certain condition, a shape of the second coding unit that is splittable is limited by the image decoding apparatus 150, according to an embodiment.

According to the present embodiment, the image decoding apparatus 150 may determine, based on at least one of block shape information and split shape information obtained through the receiver 160, to split the first coding unit 1000 having a square shape into second coding units 1010a, 1010b, 1020a, and 1020b having non-square shapes. The second coding units 1010a, 1010b, 1020a, and 1020b may be independently split. Accordingly, the image decoding apparatus 150 may determine to split or not to split the second coding units 1010a, 1010b, 1020a, and 1020b based on at least one of block shape information and split shape information related to each of the second coding units 1010a, 1010b, 1020a, and 1020b. According to the present embodiment, the image decoding apparatus 150 may determine third coding units 1012a and 1012b by splitting the left second coding unit 1010a having a non-square shape and determined when the first coding unit 1000 is split in a vertical direction. However, when the left second coding unit 1010a is split in a horizontal direction, the image decoding apparatus 150 may limit the right second coding unit 1010b not to be split in the horizontal direction like a direction in which the left second coding unit 1010a is split. When the right second coding unit 1010b is split in the same direction and third coding units 1014a and 1014b are determined, the third coding units 1012a, 1012b, 1014a, and 1014b may be determined when the left second coding unit 1010a and the right second coding unit 1010b are independently split in the horizontal direction. However, this is the same result as the image decoding apparatus 150 splitting the first coding unit 1000 into four second coding units 1030a, 1030b, 1030c, and 1030d having square shapes based on at least one of block shape information and split shape information, and thus may be inefficient in terms of image decoding.

According to the present embodiment, the image decoding apparatus 150 may determine third coding units 1022a, 1022b, 1024a, and 1024b by splitting the second coding units 1020a or 1020b having a non-square shape and determined when the first coding unit 1000 is split in the horizontal direction. However, when one of the second coding units (for example, the top second coding unit 1020a) is split in the vertical direction, the image decoding apparatus 150 may limit the other second coding unit (for example, the bottom second coding unit 1020b) not to be split in the vertical direction like a direction in which the top second coding unit 1020a is split based on the above reasons.

Figure 11:
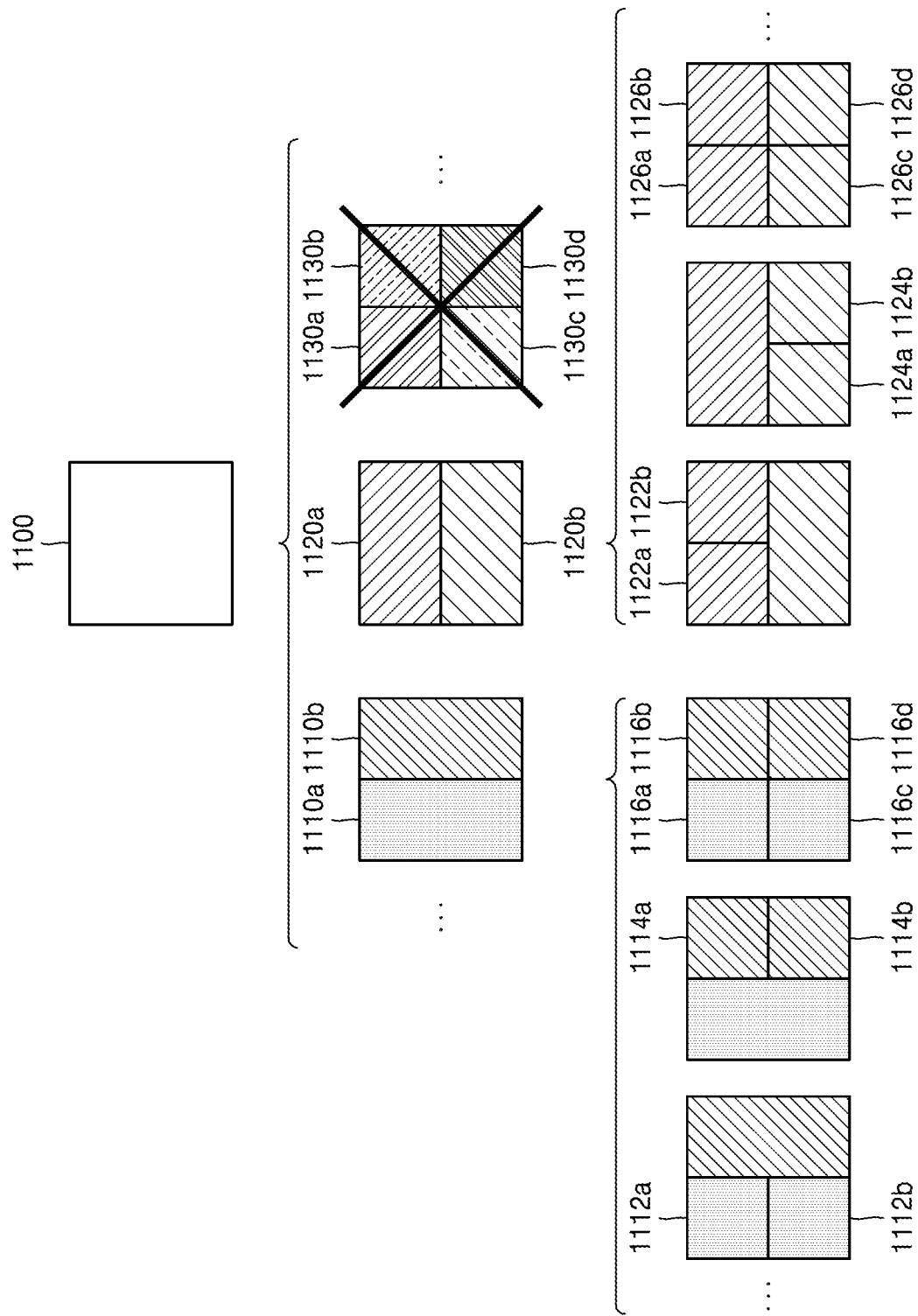
FIG. 11 illustrates that a processing order between a plurality of coding units may be changed according to a split process of a coding unit, according to an embodiment.

FIG. 11 illustrates a process of splitting, by the image decoding apparatus 150, a coding unit having a square shape when split shape information does not indicate splitting of the coding unit into four coding units having square shapes, according to an embodiment.

According to the present embodiment, the image decoding apparatus 150 may determine second coding units 1110a, 1110b, 1120a, 1020b, and the like by splitting a first coding unit 1100 based on at least one of block shape information and split shape information. The split shape information may include information about various shapes into which a coding unit is splittable, but sometimes, the information about various shapes may not include information for splitting a coding unit into four square coding units. According to such split shape information, the image decoding apparatus 150 is unable to split the first coding unit 1100 having a square shape into four square second coding units 1130a, 1130b, 1130c, and 1130d. Based on the split shape information, the image decoding apparatus 150 may determine the second coding units 1110a, 1110b, 1120a, 1120b, and the like having non-square shapes.

According to the present embodiment, the image decoding apparatus 150 may independently split the second coding units 1110a, 1110b, 1120a, 1120b, and the like having non-square shapes. Each of the second coding units 1110a, 1110b, 1120a, 1120b, and the like may be split in a certain order through a recursive method that may correspond to a method of splitting the first coding unit 1100 based on at least one of block shape information and split shape information.

For example, the image decoding apparatus 150 may determine third coding units 1112a and 1112b having square shapes by splitting the left second coding unit 1110a in a horizontal direction and may determine third coding units 1114a and 1114b having square shapes by splitting the right second coding unit 1110b in a horizontal direction. In addition, the image decoding apparatus 150 may determine third coding units 1116a, 1116b, 1116c, and 1116d having square shapes by splitting both the left second coding unit 1110a and the right second coding unit 1110b in the horizontal direction. In this case, coding units may be determined in the same manner in which the first coding unit 1100 is split into the four square second coding units 1130a, 1130b, 1130c, and 1130d.

As another example, the image decoding apparatus 150 may determine third coding units 1122a and 1122b having square shapes by splitting the top second coding unit 1120a in the vertical direction and determine third coding units 1124a and 1124b having square shapes by splitting the bottom second coding unit 1120b in the vertical direction. In addition, the image decoding apparatus 150 may determine third coding units 1122a, 1122b, 1124a, and 1124b having square shapes by splitting both the top second coding unit 1120a and the bottom second coding unit 1120b in the vertical direction. In this case, coding units may be determined in the same manner in which the first coding unit 1100 is split into the four square second coding units 1130a, 1130b, 1130c, and 1130d.

Figure 12:
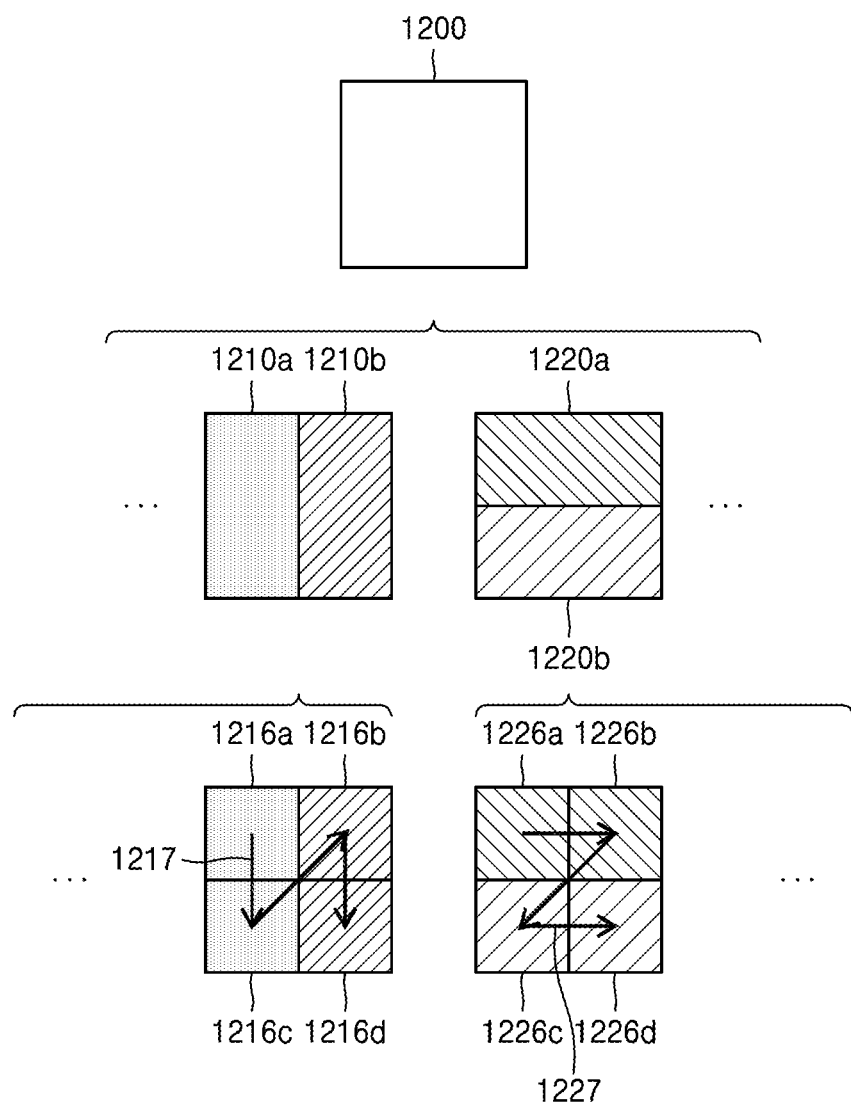
FIG. 12 illustrates a process of determining a depth of a coding unit when a shape and size of the coding unit change, in a case where a plurality of coding units are determined when the coding unit is recursively split, according to an embodiment.

FIG. 12 illustrates that a processing order between a plurality of coding units may be changed according to a split process of a coding unit, according to an embodiment.

According to the present embodiment, the image decoding apparatus 150 may split a first coding unit 1200, based on block shape information and split shape information. When the block shape information indicates a square shape and the split shape information indicates that the first coding unit 1200 is split in at least one of a horizontal direction and a vertical direction, the image decoding apparatus 150 may split the first coding unit 1200 to determine second coding units (for example, second coding units 1210a, 1210b, 1220a, 1220b, 1230a, 1230b, 1230c, 1230d, and the like). Referring to FIG. 12, the second coding units 1210a, 1210b, 1220a, and 1220b having non-square shapes and determined when the first coding unit 1200 is split only in the horizontal or vertical direction may each be independently split based on block shape information and split shape information about each of the second coding units 1210a, 1210b, 1220a, and 1220b. For example, the image decoding apparatus 150 may determine third coding units 1216a, 1216b, 1216c, and 1216d by splitting the second coding units 1210a and 1210b in the horizontal direction, wherein the second coding units 1210a and 1210b are generated when the first coding unit 1200 is split in the vertical direction, and may determine third coding units 1226a, 1226b, 1226c, and 1226d by splitting the second coding units 1220a and 1220b in the horizontal direction, wherein the second coding units 1220a and 1220b are generated when the first coding unit 1200 is split in the horizontal direction. Because split processes of the second coding units 1210a, 1210b, 1220a, and 1220b have been described with reference to FIG. 9, details thereof are not provided again.

According to the present embodiment, the image decoding apparatus 150 may process coding units according to a certain order. Since characteristics about processing of coding units according to a certain order have been described above with reference to FIG. 6, details thereof are not provided again. Referring to FIG. 12, the image decoding apparatus 150 may determine four square third coding units 1216a, 1216b, 1216c, and 1216d or 1226a, 1226b, 1226c, and 1226d by splitting the first coding unit 1200 having a square shape. According to the present embodiment, the image decoding apparatus 150 may determine a processing order of the third coding units 1216a, 1216b, 1216c, and 1216d or 1226a, 1226b, 1226c, and 1226d according to a shape of the first coding unit 1200 being split.

According to the present embodiment, the image decoding apparatus 150 may determine the third coding units 1216a, 1216b, 1216c, and 1216d by splitting each of the second coding units 1210a and 1210b in the horizontal direction, wherein the second coding units 1210a and 1210b are generated when the first coding unit 1200 is split in the vertical direction, and the image decoding apparatus 150 may process the third coding units 1216a, 1216b, 1216c, and 1216d according to an order 1217 of first processing the third coding units 1216a and 1216b included in the left second coding unit 1210a in the vertical direction and then processing the third coding units 1216c and 1216d included in the right second coding unit 1210b in the vertical direction.

According to the present embodiment, the image decoding apparatus 150 may determine the second coding units 1226a, 1226b, 1226c, and 1226d by splitting each of the second coding units 1220a and 1220b in the vertical direction, wherein the second coding units 1220a and 1220b are generated when the first coding unit 1200 is split in the horizontal direction, and the image decoding apparatus 150 may process the third coding units 1226a, 1226b, 1226c, and 1226d according to an order of first processing the third coding units 1226a and 1226b included in the top second coding unit 1220a in the horizontal direction and then processing the third coding units 1226c and 1226d included in the bottom second coding unit 1220b in the horizontal direction.

Referring to FIG. 12, the third coding units 1216a, 1216b, 1216c, 1216d, 1226a, 1226b, 1226c, and 1226d having square shapes may be determined when each of the second coding units 1210a, 1210b, 1220a, and 1220b are split. The second coding units 1210a and 1210b determined when the first coding unit 1200 is split in the vertical direction and the second coding units 1220a and 1220b determined when the first coding unit 1200 is split in the horizontal direction have different shapes, but according to the third coding units 1216a, 1216b, 1216c, 1216d, 1226a, 1226b, 1226c, and 1226d determined thereafter, the first coding unit 1200 is split into coding units having the same shapes. Accordingly, even when coding units having the same shapes are determined as a result by recursively splitting coding units through different processes based on at least one of block shape information and split shape information, the image decoding apparatus 150 may process the coding units having the same shapes in different orders.

Figure 13:
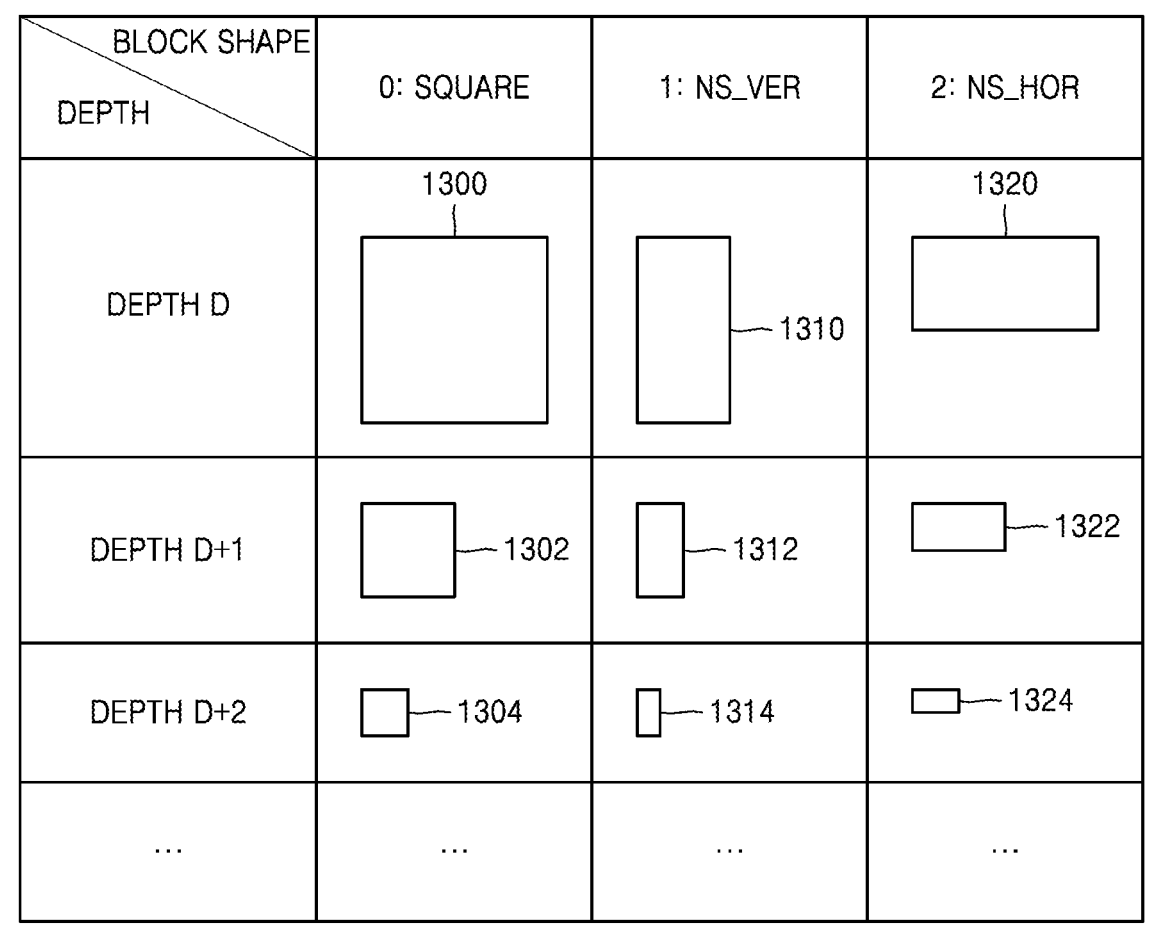

FIG. 13 illustrates a process of determining a depth of a coding unit when a shape and size of the coding unit changes, in a case where a plurality of coding units are determined when the coding unit is recursively split, according to an embodiment.

According to the present embodiment, the image decoding apparatus 150 may determine a depth of a coding unit according to a certain criterion. For example, the certain criterion may be a length of a longer side of the coding unit. When a length of a longer side of a coding unit before being split is 2n times a length of a longer side of a current coding unit, wherein n>0, the image decoding apparatus 150 may determine that a depth of the current coding unit is higher than a depth of the coding unit before being split by n. Hereinafter, a coding unit having a higher depth will be referred to as a coding unit of a lower depth.

Referring to FIG. 13, according to the present embodiment, the image decoding apparatus 150 may determine a second coding unit 1302 and a third coding unit 1304 of lower depths by splitting a first coding unit 1300 having a square shape, based on block shape information indicating a square shape (for example, block shape information may indicate '0: SQUARE'). When a size of the first coding unit 1300 having a square shape is 2N×2N, the second coding unit 1302 determined by splitting a width and a height of the first coding unit 1300 by ½ may have a size of N×N. In addition, the third coding unit 1304 determined by splitting a width and a height of the second coding unit 1302 by ½ may have a size of N/2×N/2. In this case, a width and a height of the third coding unit 1304 correspond to ½ times those of the first coding unit 1300. When a depth of the first coding unit 1300 is D, a depth of the second coding unit 1302, which is ½ times the width and height of the first coding unit 1300, may be D+1, and a depth of the third coding unit 1304, which is ½ times the width and height of the first coding unit 1300, may be D+2.

According to the present embodiment, the image decoding apparatus 150 may determine a second coding unit 1312 or 1322 and a third coding unit 1314 or 1324 of lower depths by splitting a first coding unit 1310 or 1320 having a non-square shape, based on block shape information indicating a non-square shape (for example, the block shape information may indicate '1: NS_VER' indicating that a height is longer than a width or indicate '2: NS_HOR' indicating that a width is longer than a height).

The image decoding apparatus 150 may determine second coding units (for example, the second coding units 1302, 1312, 1322, and the like) by splitting at least one of the width and the height of the first coding unit 1310 having a size of N×2N. In other words, the image decoding apparatus 150 may determine the second coding unit 1302 having a size of N×N or the second coding unit 1322 having a size of N×N/2 by splitting the first coding unit 1310 in a horizontal direction, or may determine the second coding unit 1312 having a size of N/2×N by splitting the first coding unit 1310 in horizontal and vertical directions.

According to the present embodiment, the image decoding apparatus 150 may determine the second coding units (for example, the second coding units 1302, 1312, 1322, and the like) by splitting at least one of the width and the height of the first coding unit 1320 having a size of 2N×N. That is, the image decoding apparatus 150 may determine the second coding unit 1302 having a size of N×N or the second coding unit 1312 having a size of N/2×N by splitting the first coding unit 1320 in the vertical direction, or may determine the second coding unit 1322 having a size of N×N/2 by splitting the first coding unit 1320 in the horizontal and vertical directions.

According to the present embodiment, the image decoding apparatus 150 may determine third coding units (for example, the third coding units 1304, 1314, 1324, and the like) by splitting at least one of a width and a height of the second coding unit 1302 having a size of N×N. That is, the image decoding apparatus 150 may determine the third coding unit 1304 having a size of N/2×N/2, the third coding unit 1314 having a size of N/2×N/2, or the third coding unit 1324 having a size of N/2×N/2 by splitting the second coding unit 1302 in vertical and horizontal directions.

According to the present embodiment, the image decoding apparatus 150 may determine the third coding units (for example, the third coding units 1304, 1314, 1324, and the like) by splitting at least one of a width and a height of the second coding unit 1312 having a size of N/2×N. That is, the image decoding apparatus 150 may determine the third coding unit 1304 having a size of N/2×N/2 or the third coding unit 1324 having a size of N/2×N/2 by splitting the second coding unit 1312 in a horizontal direction, or determine the third coding unit 1314 having a size of N/2×N/2 by splitting the second coding unit 1312 in vertical and horizontal directions.

According to the present embodiment, the image decoding apparatus 150 may determine the third coding units (for example, the third coding units 1304, 1314, 1324, and the like) by splitting at least one of a width and a height of the second coding unit 1314 having a size of N×N/2. That is, the image decoding apparatus 150 may determine the third coding unit 1304 having a size of N/2×N/2 or the third coding unit 1314 having a size of N/2×N/2 by splitting the second coding unit 1312 in a vertical direction, or determine the third coding unit 1324 having a size of N/2×N/2 by splitting the second coding unit 1312 in vertical and horizontal directions.

According to the present embodiment, the image decoding apparatus 150 may split coding units having square shapes (for example, the first coding units 1300, 1302, and 1304) in a horizontal or vertical direction. For example, the first coding unit 1300 having a size of 2N×2N may be split in the vertical direction to determine the first coding unit 1310 having a size of N×2N or in the horizontal direction to determine the first coding unit 1320 having a size of 2N×N/. According to the present embodiment, when a depth is determined based on a length of a longest side of a coding unit, a depth of a coding unit determined when the first coding unit 1300, 1302, or 1304 is split in the horizontal or vertical direction may be the same as a depth of the first coding unit 1300, 1302, or 1304.

According to the present embodiment, the width and height of the third coding unit 1314 or 1324 may be ½ times the first coding unit 1310 or 1320. When the depth of the first coding unit 1310 or 1320 is D, the depth of the second coding unit 1312 or 1314, which is ½ times the width and height of the first coding unit 1310 or 1320, may be D+1, and the depth of the third coding unit 1314 or 1324, which is ½ times the width and height of the first coding unit 1310 or 1320, may be D+2.

Figure 14:
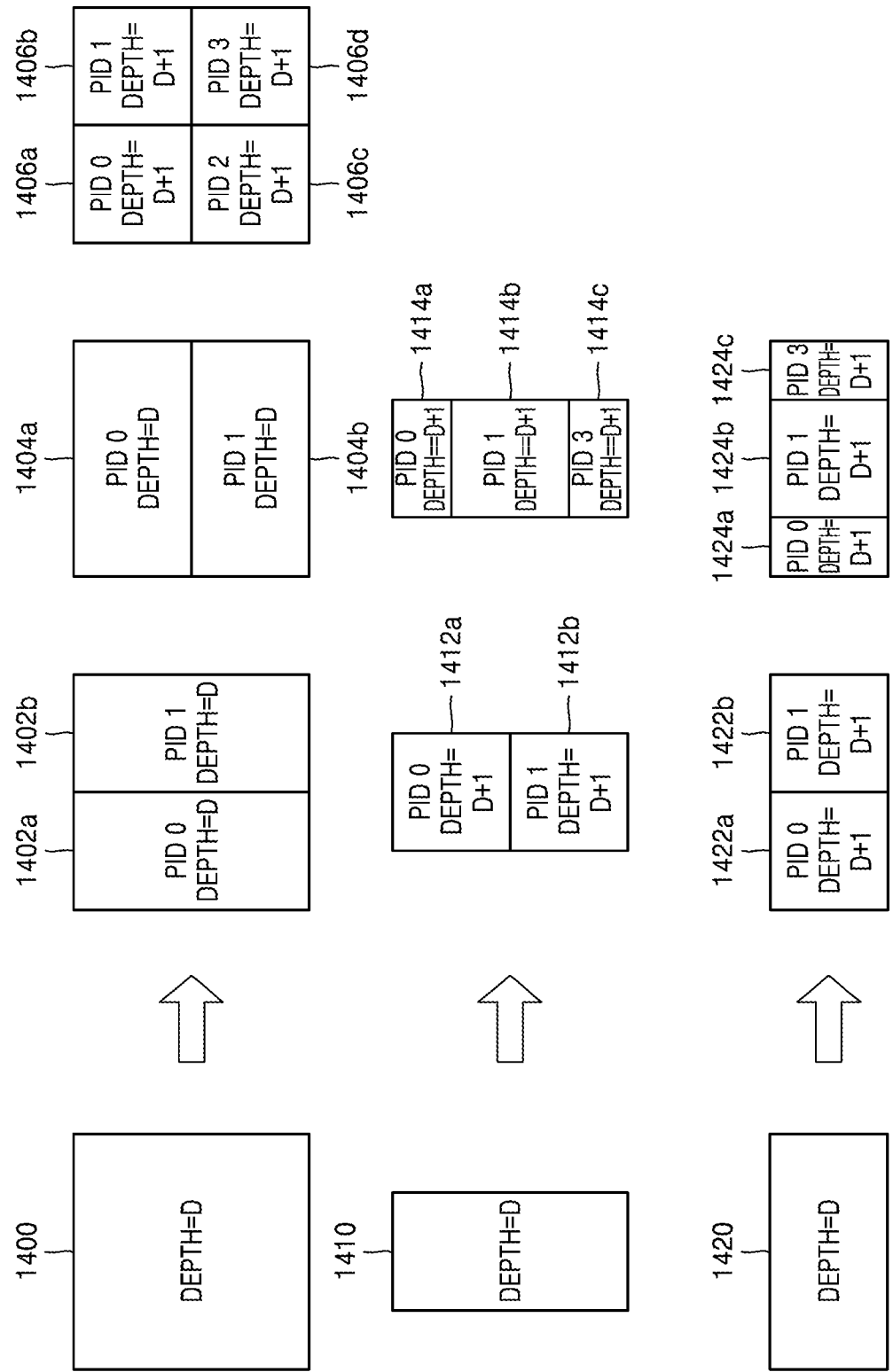
FIG. 14 illustrates that a plurality of coding units are determined according to a plurality of certain data units included in a picture, according to an embodiment.

FIG. 14 illustrates a depth determinable according to shapes and sizes of coding units, and a part index (PID) for distinguishing between the coding units, according to an embodiment.

According to the present embodiment, the image decoding apparatus 150 may determine second coding units having various shapes by splitting a first coding unit 1400 having a square shape. Referring to FIG. 14, the image decoding apparatus 150 may determine second coding units 1402a, 1402b, 1404a, 1404b, 1406a, 1406b, 1406c, and 1406d by splitting the first coding unit 1400 in at least one of a vertical direction and a horizontal direction, according to split shape information. That is, the image decoding apparatus 150 may determine the second coding units 1402a, 1402b, 1404a, 1404b, 1406a, 1406b, 1406c, and 1406d based on split shape information about the first coding unit 1400.

According to the present embodiment, depths of the second coding units 1402a, 1402b, 1404a, 1404b, 1406a, 1406b, 1406c, and 1406d determined according to the split shape information about the first coding unit 1400 having a square shape may be determined based on lengths of longer sides. For example, since lengths of longer sides of the second coding units 1402a, 1402b, 1404a, and 1404b having non-square shapes are the same as a length of one side of the first coding unit 1400 having a square shape, depths of the first coding unit 1400 and the second coding units 1402a, 1402b, 1404a, and 1404b having non-square shapes may be D, i.e., the same. On the other hand, when the image decoding apparatus 150 splits the first coding unit 1400 into the four second coding units 1406a, 1406b, 1406c, and 1406d having square shapes based on split shape information, since a length of one side of each of the second coding units 1406a, 1406b, 1406c, and 1406d having square shapes is ½ of a length of one side of the first coding unit 1400, depths of the second coding units 1406a, 1406b, 1406c, and 1406d may be D+1, i.e., one depth lower than the depth D of the first coding unit 1400.

According to the present embodiment, the image decoding apparatus 150 may split a first coding unit 1410 having a height longer than a width into a plurality of second coding units 1412a, 1412b, 1414a, 1414b, and 1414c by splitting the first coding unit 1410 in a horizontal direction according to split shape information. According to the present embodiment, the image decoding apparatus 150 may split a first coding unit 1420 having a width longer than a height into a plurality of second coding units 1422a and 1422b, or 1424a, 1424b, and 1424c by splitting the first coding unit 1420 in a vertical direction according to split shape information.

According to the present embodiment, depths of the second coding units 1412a, 1412b, 1414a, 1414b, 1416a, 1416b, 1416c, and 1416d determined according to the split shape information about the first coding unit 1410 or 1420 having a non-square shape may be determined based on lengths of longer sides. For example, since a length of one side of each of the second coding units 1412a and 1412b having square shapes is ½ of a length of one side of the first coding unit 1410 having a non-square shape in which a height is longer than a width, the depths of the second coding units 1402a, 1402b, 1404a, and 1404b having square shapes are D+1, i.e., one depth lower than the depth D of the first coding unit 1410 having a non-square shape.

In addition, the image decoding apparatus 150 may split the first coding unit 1410 having a non-square shape into an odd number of the second coding units 1414a, 1414b, and 1414c based on split shape information. The odd number of second coding units 1414a, 1414b, and 1414c may include the second coding units 1414a and 1414c having non-square shapes and the second coding unit 1414b having a square shape. Here, since lengths of longer sides of the second coding units 1414a and 1414c having non-square shapes and a length of one side of the second coding unit 1414b having a square shape are ½ of a length of one side of the first coding unit 1410, depths of the second coding units 1414a, 1414b, and 1414c may be D+1, i.e., one depth lower than the depth D of the first coding unit 1410. The image decoding apparatus 150 may determine depths of coding units related to the first coding unit 1410 having a non-square shape in which a width is longer than a height in the similar manner as depths of coding units related to the first coding unit 1410 are determined.

According to the present embodiment, while determining PIDs for distinguishing between coding units, the image decoding apparatus 150 may determine the PIDs based on size ratios between the coding units when an odd number of the coding units do not have the same size. Referring to FIG. 14, the coding unit 1414b located at the center of the odd number of coding units 1414a, 1414b, and 1414c has the same width as the coding units 1414a and 1414c, but has a height twice higher than heights of the coding units 1414a and 1414c. In this case, the coding unit 1414b located at the center may include two of each of the coding units 1414a and 1414c. Accordingly, when a PID of the coding unit 1414b located at the center according to a scan order is 1, a PID of the coding unit 1414c located in a next order may be increased by 2, i.e., 3. That is, values of PIDs may be discontinuous. According to the present embodiment, the image decoding apparatus 150 may determine whether an odd number of coding units have the same size based on discontinuity of PIDs for distinguishing between the coding units.

According to the present embodiment, the image decoding apparatus 150 may determine whether a plurality of coding units determined when a current coding unit is split have certain split shapes based on values of PIDs for distinguishing between the coding units. Referring to FIG. 14, the image decoding apparatus 150 may determine an even number of the coding units 1412a and 1412b or an odd number of the coding units 1414a, 1414b, and 1414c by splitting the first coding unit 1410 having a rectangular shape in which a height is longer than a width. The image decoding apparatus 150 may use an ID indicating each coding unit so as to distinguish between a plurality of coding units. According to the present embodiment, the PID may be obtained from a sample at a certain location (for example, an upper left sample) of each coding unit.

According to the present embodiment, the image decoding apparatus 150 may determine a coding unit at a certain location from among coding units determined via split, by using PIDs for distinguishing between the coding units. According to an embodiment, when split shape information about the first coding unit 1410 having a rectangular shape in which a height is longer than a width indicates split into three coding units, the image decoding apparatus 150 may split the first coding unit 1410 into the three coding units 1414a, 1414b, and 1414c. The image decoding apparatus 150 may allocate a PID to each of the three coding units 1414a, 1414b, and 1414c. The image decoding apparatus 150 may compare PIDs of coding units so as to determine a center coding unit from among an odd number of coding units. The image decoding apparatus 150 may determine the coding unit 1414b having a PID corresponding to a center value from among PIDs as a coding unit located at the center from among coding units determined when the first coding unit 1410 is split, based on PIDs of the coding units. According to the present embodiment, the image decoding apparatus 150 may determine PIDs based on size ratios between coding units when the coding units do not have the same size, while determining the PIDs for distinguishing between the coding units. Referring to FIG. 14, the coding unit 1414b generated when the first coding unit 1410 is split may have the same width as the coding units 1414a and 1414c, but may have a height twice higher than heights of the coding units 1414a and 1414c. In this case, when the PID of the coding unit 1414b located at the center is 1, the PID of the coding unit 1414c located in a next order may be increased by 2, i.e., 3. As such, when an increase range changes while PIDs are uniformly increasing, the image decoding apparatus 150 may determine that a coding unit is split into a plurality of coding units including a coding unit having a different size from other coding units. According to the present embodiment, when split shape information indicates split into an odd number of coding units, the image decoding apparatus 150 may split a current coding unit into an odd number of coding units in which a coding unit at a certain location (for example, a center coding unit) has a different size from other coding units. In this case, the image decoding apparatus 150 may determine the center coding unit having the different size by using PIDs of the coding units. However, since the PID, and a size or location of a coding unit at a certain location are specified to describe the present embodiment, and thus the present disclosure is not limited thereto, and various PIDs, and various locations and sizes of a coding unit may be used.

According to the present embodiment, the image decoding apparatus 150 may use a certain data unit from which a coding unit starts to be recursively split.

Figure 15:
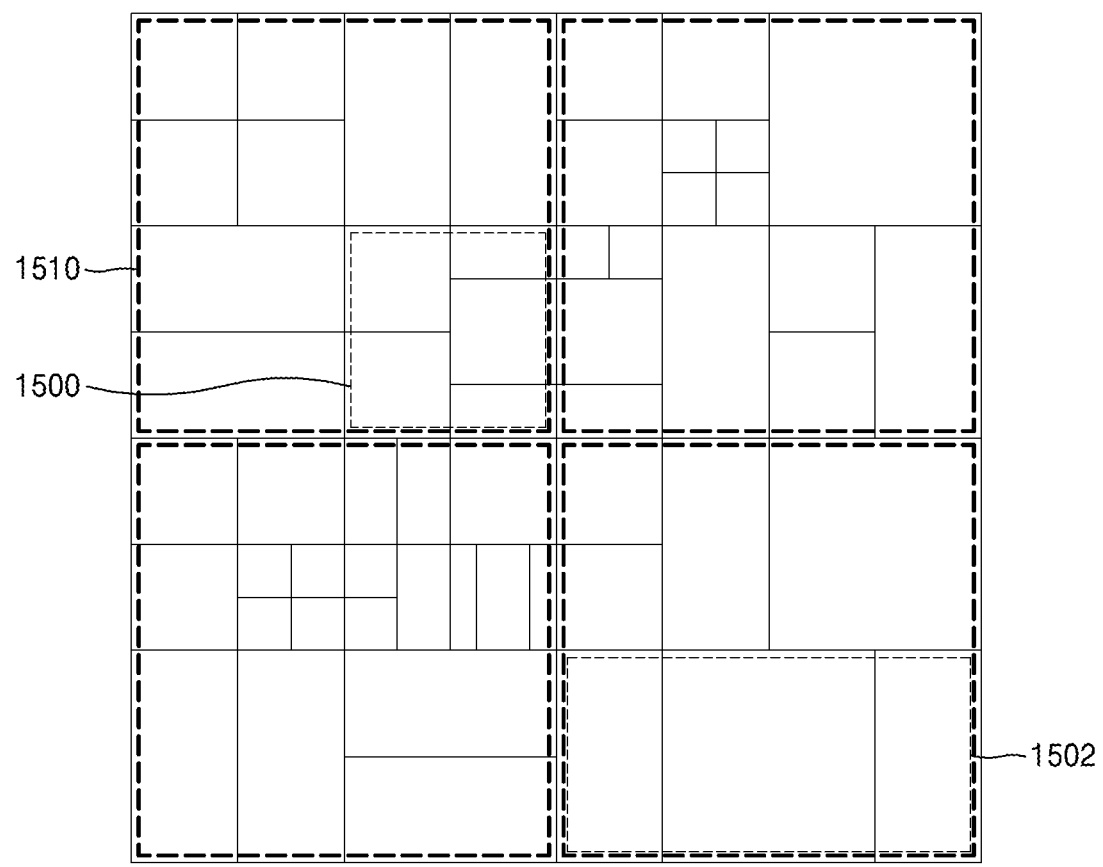
FIG. 15 illustrates a processing block that is a criterion in determining a determining order of a reference coding unit included in a picture, according to an embodiment.

FIG. 15 illustrates that a plurality of coding units are determined according to a plurality of certain data units included in a picture, according to an embodiment.

According to the present embodiment, a certain data unit may be defined as a data unit from which a coding unit starts to be recursively split by using at least one of block shape information and split shape information. That is, the certain data unit may correspond to a coding unit of an uppermost depth used while determining a plurality of coding units splitting a current picture. Hereinafter, for convenience of description, such a certain data unit is referred to as a reference data unit.

According to the present embodiment, a reference data unit may indicate a certain size and shape. According to an embodiment, a reference coding unit may include M×N samples. Here, M and N may be equal to each other, and may be an integer expressed as a multiple of 2. That is, a reference data unit may indicate a square shape or a non-square shape, and may later be split into an integer number of coding units.

According to the present embodiment, the image decoding apparatus 150 may split a current picture into a plurality of reference data units. According to the present embodiment, the image decoding apparatus 150 may split the plurality of reference data units obtained by splitting the current picture by using split information about each of the reference data units. Split processes of such reference data units may correspond to split processes using a quad-tree structure.

According to the present embodiment, the image decoding apparatus 150 may pre-determine a smallest size available for the reference data unit included in the current picture. Accordingly, the image decoding apparatus 150 may determine the reference data unit having various sizes that are equal to or larger than the smallest size, and determine at least one coding unit based on the determined reference data unit by using block shape information and split shape information.

Referring to FIG. 15, the image decoding apparatus 150 may use a reference coding unit 1500 having a square shape, or may use a reference coding unit 1502 having a non-square shape. According to the embodiment, a shape and size of a reference coding unit may be determined according to various data units (for example, a sequence, a picture, a slice, a slice segment, and a largest coding unit) that may include at least one reference coding unit.

According to the embodiment, the receiver 160 of the image decoding apparatus 150 may obtain, from a bitstream, at least one of information about a shape of a reference coding unit and information about a size of the reference coding unit, according to the various data units. Processes of determining at least one coding unit included in the reference coding unit 1500 having a square shape have been described above through processes of splitting the current coding unit 300 of FIG. 3, and processes of determining at least one coding unit included in the reference coding unit 1500 having a non-square shape have been described above through processes of splitting the current coding unit 1200 or 1250 of FIG. 12, and thus descriptions thereof are not provided here.

According to the embodiment, to determine a size and shape of a reference coding unit according to some data units pre-determined based on a certain condition, the image decoding apparatus 150 may use a PID for checking the size and shape of the reference coding unit. That is, the receiver 160 may obtain, from a bitstream, only a PID for checking a size and shape of a reference coding unit as a data unit satisfying a certain condition (for example, a data unit having a size equal to or smaller than a slice) from among various data units (for example, a sequence, a picture, a slice, a slice segment, and a largest coding unit), according to slices, slice segments, and largest coding units. The image decoding apparatus 150 may determine the size and shape of the reference data unit according to data units that satisfy the certain condition, by using the PID. When information about a shape of a reference coding unit and information about a size of a reference coding unit are obtained from a bitstream and used according to data units having relatively small sizes, usage efficiency of the bitstream may not be sufficient, and thus instead of directly obtaining the information about the shape of the reference coding unit and the information about the size of the reference coding unit, only a PID may be obtained and used. In this case, at least one of the size and the shape of the reference coding unit corresponding to the PID indicating the size and shape of the reference coding unit may be pre-determined. That is, the image decoding apparatus 150 may select at least one of the pre-determined size and shape of the reference coding unit according to the PID so as to determine at least one of the size and shape of the reference coding unit included in a data unit that is a criterion for obtaining the PID.

According to the embodiment, the image decoding apparatus 150 may use at least one reference coding unit included in one largest coding unit. That is, a largest coding unit splitting an image may include at least one reference coding unit, and a coding unit may be determined when each of the reference coding unit is recursively split. According to the present embodiment, at least one of a width and height of the largest coding unit may be an integer times at least one of a width and height of the reference coding unit. According to the present embodiment, a size of a reference coding unit may be equal to a size of a largest coding unit, which is split n times according to a quad-tree structure. That is, the image decoding apparatus 150 may determine a reference coding unit by splitting a largest coding unit n times according to a quad-tree structure, and split the reference coding unit based on at least one of block shape information and split shape information according to various embodiments.

Figure 16:
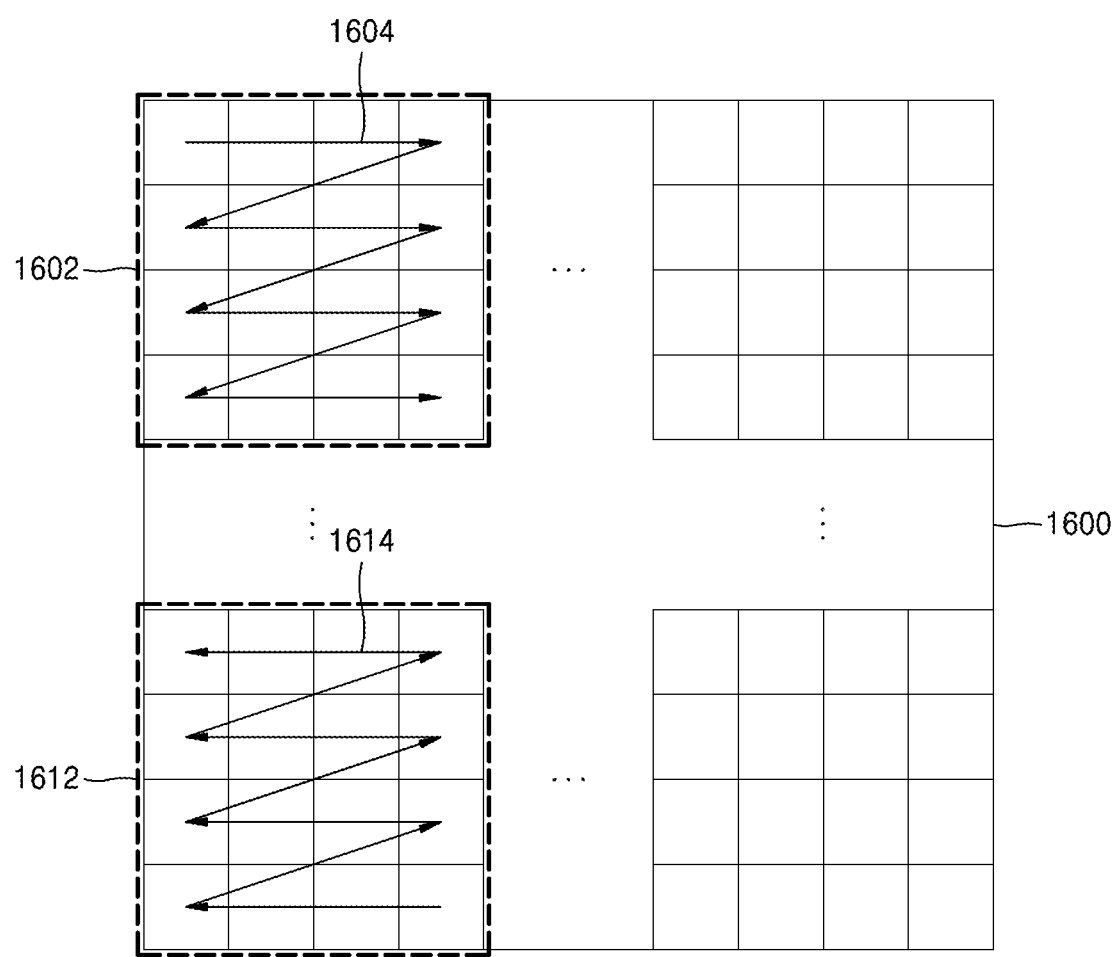
FIG. 16 illustrates a processing block that is a criterion in determining a determining order of a reference coding unit included in a picture 1600, according to an embodiment.

FIG. 16 illustrates a processing block that is a criterion in determining a determining order of a reference coding unit included in a picture 1600, according to an embodiment.

According to the embodiment, the image decoding apparatus 150 may determine at least one processing block splitting a picture. A processing block is a data unit including at least one reference coding unit splitting an image, and the at least one reference coding unit included in the processing block may be determined in a certain order. That is, a determining order of the at least one reference coding unit determined in each processing block may correspond to one of various orders for determining a reference coding unit, and may vary according to processing blocks. A determining order of a reference coding unit determined per processing block may be one of various orders, such as a raster scan order, a Z-scan order, an N-scan order, an up-right diagonal scan order, a horizontal scan order, and a vertical scan order, but should not be limitedly interpreted by the scan orders.

According to the present embodiment, the image decoding apparatus 150 may determine a size of at least one processing block included in an image by obtaining information about a size of a processing block. The image decoding apparatus 150 may obtain, from a bitstream, the information about a size of a processing block to determine the size of the at least one processing block included in the image. The size of the processing block may be a certain size of a data unit indicated by the information about a size of a processing block.

According to the embodiment, the receiver 160 of the image decoding apparatus 150 may obtain, from the bitstream, the information about a size of a processing block according to certain data units. For example, the information about a size of a processing block may be obtained from the bitstream in data units of images, sequences, pictures, slices, and slice segments. That is, the receiver 160 may obtain, from the bitstream, the information about a size of a processing block according to such several data units, and the image decoding apparatus 150 may determine the size of at least one processing block splitting the picture by using the obtained information about a size of a processing block, wherein the size of the processing block may be an integer times a size of a reference coding unit.

According to the embodiment, the image decoding apparatus 150 may determine sizes of processing blocks 1602 and 1612 included in the picture 1600. For example, the image decoding apparatus 150 may determine a size of a processing block based on information about a size of a processing block, the information obtained from a bitstream. Referring to FIG. 16, the image decoding apparatus 150 may determine horizontal sizes of the processing blocks 1602 and 1612 to be four times a horizontal size of a reference coding unit, and a vertical size thereof to be four times a vertical size of the reference coding unit, according to an embodiment. The image decoding apparatus 150 may determine a determining order of at least one reference coding unit in at least one processing block.

According to the embodiment, the image decoding apparatus 150 may determine each of the processing blocks 1602 and 1612 included in the picture 1600 based on a size of a processing block, and may determine a determining order of at least one reference coding unit included in each of the processing blocks 1602 and 1612. According to the embodiment, determining of a reference coding unit may include determining of a size of the reference coding unit.

According to the embodiment, the image decoding apparatus 150 may obtain, from a bitstream, information about a determining order of at least one reference coding unit included in at least one processing block and may determine the determining order of the at least one reference coding unit based on the obtained information. The information about a determining order may be defined as an order or direction of determining reference coding units in a processing block. That is, an order of determining reference coding units may be independently determined per processing block.

According to the embodiment, the image decoding apparatus 150 may obtain, from a bitstream, information about a determining order of a reference coding unit according to certain data units. For example, the receiver 160 may obtain, from the bitstream, the information about a determining order of a reference coding unit according to data units, such as images, sequences, pictures, slices, slice segments, and processing blocks. Since the information about a determining order of a reference coding unit indicates a determining order of a reference coding unit in a processing block, the information about a determining order may be obtained per certain data unit including an integer number of processing blocks.

According to the embodiment, the image decoding apparatus 150 may determine at least one reference coding unit based on the determined order.

According to the embodiment, the receiver 160 may obtain, from the bitstream, information about a determining order of a reference coding unit, as information related to the processing blocks 1602 and 1612, and the image decoding apparatus 150 may determine an order of determining at least one reference coding unit included in the processing blocks 1602 and 1612 and determine at least one reference coding unit included in the picture 1600 according to a determining order of a coding unit. Referring to FIG. 16, the image decoding apparatus 150 may determine determining orders 1604 and 1614 of at least one reference coding unit respectively related to the processing blocks 1602 and 1612. For example, when information about a determining order of a reference coding unit is obtained per processing block, determining orders of a reference coding unit related to the processing blocks 1602 and 1612 may be different from each other. When the determining order 1604 related to the processing block 1602 is a raster scan order, reference coding units included in the processing block 1602 may be determined according to the raster scan order. On the other hand, when the determining order 1614 related to the processing block 1612 is an inverse order of a changed raster scan order, reference coding units included in the processing block 1612 may be determined in the inverse order of the changed raster scan order.

FIGS. 17 through 29 describe a most probable chroma (MPC) mode with respect to a chroma block. The MPC mode is a method of predicting chroma samples of a current chroma block according to a prediction result or reconstruction result of luma samples included in a current luma block and correlation information of a luma value and a chroma value obtained from blocks decoded before a current chroma block. A prediction method according to the MPC mode will now be described in detail.

Figure 17:
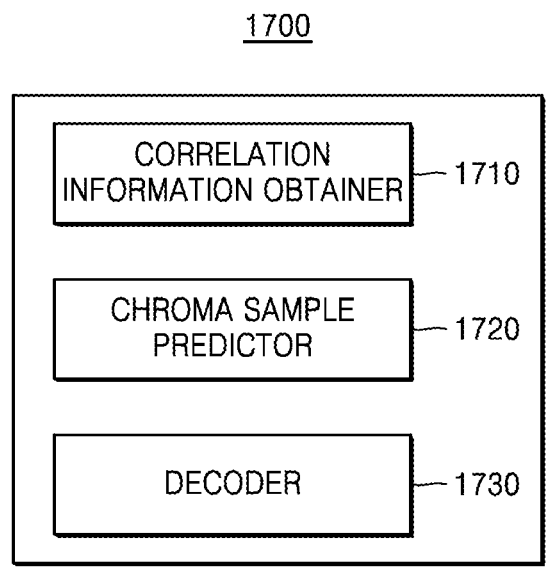
FIG. 17 illustrates a video decoding apparatus for performing chroma intra prediction.

FIG. 17 illustrates a video decoding apparatus 1700 for performing chroma intra prediction.

The video decoding apparatus 1700 includes a correlation information obtainer 1710, a chroma sample predictor 1720, and a decoder 1730. Referring to FIG. 17, the correlation information obtainer 1710, the chroma sample predictor 1720, and the decoder 1730 are formed as separate elements, but in another embodiment, the correlation information obtainer 1710, the chroma sample predictor 1720, and the decoder 1730 may be integrated to be implemented as one element.

Referring to FIG. 17, the correlation information obtainer 1710, the chroma sample predictor 1720, and the decoder 1730 are seen as elements located within one apparatus, but the correlation information obtainer 1710, the chroma sample predictor 1720, and the decoder 1730 are not required to be physically adjacent to each other. Thus, in another embodiment, the correlation information obtainer 1710, the chroma sample predictor 1720, and the decoder 1730 may be dispersed.

The correlation information obtainer 1710, the chroma sample predictor 1720, and the decoder 1730 may be implemented by one processor. In another embodiment, the correlation information obtainer 1710, the chroma sample predictor 1720, and the decoder 1730 may be implemented by a plurality of processors.

The correlation information obtainer 1710, the chroma sample predictor 1720, and the decoder 1730 may be stored in the form of a program in a storage medium of the video decoding apparatus 1700. Also, the program that performs functions of the correlation information obtainer 1710, the chroma sample predictor 1720, and the decoder 1730 may be externally obtained when required by the video decoding apparatus 1700.

The correlation information obtainer 1710 may obtain correlation information of a luma value and a chroma value from an MPC mode reference region of a current chroma block. The correlation information includes a correlation between a certain luma value and a chroma value. For example, when a luma value of a luma sample is 49 and a chroma value of a chroma sample is 117, wherein the luma sample and the chroma sample are at the same location, it may be interpreted that the luma value 49 and the chroma value 117 have a correlation. Accordingly, information indicating that the luma value 49 and the chroma value 117 are correlated with each other may be included in the correlation information.

The correlation information obtainer 1710 may determine that the certain luma value and the chroma value have the correlation by statistically processing correlations between luma samples and chroma samples from a plurality of locations. It is highly likely that samples in the same picture have the same attributes. Accordingly, it is highly likely that the certain luma value and the chroma value are correlated with each other in the same picture. Thus, chroma samples of the current chroma block may be predicted at a high accuracy by statistically analyzing luma samples and chroma samples pre-reconstructed before the current chroma block. For example, when there is a plurality of locations where the luma value 49 and the chroma value 117 are connected to each other, it may be predicted that the chroma value is 117 at the location where the luma value is 49.

The correlation information obtainer 1710 may determine the MPC mode reference region for obtaining the correlation information. The MPC mode reference region denotes a region where samples required for prediction of the current chroma block are located. A size of the MPC mode reference region may be determined to have optimum prediction efficiency according to various embodiments.

According to an embodiment, the MPC mode reference region may be located in a certain direction from the current chroma block. In detail, the MPC mode reference region may exist in a direction where a block decoded before the current chroma block exists, according to a scan order of a current picture. For example, when decoding is performed according to a raster scan order, the MPC mode reference region may be located in at least one of a left direction, an upper direction, an upper left direction, an upper right direction, and a lower left direction of the current chroma block. According to an embodiment, the MPC mode reference region may be located only in the left, upper, or upper left direction of the current chroma block.

According to an embodiment, a distance between a reference sample included in the MPC mode reference region and the current chroma block may be within a certain sample distance. Samples adjacent to the current chroma block are highly likely to have the same attributes as a sample included in the current chroma block. For example, samples that are within a 4-sample distance from the current block may be included in the MPC mode reference region. Accordingly, the samples that are outside the 4-sample distance from the current block may be excluded from the MPC mode reference region.

A direction and sample distance of the MPC mode reference region may be determined according to MPC mode reference region information obtained from the bitstream. The MPC mode reference region information includes information about how the MPC mode reference region of the current chroma block is determined. The MPC mode reference region information may include a direction and sample distance providing optimum encoding efficiency. The MPC mode reference region information may be obtained with respect to a coding unit and an upper data unit of the coding unit.

The sample distance may be determined according to the size of the current chroma block, not the MPC mode reference region information. For example, the sample distance may be determined to be the half of a width (height) of the current chroma block. Thus, when the width (height) of the current chroma block is 8, the sample distance may be determined to be 4. As another example, the sample distance may be determined to be the width (height) of the current chroma block or the twice the width (height) of the current chroma block.

As another example, the sample distance may be determined according to resolution of the current picture. When the resolution of the current picture is high, the number of samples correlated with the current chroma block is high, and thus the sample distance may be set to increase in proportion to the resolution of the current picture. Also, the sample distance may be determined according to a slice type to which the current chroama block belongs. For example, the sample distance may be determined based on whether the current block belongs to a slice of a slice type using only intra prediction.

According to an embodiment, the MPC mode reference region may be a region of all blocks decoded before decoding of the current chroma block. When all blocks are included in the MPC mode reference region, the direction and sample distance of the MPC mode reference region may not need to be determined. The correlation information is updated whenever a chroma block is decoded, and may be used until the last chroma block of the current picture is decoded.

Figure 18:
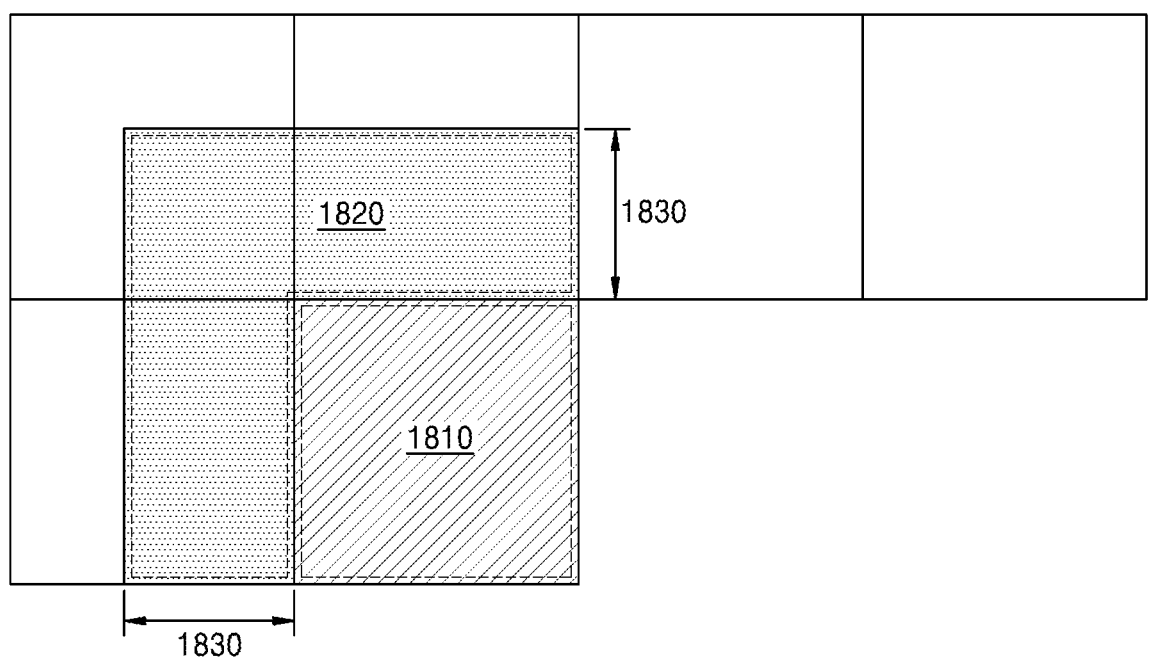
FIG. 18 illustrates an embodiment of a most probable chroma (MPC) mode reference region.

FIG. 18 illustrates an embodiment of a MPC mode reference region. When a current chroma block 1810 is predicted in an MPC mode, an MPC mode reference region 1820 is analyzed. In FIG. 18, the MPC mode reference region 1820 includes samples that are away from a boundary of the current chroma block 1810 by a uniform sample distance in a left, upper, and upper left directions. In FIG. 18, the MPC mode reference region 1820 is located in the left, upper, and upper left directions from the current chroma block 1810, but according to an embodiment, may be located in lower left and upper right directions. In FIG. 18, the MPC mode reference region 1820 is a part of a decoded region of a current picture, but according to an embodiment, may be set to be all of the decoded region of the current picture.

A sample distance 1830 for determining the MPC mode reference region 1820 of FIG. 18 may be determined according to the current chroma block 1810. In detail, the sample distance 1830 may increase in proportion to a size of the current chroma block 1810. For example, the sample distance 1830 may be adjusted to a certain ratio of a height or width of the current chroma block 1810.

The correlation information obtainer 1710 may obtain a luma-chroma pair including a luma value of a luma sample and a chroma value of a chroma value, with respect to the luma sample and the chroma sample at the same location in the MPC mode reference region 1820. For example, when the luma value of the luma sample is 49 and the chroma value of the chroma sample is 117, wherein the luma sample and the chroma sample are at the same location, the luma-chroma pair of 49-117 is generated.

The correlation information obtainer 1710 may scan the MPC mode reference region 1820 and reflect luma-chroma pairs that are sequentially obtained to a luma-chroma 2D histogram. A method of reflecting the luma-chroma pairs to the luma-chroma 2D histogram may be performed according to Equation 1 below.

$$\text{Hist}[Y][Cr(Cb)] = \text{Hist}[Y][Cr(Cb)] + 1, Y = Y[i][j], Cr(Cb) = Cr(Cb)[i][j], i,j \in \Omega \quad \text{[Equation 1]}$$

In Equation 1, $\Omega$ denotes an MPC mode reference region. Accordingly, (i,j) denote a location included in the MPC mode reference region. Y denotes a luma value, and Cr and Cb denote chroma values. Since Equation 1 may be applied to predicting of both Cr and Cb, a chroma value is indicated by Cr(Cb). Y[i][j] denotes a luma value at the location (i,j), and Cr(Cb)[i][j] denotes a chroma value at the location (i,j). Hist[Y][Cr(Cb)] indicates (Y,Cr(Cb)) accumulation. According to Equation 1, Hist[Y][Cr(Cb)] indicated by a luma-chroma pair according to the location (i,j) is increased by 1.

Thus, according to Equation 1, it is determined that Hist[Y][Cr(Cb)] with respect to a luma-chroma pair corresponding to one location of an MPC mode reference region is increased whenever the location is scanned. Accordingly, when the MPC mode reference region is entirely scanned, a histogram showing an accumulated distribution of luma-chroma pairs is completed. An example of a luma-chroma 2D histogram is described with reference to FIG. 19.

Figure 19:
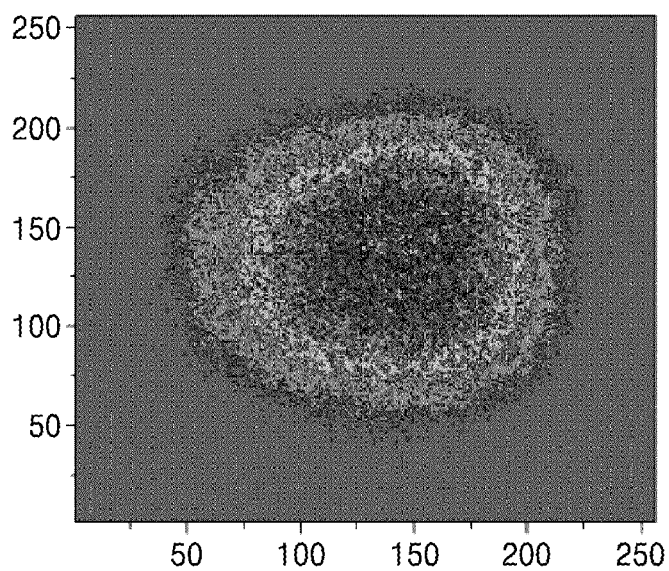
FIG. 19 illustrates an embodiment of a luma-chroma 2-dimensional (2D) histogram.

FIG. 19 illustrates an embodiment of a luma-chroma 2D histogram. According to FIG. 19, an x-axis of the luma-chroma 2D histogram indicates a luma value and a y-axis indicates a chroma value. Also, a distribution of luma-chroma pairs included in an MPC mode reference region is shown on a plane of the luma-chroma 2D histogram. A mode chroma value or average chroma value is obtained with respect to each luma value or luma range, according to the luma-chroma D histogram of FIG. 19.

The correlation information obtainer 1710 may determine a method of matching a luma sample and a chroma sample, according to a color format. For example, when the color format is 4:4:4, density of the luma sample and the chroma sample are the same, and thus all luma samples and chroma samples in the MPC mode reference region may be matched in one-on-one manner. Accordingly, the luma-chroma pair may be generated with respect to all luma samples in the MPC mode reference region.

However, when the color format is 4:2:2, the density of the luma samples is twice the density of the chroma samples, and thus the luma samples and the chroma samples do not match in one-on-one manner. Accordingly, only half of the all luma samples in the MPC mode reference region may be determined to match the chroma samples. Alternatively, two luma samples may be determined to match one chroma sample.

Similarly, when the color format is 4:2:0, the density of luma samples is four times the density of chroma samples, and thus the luma samples and the chroma samples do not match in one-on-one manner. Accordingly, only ¼ of the all luma samples in the MPC mode reference region may be matched to the chroma samples. Alternatively, 4 luma samples may be determined to match one chroma sample.

Figure 20:
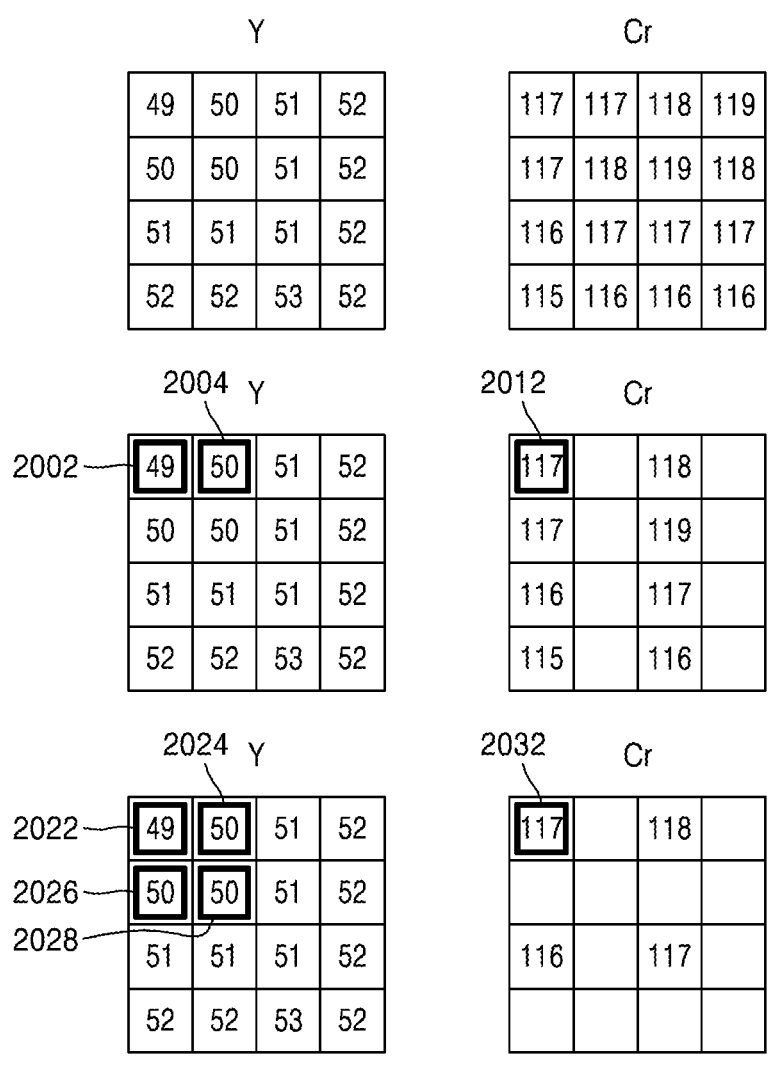

FIG. 20 describes a method of matching a luma sample and a chroma sample according to a color format. FIG. 20 illustrates luma (Y) blocks and chroma (Cr) blocks, which have a 4×4 size.

An upper embodiment of FIG. 20 describes a method of matching a luma sample and a chroma sample when a color format is 4:4:4. When the color format is 4:4:4, the densities of luma samples and chroma samples are the same, and thus the luma samples and the chroma samples are matched according to sample locations. Accordingly, 16 luma-chroma pairs may be generated with respect to 16 luma samples.

A middle embodiment of FIG. 20 describes a method of matching a luma sample and a chroma sample when the color format is 4:2:2. When the color format is 4:2:2, the density of luma samples is twice the density of chroma samples. Accordingly, only half of the all luma samples in the middle embodiment of FIG. 20 may be determined to match the chroma samples. Alternatively, the 16 luma samples may be generated to match the 8 chroma samples in a 2:1 ratio.

For example, only the luma samples at locations where the chroma samples are located may be matched to the chroma samples. Thus, a luma sample 2002 may be matched to a chroma sample 2012, and thus a luma-chroma pair of 49-117 may be generated. However, since there is no chroma sample at a location where a luma sample 2004 is located, the luma sample 2004 is not matched to any chroma sample. According to an embodiment, the luma sample 2004 may be matched to the chroma sample 2012 instead of the luma sample 2002, or an average of the luma samples 2004 and 2004 may be matched to the chroma sample 2012.

As another example, each of the luma samples 2002 and 2004 may be matched to the chroma sample 2012. Accordingly, a luma-chroma pair of 49-117 may be generated from the luma sample 2002 and the chroma sample 2012, and a luma-chroma pair of 50-117 may be generated from the luma sample 2004 and the chroma sample 2012.

A lower embodiment of FIG. 20 describes a method of matching luma samples and chroma samples when a color format is 4:2:0. When the color format is 4:2:0, the density of luma samples is four times the density of chroma samples. Accordingly, only ¼ of the all luma samples in the lower embodiment of FIG. 20 may be determined to match chroma samples. Alternatively, the 16 luma samples may be generated to match the 4 chroma samples in a 4:1 ratio.

For example, only the luma samples at locations where the chroma samples are located may be matched to the chroma samples. Thus, a luma-chroma pair of 48-117 may be generated when a luma sample 2022 and a chroma sample 2032 are matched to each other. However, since there is no chroma sample at locations where luma samples 2024, 2026, and 2028 are located, the luma samples 2024, 2026, and 2028 are not matched to any chroma sample. According to an embodiment, one of the luma samples 2024, 2026, and 2028 may be matched to the chroma sample 2032 instead of the luma sample 2022, or an average of the luma samples 2022 through 2028 may be matched to the chroma sample 2032.

As another example, each of the luma samples 2022 through 2028 may be matched to the chroma sample 2032. Accordingly, one luma chroma pair of 49-117 may be generated from the luma sample 2022 and the chroma sample 2032, and three luma-chroma pairs of 50-117 may be generated from the luma samples 2024, 2026, and 2028 and the chroma sample 2032.

The correlation information obtainer 1710 may obtain correlation information by determining a mode chroma value corresponding to each luma value, according to a luma-chroma 2D histogram. According to the luma-chroma 2D histogram, the correlation information obtainer 1710 may obtain an accumulated distribution map of chroma values with respect to each luma value. Also, the correlation information obtainer 1710 may obtain a mode chroma value from the accumulated distribution map of the chroma values. Accordingly, the mode chroma value may be obtained with respect to each luma value from the luma-chroma 2D histogram. Stochastically, with respect to a current chroma block, since a probability that a mode chroma value may appear is the highest as in the MPC mode reference region, the mode chroma value may be used as a prediction value.

In detail, when the mode chroma value with respect to a luma value of 49 is 117 in the MPC mode reference region, a prediction value of a chroma sample where a luma value of a luma sample at the same location in the current chroma block is 49 may be determined to be 117.

The correlation information obtainer 1710 may obtain the correlation information by determining an average chroma value corresponding to each luma value, according to the luma-chroma 2D histogram. According to the luma-chroma 2D histogram, the correlation information obtainer 1710 may obtain an average value of chroma values with respect to each luma value. Also, the correlation information obtainer 1710 may obtain the average chroma value from the average value of the chroma values. Like the mode chroma value, it is also stochastically highly likely that the average chroma value may have high accuracy in chroma sample prediction of the current chroma block. Thus, according to an embodiment, the average chroma value may be used instead of the mode chroma value.

The correlation information obtainer 1710 may reflect only the luma-chroma pair with respect to luma values included in a current luma block to the luma-chroma 2D histogram. In an MPC mode, the current chroma block is predicted according to the luma values included in the current luma block. Accordingly, a mode chroma value with respect to a luma block that is not included in the current luma block is not required. Thus, in order to reduce complexity of calculation, the luma-chroma pairs with respect to the luma values included in the current luma block in the MPC mode reference region may not be reflected to a 2D histogram.

The correlation information obtainer 1710 may determine a default value as a mode chroma value with respect to a luma value whose luma-chroma pair is not found in the MPC mode reference region. For example, when there is a luma sample having a luma value of 49 in the current luam block but there is no luma-chroma pair having a luma value of 49 in the MPC mode reference region, it is unable to obtain a mode chroma value with respect to the luma value of 49 from the MPC mode reference region. Accordingly, a mode chroma value of the luma value whose luma-chroma pair does not exist in the MPC mode reference region may be determined to be the default value.

The default value may be determined to be a pre-determined arbitrary value. For example, when the default value is 120 and there is no luma-chroma pair whose luma value is 49 in the MPC mode reference region, the mode chroma value with respect to the luma value of 49 is determined to be 120.

Also, the default value may be determined to be an average value of chroma values in the MPC mode reference region. For example, when the average value of chroma values in the MPC mode reference region is 120 and there is no luma-chroma pair whose luma value is 49 in the MPC mode reference region, the mode chroma value with respect to the luma value of 49 is determined to be 120.

With respect to a luma value whose luma-chroma pair is not found in the MPC mode reference region, the correlation information obtainer 1710 may determine a mode chroma value of an adjacent luma value as a mode chroma value of the luma value. For example, when there is no luma-chroma pair whose luma value is 49 but there is a luma-chroma pair whose luma value is 50 in the MPC mode reference region, a mode chroma value of the luma value of 50 may be determined as a mode chroma value of the luma value of 49.

The correlation information obtainer 1710 may reflect luma-chroma pairs to the 2D histogram based on weights according to how close a location of a reference sample from which a luma-chroma pair is derived is to the current chroma block. Since it is highly likely that samples in the current chroma block may share the same properties as reference samples at locations near the current chroma block, a large weight may be assigned to a luma-chroma pair derived from reference samples close to the current chroma block. Accordingly, prediction accuracy according to the MPC mode may be improved. A method of reflecting a weight of a luma-chroma pair to a luma-chroma 2D histogram may be performed according to Equation 2 below.

$$\text{Hist}[Y][Cr(Cb)] = \text{Hist}[Y][Cr(Cb)] + W, \ Y = Y[i][j],$$
$$Cr(Cb) = Cr(Cb)[i][j], \ i,j \in \Omega \qquad \text{[Equation 2]}$$

$\Omega$, $(i,j)$, $Y[i][j]$, $Cr(Cb)[i][j]$, and $\text{Hist}[Y][Cr(Cb)]$ in Equation 2 denote the same as those of Equation 1. W in Equation 2 denotes a weight and is determined based on a distance between a current chroma block and a reference sample. In detail, W may be set to decrease when the distance between the current chroma block and the reference sample increases. Thus, according to Equation 2, Hist[Y][Cr(Cb)] indicated by a luma-chroma pair according to a location (i,j) is increased by W according to the distance between the current chroma block and the reference sample.

The correlation information obtainer 1710 may determine a luma range including a plurality of consecutive luma values. When a mode chroma value is to be obtained with respect to all luma values included in the current luma block, complexity of calculation may increase. Also, when the number of reference samples with respect to a certain luam value is low, a wrong prediction value may be derived due to noise. Accordingly, by obtaining a mode chroma value with respect to the luma range including the plurality of consecutive luma values, complexity of calculation may be reduced and accuracy of prediction may be increased. A method of reflecting a luma-chroma pair to a luma-chroma 2D histogram according to luma range may be performed according to Equation 3 below.

$$\text{Hist}[Y\!\!>\!\!>\!\!m][Cr(Cb)]=\text{Hist}[Y\!\!>\!\!>\!\!m][Cr(Cb)]+1,\ Y=Y[i][j],\ Cr(Cb)=Cr(Cb)[i][j],\ i,j\in\Omega \quad \text{[Equation 3]}$$

$\Omega$, (i,j), Y[i][j], Cr(Cb)[i][j], and Hist[Y][Cr(Cb)] in Equation 3 denote the same as those of Equation 1. ">>" in Equation 3 denotes a right shift operation. Accordingly, "Y>>m" denotes a value obtained by shifting Y represented in a bit to the right by m bits. For example, when Y denoting a luma value is 49 , Y is represented in a form of a bit of 00110001. Also, when m is 3, the right 3 bits of Y are shifted to the right, and thus "Y>>m" is represented in a form of a bit of 00110. Thus, according to Equation 3, Hist[Y>>m][Cr(Cb)] indicated by the luma range including the luma value according to the location (i,j) and the chroma value is increased by 1.

A size of the luma range may be determined according to a bit depth of the luma value. For example, when the bit depth increases by 1, the size of luma range is increased twice. In detail, when the size of the luma range is set to be 8 when the bit depth of a luma value is 8-bit, the size of luma range may be set to be 32 when the bit depth of luma value is 10-bit. However, an embodiment is not limited thereto, and the size of luma range with respect to the bit depth of luma value may be easily adjusted by one of ordinary skill in the art based on statistical data.

According to an embodiment, the size of luma range may be determined according to luma range size information obtained from a bitstream, instead of the bit depth of luma value. The luma range size information may include a size of optimum luma range determined during an encoding process.

The luma range may be determined according to distribution of luma values of the current luma block. For example, when the luma values are distributed in 60 to 75 sections, the luma range may be determined by splitting the 60 to 75 sections to a certain number. In detail, when 4 luma ranges are required, the sections may be split into 60 to 63 sections, 64 to 67 sections, 68 to 71 sections, and 72 to 75 sections.

Figure 21A:
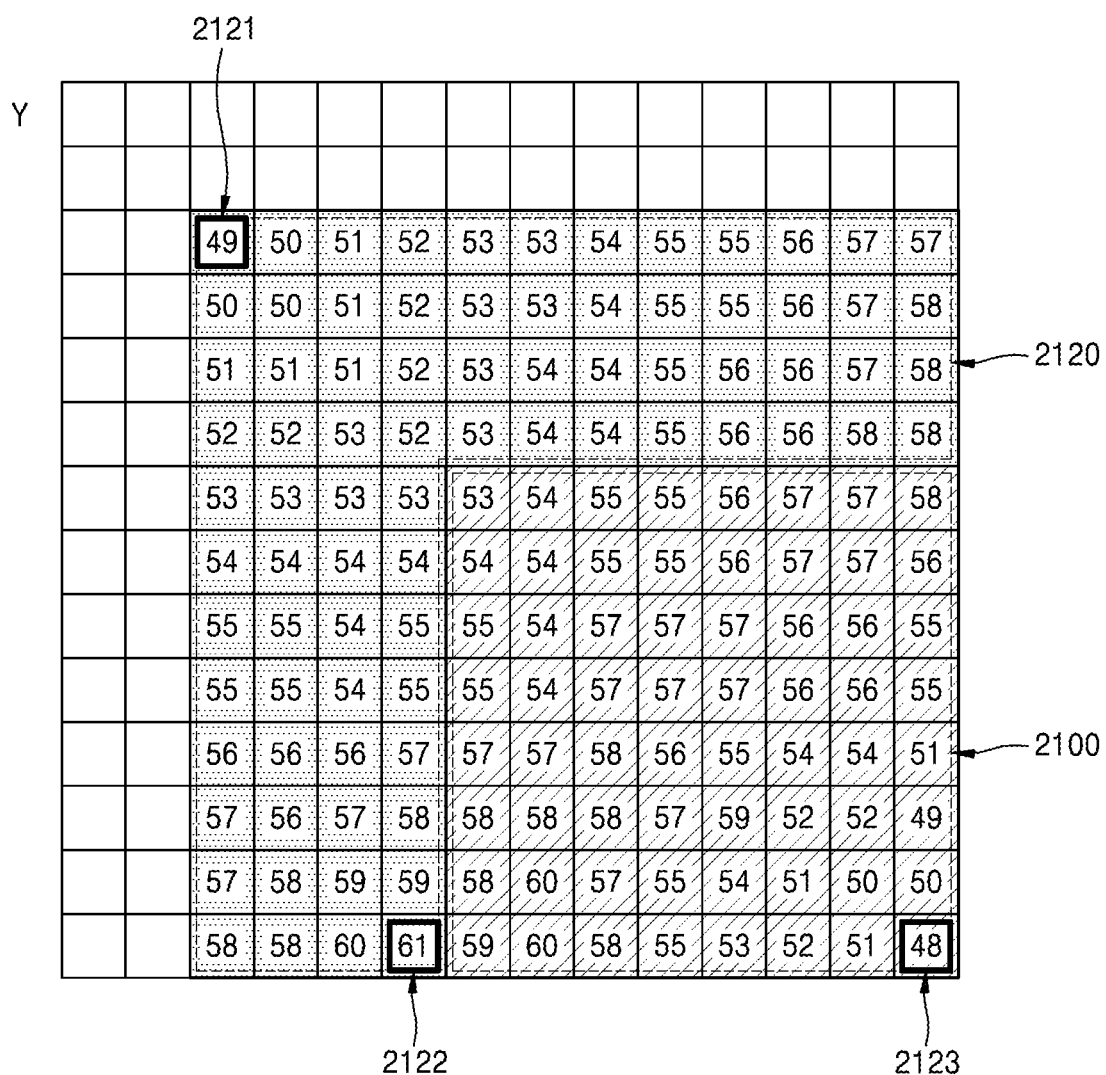
FIGS. 21A and 21B describe methods of predicting current chroma blocks by analyzing MPC mode reference regions.
Figure 21B:
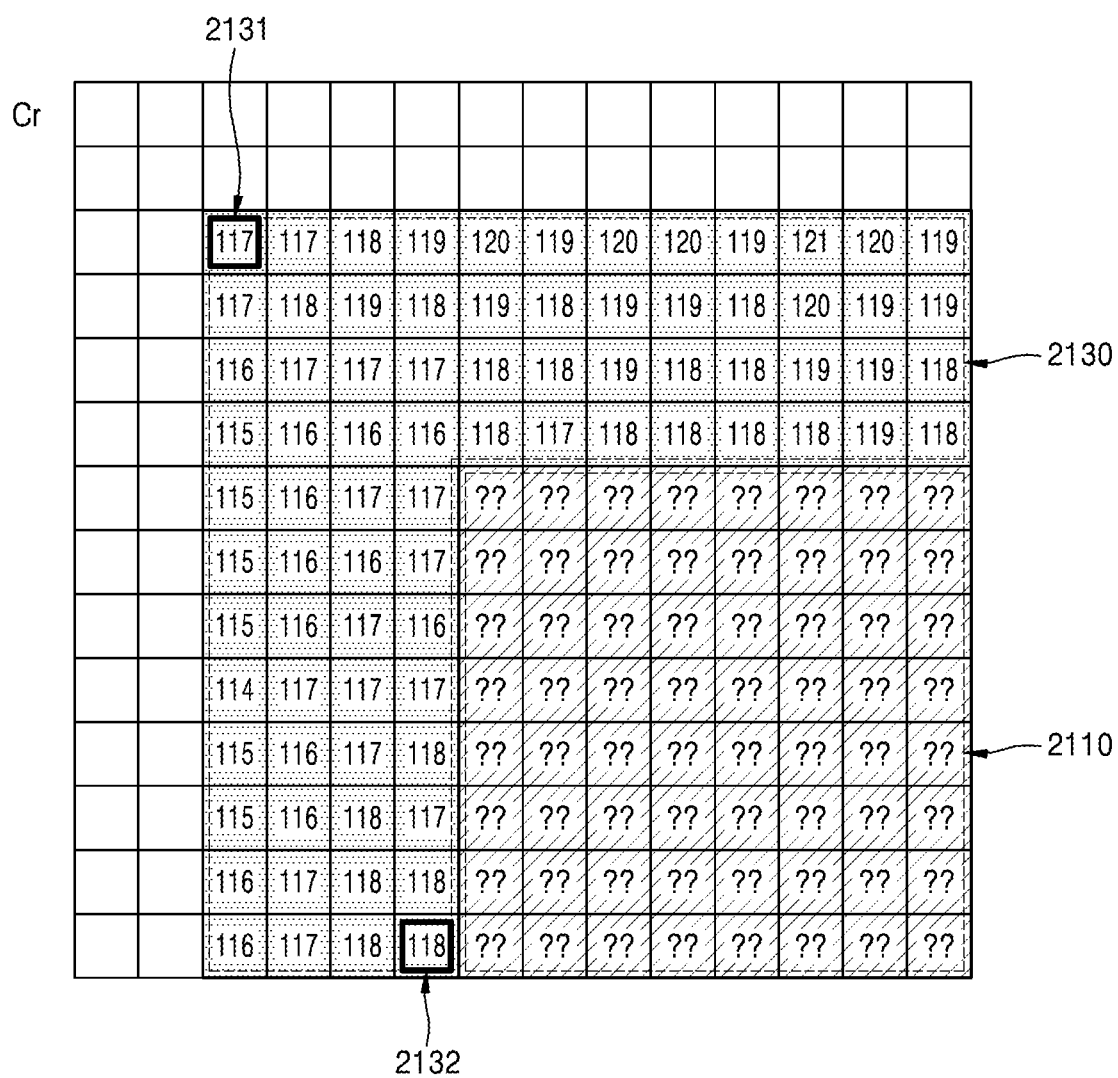

The correlation information obtainer 1710 may determine the mode chroma value with respect to each luma range, according to the luma-chroma 2D histogram. Accordingly, a plurality of luma values included in the luma range corresponds to one mode chroma value. Hereinafter, an operation of obtaining the luma-chroma 2D histogram and an operation of determining the correlation information according to the luma-chroma 2D histogram are described with reference to FIGS. 21A through 22B. according FIGS. 21A and 21B are provided to describe methods of predicting a current chroma block 2110 by analyzing MPC mode reference regions 2120 and 2130. FIG. 21A illustrates luma values of luma samples included in the current luma block 2100 and luma values of luma samples included in the MPC mode reference region 2120 of a luma picture. Also, FIG. 21B illustrates a current chroma block 2110 on which a prediction operation is not yet performed and chroma values of chroma samples included in the MPC mode reference region 2130 of a chroma picture. In FIG. 21B, the chroma samples of the current chroma block 2110 are not yet predicted and reconstructed. Accordingly, the chroma samples of the current chroma block 2110 are predicted according to correlation information to the luma samples and the chroma samples included in the MPC mode reference regions 2120 and 2130 and the luma values of luma samples of the current luma block 2100.

The luma samples and the chroma samples at the same locations in the MPC mode reference regions 2120 and 2130 are matched to each other. For example, the luma sample and the chroma sample located at first locations 2121 and 2131 are respectively 49 and 117. Accordingly, a luma-chroma pair of the first locations 2121 and 2131 is determined to be (49, 117).

Among the luma samples included in the MPC mode reference region 2120 of the luma picture, a luma-chroma pair may not be generated with respect to a luma sample having a luma value not included in the current luma block 2100. For example, since a luma value of a luma sample at second locations 2122 and 2132 is 61 and the luma sample having the luma value of 61 is not included in the current luma block 2100, a luma-chroma pair may not be generated with respect to the second locations 2122 and 2132.

On the other hand, a mode chroma value or average chroma value with respect to a luma value included in the current luma block 2100 but not included in the MPC mode reference region 2120 of the luma picture may be determined to be a default value. For example, since a luma value of a luma sample located at a third location 2123 is 48 and there is no luma sample having a luma value of 48 is not in the MPC mode reference region 2120 of the luma picture, a mode chroma value or average chroma value with respect to the luma value of 48 may be determined to be the default value. The default value may be a mode value or average value of chroma values of the MPC mode reference region 2130 of the chroma picture. As another example, the default value may be a mode chroma value or average chroma value of a luma value most adjacent to the luma value of 48.

Figure 22A:
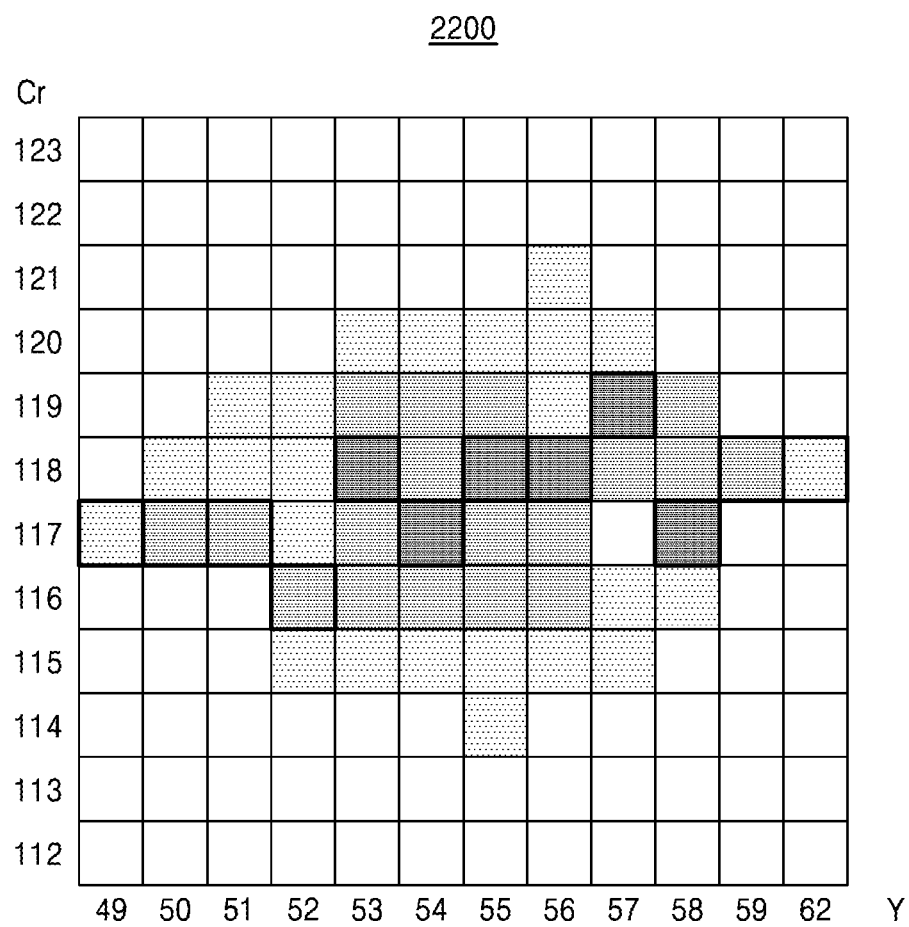
FIGS. 22A and 22B illustrate luma-chroma 2D histograms obtained by analyzing the MPC mode reference regions of FIGS. 21A and 21B.

FIG. 22A illustrates a luma-chroma 2D histogram 2200 obtained by analyzing the MPC mode reference regions 2120 and 2130 of FIGS. 21A and 21B. In the luma-chroma 2D histogram 2200, an x-axis indicates a luma value and a y-axis indicates a chroma value. Also, a 2D plane of the luma-chroma 2D histogram indicates a distribution of luma-chroma pairs in the MPC mode reference regions 2120 and 2130.

In the luma-chroma 2D histogram 2200, a white region indicates that there is no corresponding luma-chroma pair. Also, a light gray region indicates that there is one corresponding luma-chroma pair, and a gray region indicates that there are two corresponding luma-chroma pairs. Lastly, a black region indicates that there are at least three corresponding luma-chroma pairs.

A mode chroma value with respect to each luma value may be calculated from the luma-chroma 2D histogram. For example, a mode chroma value with respect to a luma value of 54 is 117. Similarly, an average chroma value may be calculated according to the luma-chroma 2D histogram 2200. Also, the current chroma block is predicted by using the calculated mode chroma value or average chroma value.

Figure 22B:
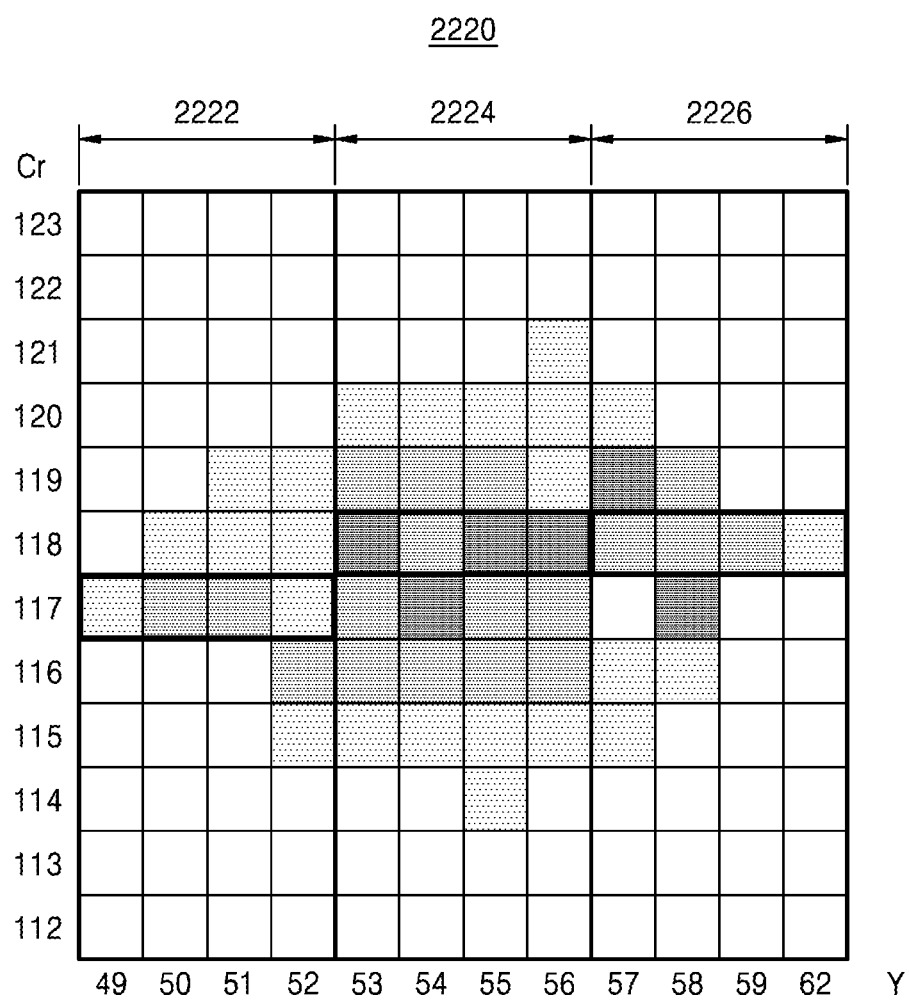

FIG. 22B illustrates a luma-chroma 2D histogram 2220 obtained by analyzing the MPC mode reference regions 2120 and 2130 of FIGS. 21A and 21B. Unlike the luma-chroma 2D histogram 2200, an ax-axis of the luma-chroma 2D histogram 2220 is split based on a luma range including a plurality of luma values. Accordingly, a mode chroma value with respect to each luma value is not obtained, but mode chroma values with respect to luma ranges 2222 through 2226 including a plurality of luma values is obtained. For example, a mode chroma value with respect to the luma range 2222 including luma values of 49 to 52 is determined to be 117. Also, mode chroma values with respect to the luma range 2224 including luma values of 53 to 56 and the luma range 2226 including luma values 57 to 60 are determined to be 118.

When the current chroma block is predicted in an MPC mode, the chroma sample predictor 1720 may predict a sample value of a chroma sample included in the current chroma block from luma samples of a luma block corresponding to the current chroma block according to the correlation information. A current luma block having the same size and located at the same location as the current chroma block is predicted or decoded before the current chroma block. Accordingly, the current chroma block may be predicted by using a prediction result or reconstruction result of the current luma block.

In order to determine a prediction value of a chroma sample, the chroma sample predictor 1720 may obtain a luma value of a luma sample at the same location as the chroma sample. Then, the chroma sample predictor 1720 may determine a mode chroma value corresponding to the obtained luma value as the prediction value of the chroma sample. For example, when a mode chroma value of a luma value of 49 is 117, a chroma value of a chroma sample whose luma value of the luma sample at the same location may be predicted to be 117.

FIG. 23A illustrates a prediction result of the current chroma block 2110 according to the luma-chroma 2D histogram 2200 of FIG. 22A. A current luma block 2300 is shown on the left of FIG. 23A and a prediction result of a current chroma block 2310 is shown on the right of FIG. 23A.

According to the luma-chroma 2D histogram 2200, a mode chroma value of a luma value of 52 is 116, mode chroma values of luma values of 49, 50, 51, 54, and 58 are 117, mode chroma values of luma values of 53, 55, 56, 59, and 60 are 118, and a mode chroma value of a luma value of 57 is 119. Also, since a mode chroma value with respect to a luma value of 48 is unable to be obtained from the luma-chroma 2D histogram 2200, the mode chroma value with respect to the luma value of 48 is determined to be 118 that is an average of all chroma values of the luma-chroma 2D histogram 2200. By reflecting such correlations, the current chroma block 2310 of FIG. 23A is predicted according to mode chroma values corresponding to luma values of the current luma block 2300.

FIG. 23B illustrates a prediction result of a current chroma block 2330 according to the luma-chroma 2D histogram 2220 of FIG. 22B. A current luma block 2320 is shown on the left of FIG. 23B and a prediction result of the current chroma block 2330 is shown on the right of FIG. 23B.

According to the luma-chroma 2D histogram, mode chroma values of luma values of 49 to 52 are 117 and mode chroma values of luma values of 53 to 60 are 118. Also, since it is unable to obtain a mode chroma value with respect to a luma value of 48 from the luma-chroma 2D histogram 2220, the mode chroma value with respect to the luma value of 48 is determined to be 118 that is an average of all chroma values of the luma-chroma 2D histogram 2220. Then, by reflecting such correlations, the current chroma block 2330 of FIG. 23B is predicted according to mode chroma values corresponding to the luma values of the current luma block 2320.

The chroma sample predictor 1720 may obtain intra mode information of a current chroma block from a bitstream. The intra mode information indicates an intra mode of the current chroma block. The intra mode information may indicate one of intra modes available in the current chroma block. The available intra modes may include at least one of a planar mode, a vertical mode, a horizontal mode, a DC mode, a DM mode, and an MPC mode. The intra mode information is described in detail with reference to FIG. 24.

Figures 24, 25:
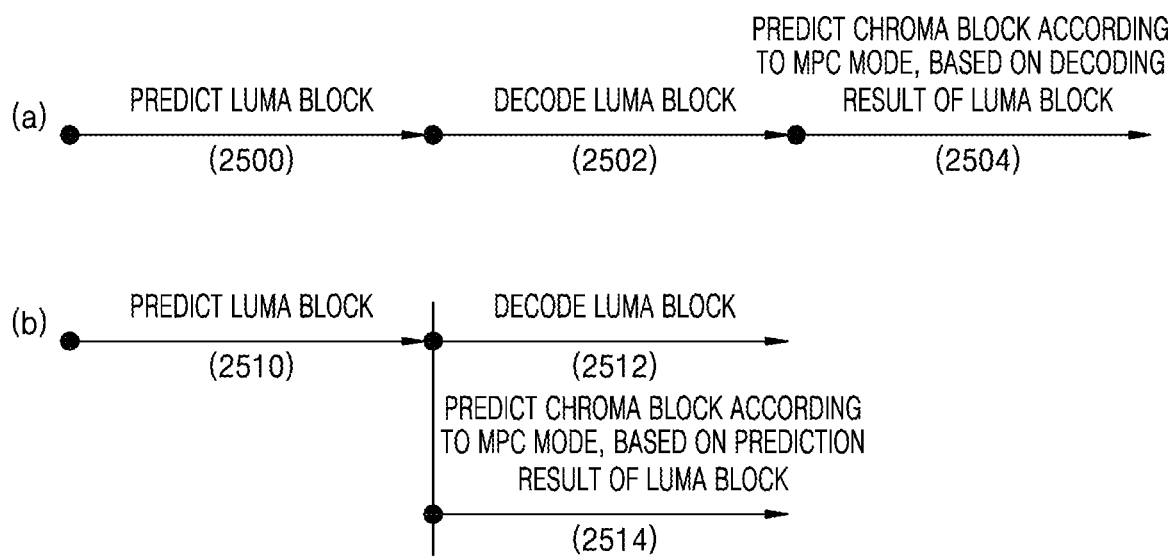
FIG. 24 illustrates a table for describing intra mode information indicating a prediction mode of a current chroma block.
FIG. 25 illustrates decoding orders of a current luma block and a current chroma block.

FIG. 24 illustrates a table for describing intra mode information indicating a prediction mode of a current chroma block. As an intra mode for a chroma block, at least one of a DM mode, a planar mode, a vertical mode, a horizontal mode, a DC mode, and an MPC mode may be used. The DM mode indicates a method of predicting the current chroma block in the same method as a luma intra mode. The planar mode indicates a method of predicting the current chroma block by double-interpolating adjacent samples of the current chroma block. The vertical mode indicates a method of predicting the current chroma block by using adjacent samples of the current block located in a vertical direction. The horizontal mode indicates a method of predicting the current chroma block by using adjacent samples of the current chroma block located in a horizontal direction. The DC mode indicates a method of predicting the current chroma block according to an average value of adjacent samples of the current chroma block. The MPC mode indicates a method of predicting the current chroma block according to correlation information about a luma value and a chroma value obtained in an MPC mode reference region.

A code assigning method of the intra mode information may be determined based on which prediction mode is allowed with respect to the current chroma block.

According to a first embodiment, when the DM mode and the MPC mode are allowed as an intra mode of the current chroma block, the intra mode information may be represented in one bit. For example, the MPC mode may be assigned to 0 of the intra mode information and the DM mode may be assigned to 1 of the intra mode information. Alternatively, the DM mode may be assigned to 0 of the intra mode information and the MPC mode may be assigned to 1 of the intra mode information.

According to a second embodiment, when the DM mode, the MPC mode, the vertical mode, the horizontal mode, and the DC mode are allowed as the intra mode of the current chroma block, the intra mode information may be represented in three bits. For example, the DM mode may be assigned to 0 of the intra mode information and the MPC mode may be assigned to 100 of the intra mode information. Also, the vertical mode, the horizontal mode, and the DC mode may be respectively assigned to 101, 110, and 111 of the intra mode information. The code assigning method of the intra mode information may be changed according to a statistical usage probability of the intra mode.

According to the third embodiment, when the DM mode, the MPC mode, the planar mode, the vertical mode, the horizontal mode, and the DC mode are allowed as the intra mode of the current chroma block, the intra mode information may be represented in four bits. For example, the MPC mode may be assigned to 0 of the intra mode information and the DM mode may be assigned to 10 of the intra mode information. Then, the planar mode, the vertical mode, the horizontal mode, and the DC mode may be respectively assigned to 1100, 1101, 1110, and 1111 of the intra mode information. The code assigning method of the intra mode information may be changed according to a statistical usage probability of the intra mode.

A function of the correlation information obtainer 1710 may be performed when the intra mode information indicates the MPC mode. When the function of the correlation information obtainer 1710 is performed even when the current chroma block is not predicted in the MPC mode, encoding and decoding performance is deteriorated due to unnecessary calculation, and thus the function of the correlation information obtainer 1710 is not performed when the intra mode information does not indicate the MPC mode.

The chroma sample predictor 1720 predicts a current chroma sample according to the intra mode based on the intra mode information. Thus, the chroma sample predictor 1720 may predict the current chroma sample according to a prediction method based on the MPC mode when the intra mode information indicates the MPC mode.

The chroma sample predictor 1720 may predict sample values of chroma samples of the current chroma block from decoded luma samples of a current luma block, after the current luma block corresponding to the current chroma block is decoded. Since the current chroma block is predicted according to a correlation between the luma value and the chroma value in the MPC mode, the current luma block is to be decoded before the current chroma block. Thus, the current luma block and the current chroma block may be sequentially decoded.

According to an embodiment, when the current luma block is inter-predicted, the chroma sample predictor 1720 may predict sample values of the chroma samples based on prediction values of the luma samples included in the current luma block. When the current luma block is inter-predicted, the current chroma block may be inter-predicted like the current luma block or intra-predicted according to the MPC mode.

A prediction result according to inter prediction is generally more accurate than a prediction result according to intra prediction. Thus, when the current luma block ins inter-predicted unlike the current luma block being intra-predicted, the current chroma block may be intra-predicted in the MPC mode according to the prediction result rather than a reconstruction result of the current luma block. When the current chroma block is predicted according to the prediction result of the current luma block, prediction accuracy may somewhat decrease compared to when the current chroma block is predicted according to the reconstruction result of the current luma block. However, since a decoding process after prediction of the current luma block and a predicting process of the current chroma block are performed in parallel, and thus a decoding speed may be increased.

Whether the sample value of the current chroma sample is predicted according to the prediction value of the current luma sample may be determined according to parallel prediction information obtained from the bitstream. When the parallel prediction information allows the decoding process after prediction of the current luma block and the predicting process of the current chroma block to be performed in parallel when the current luma block is inter-predicted, the prediction accuracy of the current chroma block may be decreased but the decoding speed may be increased. The parallel prediction information may be determined considering a decreased amount of the prediction accuracy of the current chroma block and an increased amount of the decoding speed during an encoding process. Hereinafter, predicting and decoding orders of the current luma block and the current chroma block are described with reference to FIG. 25.

FIG. 25 illustrates decoding orders of a current luma block and a current chroma block. According to an (a) flow diagram at the top of FIG. 25, prediction based on an MPC mode of the current chroma block is performed in operation 2504 according to a decoded current luma block after the current luma block is predicted in operation 2500 and decoded in operation 2502. Thus, according to the (a) flow diagram, decoding of the current luma block and the current chroma block are sequentially performed.

However, according to a (b) flow diagram at the bottom of FIG. 25, when a current luma block is inter-predicted, the current luma block may be decoded in operation 2512 and a current chroma block may be predicted based on a MPC mode in operation 2514 in parallel, after the current luma block is predicted in operation 2510. Since inter prediction is generally more accurate than intra prediction, a chroma sample may be accurately predicted using only a prediction value of a luma sample according to inter prediction. Thus, in a system capable of parallel operation, an operation speed may be improved when decoding according to the (b) flow diagram is performed.

The chroma sample predictor 1720 may smooth a prediction value of a chroma sample according to an adjacent sample of the predicted chroma sample. The prediction value of the chroma sample may be smoothed to improve prediction accuracy. Here, the prediction value may be smoothed according to a left sample and an upper sample of the chroma sample. During a smoothing process, since pre-reconstructed samples of a left block and an upper block of a current chroma block are referred to, a gap between the prediction value and an actual value may be reduced. The smoothing process may be performed according to Equation 4 below.

$$\text{Pred}[i,j]=\alpha_{00}\text{Pred}[i,j]+\alpha_{-1,0}\text{Pred}[i-1,j]+\alpha_{0,-1}\text{Pred}[i,j-1],\ 1=\alpha_{00}+\alpha_{-1,0}+\alpha_{0,-1}$$ [Equation 4]

(i,j) denotes a location of a sample that is smoothed. Pred[i,j] denotes a sample value of the sample that is smoothed, Pred[i−1,j] denotes a sample value of a left sample, and Pred[i,j−1] denotes a sample value of an upper sample. $\alpha_{00}$, $\alpha_{-1,0}$, and $\alpha_{0,-1}$ denote weights respectively for the sample value of the sample that is smoothed, the sample value of the left sample, and the sample value of the upper sample. Since the sum of $\alpha_{00}$, $\alpha_{-1,0}$, and $\alpha_{0,-1}$ is 1, Pred[i,j] at the left of Equation 4 is a weighted average value of Pred[i,j], Pred[i−1,j], and Pred[i,j−1] at the right. The smoothing described above may be performed in an order according to a raster scan from an upper left sample.

Figure 26:
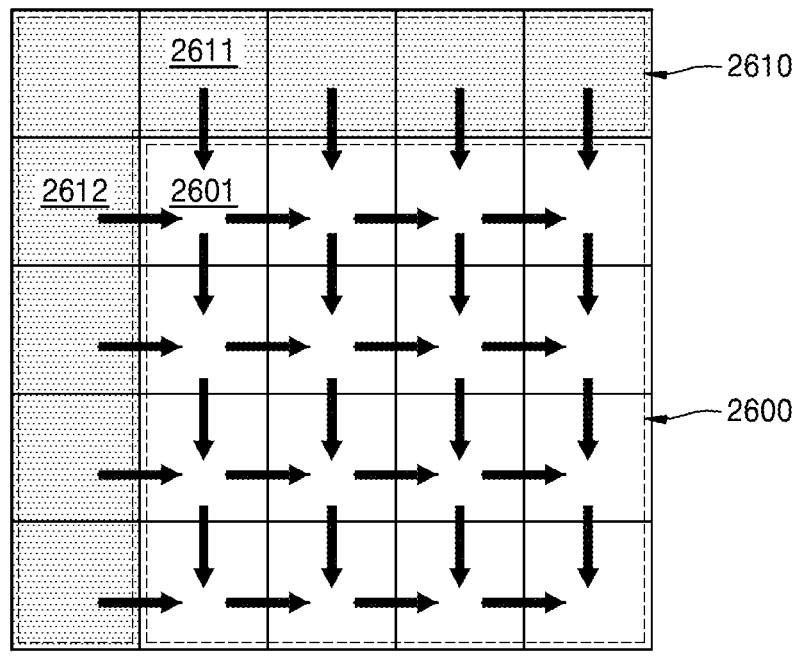
FIG. 26 illustrates a smoothing process of a prediction value of a current chroma block.

FIG. 26 illustrates a smoothing process of a prediction value of a current chroma block 2600. Prediction values of the current chroma block 2600 may be smoothed for accuracy of prediction after being predicted according to an MPC mode. Each of the prediction values may be smoothed based on a sample value of a left adjacent sample immediately at the left and a sample value of an upper adjacent sample immediately at the top. Prediction value of chroma samples at a left boundary and an upper boundary of the current chroma block 2600 have high prediction accuracy by being smoothed by sample values of pre-decoded samples 2610 of an adjacent block.

For example, a prediction value of a first sample 2601 located at the upper left of the current chroma block 2600 is smoothed by sample values of decoded two samples 2611 and 2612. Also, each of prediction values of other samples of the current chroma block 2600 is smoothed according to sample values of a left sample and upper sample in directions indicated by arrows in FIG. 26. For smoothing of the prediction value, the left and upper samples need to be decoded samples or smoothed samples. Thus, the prediction value of the first sample 2601 needs to be decoded first.

Then, the prediction values of other samples of the current chroma block 2600 are sequentially smoothed according to a scan order.

The decoder 1730 may reconstruct a current block based on the predicted sample values of the chroma samples.

Figure 27:
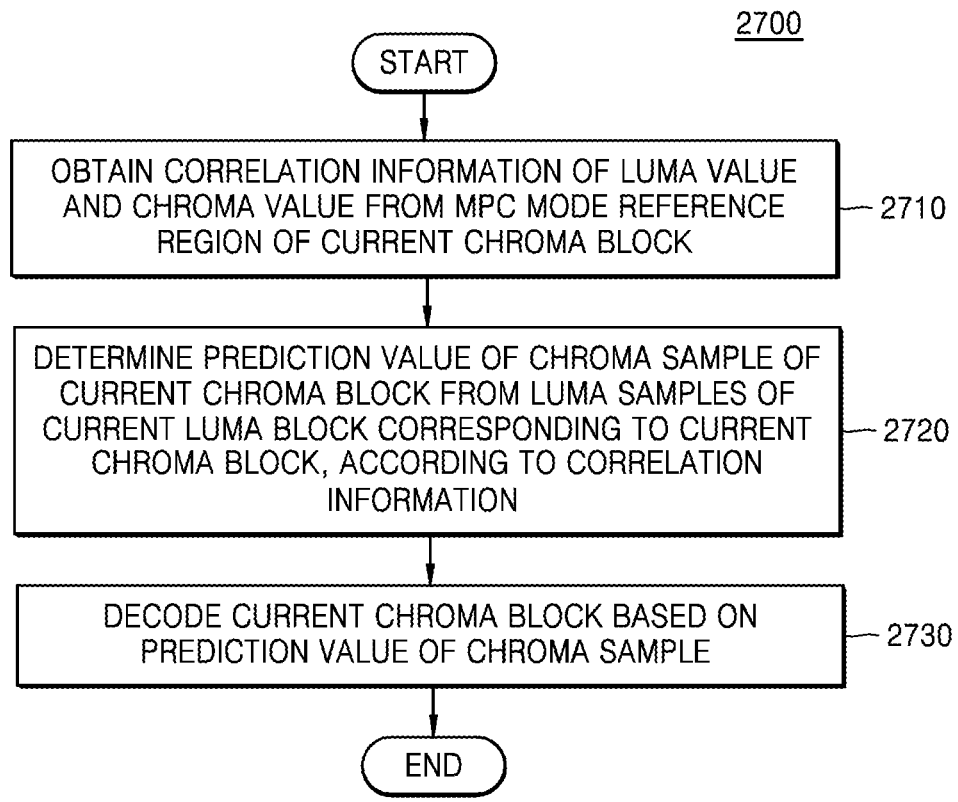
FIG. 27 is a flowchart of a method of decoding a current chroma block according to an MPC mode.

FIG. 27 is a flowchart of a method 2700 of decoding a current chroma block according to an MPC mode.

In operation 2710, correlation information of a luma value and a chroma value is obtained from an MPC mode reference region of a current chroma block.

The MPC mode reference region is located in left, upper, and upper left directions of the current chroma block, and may be located within a certain sample distance from a boundary of the current chroma block. The certain sample distance may be determined according to MPC mode reference region information obtained from a bitstream. Also, the certain sample distance may be determined according to at least one of a size of the current chroma block, resolution of a current picture, and a slice type, instead of the MPC mode reference region information.

According to another embodiment, the MPC mode reference region may include all blocks decoded before a current block is decoded.

In order to obtain the correlation information, a luma-chroma pair may be obtained from a luma sample and a chroma sample at the same location in the MPC mode reference region. The luma-chroma pair includes a luma value of a luma sample and a chroma value of a chroma sample, which are at the same location. Also, the luma-chroma pair may be reflected to a luma-chroma 2D histogram. The correlation information may be obtained by determining a mode chroma value or average chroma value corresponding to each luma value, according to the luma-chroma 2D histogram to which all luma-chroma pairs of the MPC mode reference region are reflected.

The luma-chroma 2D histogram may be completed with respect to a luma range including a plurality of consecutive luma values, instead of each luma value. The correlation information may be obtained by determining a mode chroma value or average chroma value with respect to each luma range, according to the luma-chroma 2D histogram according to luma ranges.

In operation 2720, a sample value of a chroma sample of the current chroma block is predicted from luma samples of a current luma block corresponding to the current chroma block, according to the correlation information.

After the current luma block corresponding to the current chroma block is reconstructed, the sample values of the chroma samples of the current chroma block may be predicted from a reconstruction result of the current luma block. When the current luma block is inter-predicted, according to an embodiment, the sample values of the chroma samples of the current chroma block may be predicted from a prediction result of the current luma block.

Prediction values of the chroma samples included in the current chroma block may be smoothed according to prediction values of adjacent samples adjacent to the chroma samples.

In operation 2730, the current chroma block is decoded based on the predicted sample values of the chroma samples.

Operations 2710 through 2730 may be performed by the correlation information obtainer 1710 to the decoder 1730 of FIG. 17. Also, functions performed by each component of the video decoding apparatus 1700 of FIG. 17 may be included in the method 2700 according to the MPC mode.

Figure 28:
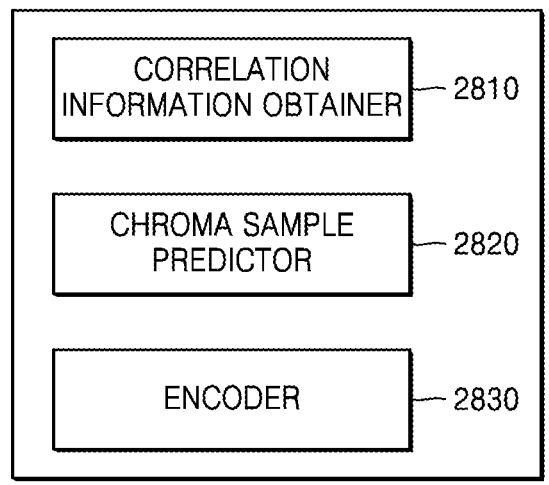
FIG. 28 illustrates a video encoding apparatus for performing chroma intra prediction.

FIG. 28 illustrates a video encoding apparatus 2800 for performing chroma intra prediction.

The video encoding apparatus 2800 includes a correlation information obtainer 2810, a chroma sample predictor 2820, and an encoder 2830. In FIG. 28, the correlation information obtainer 2810, the chroma sample predictor 2820, and the encoder 2830 are shown as separate elements, but in another embodiment, the correlation information obtainer 2810, the chroma sample predictor 2820, and the encoder 2830 may be integrated to be implemented as one element.

Referring to FIG. 28, the correlation information obtainer 2810, the chroma sample predictor 2820, and the encoder 2830 are seen as elements located within one apparatus, but the correlation information obtainer 2810, the chroma sample predictor 2820, and the encoder 2830 are not required to be physically adjacent to each other. Thus, in another embodiment, the correlation information obtainer 2810, the chroma sample predictor 2820, and the encoder 2830 may be dispersed.

The correlation information obtainer 2810, the chroma sample predictor 2820, and the encoder 2830 may be implemented by one processor. In another embodiment, the correlation information obtainer 2810, the chroma sample predictor 2820, and the encoder 2830 may be implemented by a plurality of processors.

The correlation information obtainer 2810, the chroma sample predictor 2820, and the encoder 2830 may be stored in the form of a program in a storage medium of the video encoding apparatus 2800. Also, the program that performs functions of the correlation information obtainer 2810, the chroma sample predictor 2820, and the encoder 2830 may be externally obtained when required by the video encoding apparatus 2800.

Functions of the correlation information obtainer 2810 and chroma sample predictor 2820 of FIG. 28 are materially the same as functions of the correlation information obtainer 1710 and chroma sample predictor 1720 of FIG. 17.

The encoder 2830 may select an intra mode having optimum encoding efficiency among intra modes applicable to a current chroma block, and generate intra mode information according to a result of the selecting. The generated intra mode information may be entropy-encoded and included in a bitstream. Accordingly, when accuracy of a prediction result of an MPC mode performed by the correlation information obtainer 2810 and the chroma sample predictor 2820 is low compared to a prediction result according to another intra mode, the encoder 2830 may determine an intra mode other than the MPC mode as the intra mode of the current chroma block.

The video encoding apparatus 2800 may additionally include a decoder (not shown). The encoder of the video encoding apparatus 2800 has the same functions as the decoder 1730 of the video decoding apparatus 1700. In lossy-compression (lossy-coding), an original picture and a reconstructed picture are not completely the same, and thus a current picture is decoded by referring to the reconstructed picture that is pre-reconstructed instead of the original picture during a decoding process. Accordingly, a process of decoding an encoded picture again is required for the current picture to refer to the reconstructed picture that is pre-reconstructed instead of the original picture during an encoding process. Thus, the video encoding apparatus 2800 may preform functions of the components included in the video decoding apparatus 1700.

Figure 29:
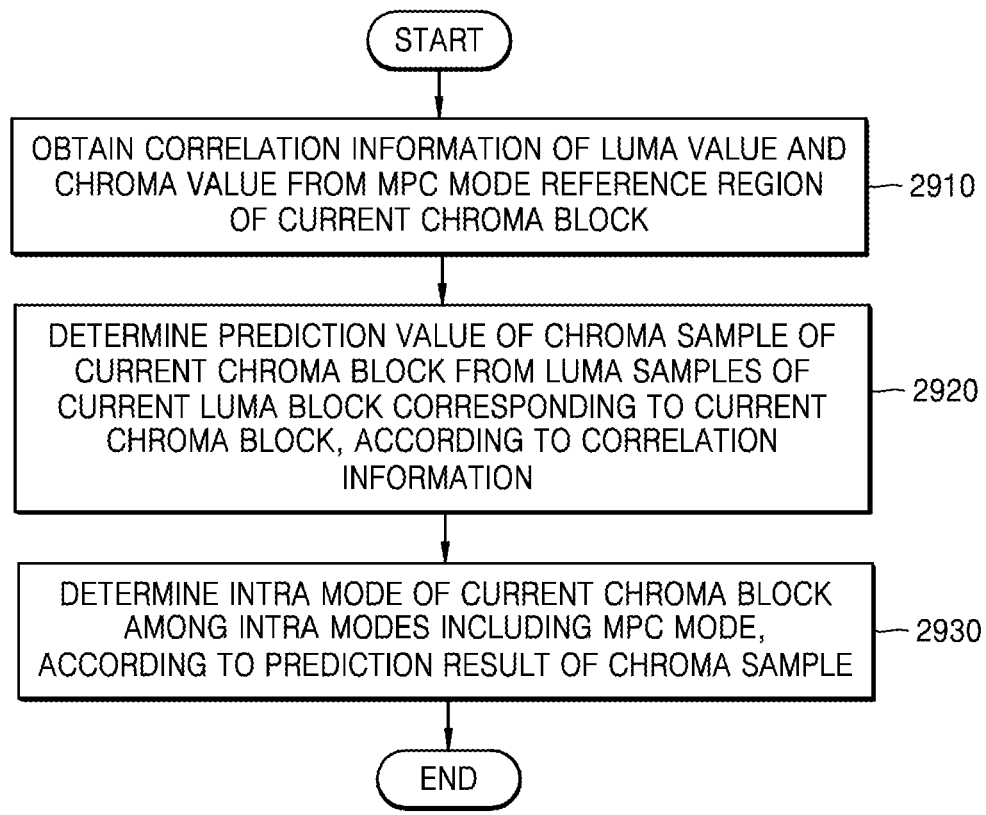
FIG. 29 is a flowchart of a method of encoding a current chroma block according to an MPC mode.

FIG. 29 is a flowchart of a method 2900 of encoding a current chroma block according to an MPC mode.

In operation 2910, correlation information of a luma value and a chroma value is obtained from an MPC mode reference region of a current chroma block.

In operation 2920, a sample value of a chroma sample of the current chroma block is predicted from luma samples of a current luma block corresponding to the current chroma block, according to the correlation information.

In operation 2930, intra mode information indicating whether a current chroma block is predicted according to the MPC mode or another intra mode is generated according to a prediction result of operation 2920.

Operations 2910 through 2930 may be performed by the correlation information obtainer 2810, the chroma sample predictor 2820, and the encoder 2830 of FIG. 28. Also, functions performed by each component of the video encoding apparatus 2800 of FIG. 28 may be included in the method 2900 according to the MPC mode.

The embodiments according to the present disclosure may be written as computer programs and may be implemented in a general-use digital computer that executes the programs by using a computer-readable recording medium.

While the best embodiments of the present disclosure have been described, it will be understood by one of ordinary skill in the art that various replacements, modifications, or changes with respect to the present disclosure may be made therein without departing from the spirit and scope as defined by the following claims. That is, the claims will be construed as including the various replacements, modifications, or changes with respect to the present disclosure. Therefore, the descriptions provided in the specification and drawings should be considered in a descriptive sense only and not for purposes of limitation.

The invention claimed is:

1. A video decoding method comprising:
   obtaining, with respect to a luma sample and a chroma sample at a same location in a most probable chroma (MPC) mode reference region of a current chroma block, a luma-chroma pair including a luma value of the luma sample and a chroma value of the chroma sample;
   reflecting the luma-chroma pair to a luma-chroma 2-dimensional (2D) histogram;
   obtaining correlation information of the luma value and the chroma value from the MPC mode reference region of the current chroma block by determining the chroma value corresponding to each luma value, according to the luma-chroma 2D histogram;
   determining a prediction value of the chroma sample of the current chroma block from luma samples of a current luma block corresponding to the current chroma block, according to the correlation information; and
   decoding the current chroma block based on the prediction value of the chroma sample.

2. The video decoding method of claim 1, wherein the MPC mode reference region is located at the left, top, and upper left of the current chroma block and is located within a certain sample distance from a boundary of the current chroma block.

3. The video decoding method of claim 2, wherein the certain sample distance is determined according to MPC mode reference region information obtained from a bitstream.

4. The video decoding method of claim 2, wherein the certain sample distance is determined according to at least one of a size of the current chroma block, resolution of a current picture, and a slice type.

5. The video decoding method of claim 1, wherein the MPC mode reference region is a region including all blocks decoded before the decoding of the current chroma block.

6. The video decoding method of claim 1, wherein the obtaining of the correlation information comprises:
   determining luma ranges including a plurality of consecutive luma values; and
   determining each corresponding chroma value with respect to the luma ranges, according to the luma-chroma 2D histogram.

7. The video decoding method of claim 1, wherein the determining of the prediction value of the chroma sample comprises determining prediction values of chroma samples of the current chroma block from a reconstruction result of the current luma block corresponding to the current chroma block after the current luma block is reconstructed.

8. The video decoding method of claim 1, wherein the determining of the prediction value of the chroma sample comprises determining prediction values of chroma samples of the current chroma block, based on a prediction result of the current luma block corresponding to the current chroma block when the current luma block is predicted according to an inter prediction mode.

9. The video decoding method of claim 1, wherein the determining of the prediction value of the chroma sample comprises smoothing the prediction value of the chroma sample according to an adjacent sample of the chroma sample.

10. The video decoding method of claim 1, further comprising obtaining intra mode information of the current chroma block from a bitstream,
    wherein the intra mode information indicates one of intra modes available in the current chroma block.

11. The video decoding method of claim 10, wherein the intra modes comprise at least one of a planar mode, a vertical mode, a horizontal mode, a DC mode, a DM mode, and an MPC mode, and
    the obtaining of the correlation information and the determining of the prediction value of the chroma sample are performed when the intra mode information indicates the MPC mode.

12. A video decoding apparatus comprising:
    a correlation information obtainer configured to:
       obtain, with respect to a luma sample and a chroma sample at a same location in a most probable chroma (MPC) mode reference region of a current chroma block, a luma-chroma pair including a luma value of the luma sample and a chroma value of the chroma sample;
       reflect the luma-chroma pair to a luma-chroma 2-dimensional (2D) histogram; and
       obtain correlation information of the luma value and the chroma value from the MPC mode reference region of the current chroma block by determining the chroma value corresponding to each luma value, according to the luma-chroma 2D histogram;
    a chroma sample predictor configured to determine a prediction value of the chroma sample of the current chroma block from luma samples of a current luma block corresponding to the current chroma block, according to the correlation information; and
    a decoder configured to decode the current chroma block based on the prediction value of the chroma sample.

13. A video encoding method comprising:
    obtaining, with respect to a luma sample and a chroma sample at a same location in a most probable chroma (MPC) mode reference region of a current chroma block, a luma-chroma pair including a luma value of the luma sample and a chroma value of the chroma sample;

reflecting the luma-chroma pair to a luma-chroma 2-dimensional (2D) histogram;

obtaining correlation information of the luma value and the chroma value from the MPC mode reference region of the current chroma block by determining the chroma value corresponding to each luma value, according to the luma-chroma 2D histogram;

determining a prediction value of the chroma sample of the current chroma block from luma samples of a current luma block corresponding to the current chroma block, according to the correlation information; and determining an intra mode of the current chroma block among intra modes including an MPC mode, according to a prediction result of the chroma sample.

* * * * *